United States Patent
Manolakos et al.

(10) Patent No.: US 9,929,812 B2
(45) Date of Patent: Mar. 27, 2018

(54) TECHNIQUES FOR CHANNEL ESTIMATION USING USER EQUIPMENT SPECIFIC REFERENCE SIGNALS BASED ON SMOOTHED PRECODERS IN A FREQUENCY DOMAIN

(71) Applicant: QUALCOMM Incorporated, San Diego, CA (US)

(72) Inventors: Alexandros Manolakos, San Diego, CA (US); June Namgoong, San Diego, CA (US); Raghuraman Krishnamoorthi, San Diego, CA (US); Jing Jiang, San Diego, CA (US); Joseph Binamira Soriaga, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 15/225,593

(22) Filed: Aug. 1, 2016

(65) Prior Publication Data

US 2017/0164367 A1 Jun. 8, 2017

Related U.S. Application Data

(60) Provisional application No. 62/271,585, filed on Dec. 28, 2015, provisional application No. 62/264,156, filed on Dec. 7, 2015.

(51) Int. Cl.
*H04B 10/50* (2013.01)
*H04L 25/02* (2006.01)
(Continued)

(52) U.S. Cl.
CPC ....... *H04B 10/5055* (2013.01); *H04B 7/0456* (2013.01); *H04B 7/0639* (2013.01);
(Continued)

(58) Field of Classification Search
CPC ... H04B 25/00; H04L 25/023; H04L 25/0236; H04L 27/2695; H04L 25/0202;
(Continued)

(56) References Cited

U.S. PATENT DOCUMENTS

| 7,567,502 B2 | 7/2009 | Laroia et al. |
| 8,948,297 B2 | 2/2015 | Zhang et al. |

(Continued)

OTHER PUBLICATIONS

ISA/EP, International Search Report and Written Opinion of the International Searching Authority, Int'l Application No. PCT/US2016/065399, dated Mar. 22, 2017, European Patent Office, Rijswijk, NL, 15 pgs.

(Continued)

*Primary Examiner* — Ashley Shivers
(74) *Attorney, Agent, or Firm* — Holland & Hart LLP

(57) ABSTRACT

Methods, systems, and devices for wireless communication are described. One method includes identifying a plurality of intermediate precoders corresponding to a plurality of tone subsets. The plurality of intermediate precoders define a plurality of vectors across the plurality of tone subsets. The method further includes selecting, for each vector of the plurality of vectors, a subset of non-frequency domain components of the vector, such as time-domain components; modifying the plurality of intermediate precoders to a plurality of smoothed precoders based at least in part on the selected subset of non-frequency domain components for each vector; and precoding a plurality of transmit streams using the plurality of smoothed precoders. The plurality of smoothed precoders is smoothed in a frequency domain compared to the plurality of intermediate precoders.

(Continued)

Smoothing precoders may enable application of wideband channel estimation techniques using user equipment (UE)-specific reference signals.

30 Claims, 31 Drawing Sheets

(51) Int. Cl.

| | | |
|---|---|---|
| *H04B 7/06* | (2006.01) | |
| *H04W 72/04* | (2009.01) | |
| *H04L 5/00* | (2006.01) | |
| *H04L 5/14* | (2006.01) | |
| *H04L 12/26* | (2006.01) | |
| *H04B 7/0456* | (2017.01) | |
| *H04W 88/02* | (2009.01) | |

(52) U.S. Cl.
CPC .............. *H04L 5/0051* (2013.01); *H04L 5/14* (2013.01); *H04L 25/0202* (2013.01); *H04L 43/16* (2013.01); *H04W 72/042* (2013.01); *H04W 72/0453* (2013.01); *H04B 7/0691* (2013.01); *H04W 88/02* (2013.01)

(58) Field of Classification Search
CPC ........... H04L 25/0226; H04L 25/03343; H04L 25/03898; H04L 2025/03808; H04L 25/497; H04L 27/26; H04L 27/2636; H04B 7/0456; H04B 10/5055; H04B 7/0639; H04W 72/0453
See application file for complete search history.

(56) References Cited

U.S. PATENT DOCUMENTS

| | | | | |
|---|---|---|---|---|
| 2010/0202560 | A1* | 8/2010 | Luo ................... | H04B 7/0691 375/295 |
| 2010/0272201 | A1* | 10/2010 | Nakao ................. | H04L 5/0023 375/260 |
| 2011/0244877 | A1 | 10/2011 | Farajidana et al. | |
| 2012/0140851 | A1* | 6/2012 | Zhang ................. | H04B 7/0456 375/296 |
| 2012/0320841 | A1* | 12/2012 | Miki .................... | H04B 7/0689 370/329 |
| 2015/0103932 | A1 | 4/2015 | Yokote et al. | |
| 2015/0365145 | A1* | 12/2015 | Schober .............. | H04B 7/0417 375/267 |

OTHER PUBLICATIONS

Sandell et al., "Per-Tone Transmit Antenna Selection with Phase Preceding for OFDM," IEEE Transactions on Communications, Jun. 1, 2011, pp. 1514-1518, vol. 59, No. 6, XP011366478, institute of Electrical and Electronics Engineers, IEEE Service Center, Piscataway, NJ. USA.

Khan et al., "Channel Estimation Based on Non-Equally Spaced Pilot Allocation in OFDM System," 2014 6th Computer Science and Electronic Engineering Conference (CEEC), Sep. 25, 2014, pp. 139-143, XP032686041, DOI: 10.11 09/CEEC.2014.6958569, Institute of Electrical and Electronics Engineers.

Ozdemir et al., "Channel Estimation for Wireless OFDM Systems," IEEE Communications Surveys, Apr. 2007, pp. 18-48, 2nd Quarter 2007, vol. 9, No. 2, XP011381247, ISSN: 1553-877X, DOI: 10.1109/COMST.2007.382406, Institute of Electrical and Electronics Engineers, New York, NY, USA.

Shahriar et al., "PHY-Layer Resiliency in OFDM Communications: A Tutorial," IEEE Communications Surveys & Tutorials, Mar. 13, 2015, pp. 292-314, vol. 17, No. 1, XP011576278, DOI: 10.1109/COMST.2014.2349883, Institute of Electrical and Electronics Engineers.

IPEA/EP, Second Written Opinion of the International Preliminary Examining Authority, Int'l Application No. PCT/US2016/065399, Nov. 13, 2017, European Patent Office, Munich, DE, 6 pgs.

\* cited by examiner

TECHNIQUES FOR CHANNEL ESTIMATION USING USER EQUIPMENT SPECIFIC REFERENCE SIGNALS BASED ON SMOOTHED PRECODERS IN A FREQUENCY DOMAIN

CROSS REFERENCES

The present application for patent claims priority to U.S. Provisional Patent Application No. 62/264,156 by Namgoong et al., entitled "Channel Estimation Techniques Using UE-Specific Reference Signals," filed Dec. 7, 2015, and U.S. Provisional Patent Application No. 62/271,585 by Manolakos et al., entitled "Techniques for Smoothing Precoders in a Frequency Domain Based on Selected Non-Frequency Domain Components of Channel Response Vectors or Precoder Vectors," filed Dec. 28, 2015 assigned to the assignee hereof.

INTRODUCTION

The following relates generally to wireless communication, and more specifically to techniques for smoothing precoders which may enable application of wideband channel estimation techniques. At times, the wideband channel estimation techniques may use user equipment (UE)-specific reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a UE.

In some deployments, a wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In some deployments (e.g., in a next generation or 5G network), a wireless multiple access communication system may include a number of smart radio heads (radio heads (RHs)) in communication with a number of access node controllers (ANCs), where a set of one or more radio heads, in communication with an ANC, defines an eNB. A base station or radio head may communicate with a set of UEs on downlink channels (e.g., for transmissions from a base station or radio head to a UE) and uplink channels (e.g., for transmissions from a UE to a base station or radio head).

When applying transmit beamforming to the downlink channels of a wireless communication system, block-based transmit beamforming (e.g., resource block-based transmit beamforming, as used in LTE/LTE-A networks) can result in losses in beamforming gain—particularly for frequency selective channels. Also, jumps (e.g., amplitude or phase discontinuities) between the precoders used for adjacent blocks may prevent a UE from using the more efficient, low complexity wide-band channel estimation techniques which may achieve smaller channel estimation error. Notice that larger channel estimation error may result in reduced throughput at a UE. Therefore, techniques for smoothing precoders and enhancing channel estimation may enhance operation of wireless communication systems.

SUMMARY

The described techniques relate to improved methods, systems, devices, or apparatuses that support channel estimation using UE-specific reference signals.

A method of wireless communication is described. The method may include identifying a plurality of intermediate precoders corresponding to a first plurality of tone subsets, the plurality of intermediate precoders defining a plurality of vectors across the first plurality of tone subsets, and each of the plurality of vectors may include at least frequency domain components and non-frequency domain components, selecting, for each vector of the plurality of vectors, a subset of the non-frequency domain components of the vector, modifying the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders and precoding a plurality of transmit streams using the plurality of smoothed precoders, wherein one or more of the plurality of transmit streams comprise a bandwidth allocation having one or more UE-specific reference signal tone locations uniformly spaced within the bandwidth allocation, the bandwidth allocation comprising a plurality of resource blocks (RBs) that are contiguous in frequency over the bandwidth allocation.

An apparatus for wireless communication is described. The apparatus may include means for identifying a plurality of intermediate precoders corresponding to a first plurality of tone subsets, the plurality of intermediate precoders defining a plurality of vectors across the first plurality of tone subsets, and each of the plurality of vectors may include at least frequency domain components and non-frequency domain components, means for selecting, for each vector of the plurality of vectors, a subset of the non-frequency domain components of the vector, means for modifying the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders and means for precoding a plurality of transmit streams using the plurality of smoothed precoders, wherein one or more of the plurality of transmit streams comprise a bandwidth allocation having one or more UE-specific reference signal tone locations uniformly spaced within the bandwidth allocation, the bandwidth allocation comprising a plurality of RBs that are contiguous in frequency over the bandwidth allocation.

A further apparatus is described. The apparatus may include a processor, memory in electronic communication with the processor, where the processor and memory may be configured to identify a plurality of intermediate precoders corresponding to a first plurality of tone subsets, the plurality of intermediate precoders defining a plurality of vectors across the first plurality of tone subsets, and each of the plurality of vectors may include at least frequency domain components and non-frequency domain components, select, for each vector of the plurality of vectors, a subset of the non-frequency domain components of the vector, modify the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders and precode a plurality of transmit streams using the plurality of smoothed precoders, wherein one or more of the plurality of transmit streams comprise a bandwidth allocation having one or more UE-specific reference signal tone locations uniformly spaced within the bandwidth allocation, the bandwidth allocation comprising a plurality of RBs that are contiguous in frequency over the bandwidth allocation.

A non-transitory computer readable medium for wireless communication is described. The non-transitory computer-readable medium may include instructions to cause a processor to identify a set of intermediate precoders corresponding to a first set of tone subsets, the set of intermediate precoders defining a set of vectors across the first set of tone subsets, and each of the plurality of vectors may include at least frequency domain components and non-frequency domain components, select, for each vector of the set of vectors, a subset of the non-frequency domain components of the vector, modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders and precode a set of transmit streams using the set of smoothed precoders, where one or more of the set of transmit streams comprise a bandwidth allocation having one or more UE-specific reference signal tone locations uniformly spaced within the bandwidth allocation, the bandwidth allocation comprising a set of RBs that are contiguous in frequency over the bandwidth allocation.

Some examples of the method, apparatus, or non-transitory computer-readable medium described above may further include processes, features, means, or instructions for applying continuous precoding to one or more tones in the bandwidth allocation. Some examples of the method, apparatus, or non-transitory computer-readable medium described above may further include processes, features, means, or instructions for transmitting the downlink (DL) transmissions to the UE.

Some examples of the method, apparatus, or non-transitory computer-readable medium described above may further include processes, features, means, or instructions for determining the bandwidth allocation for DL transmissions to a UE.

In some examples of the method, apparatus, or non-transitory computer-readable medium described above, a frequency spacing of the one or more UE-specific reference signal tone locations is selected to allow the UE to perform at least one of a RMMSE channel estimation scheme, an IFFT channel estimation scheme, or a hybrid channel estimation scheme, using a UE-specific reference signal transmitted at the UE-specific reference signal tone locations. Some examples of the method, apparatus, or non-transitory computer-readable medium described above may further include processes, features, means, or instructions for transmitting downlink control information (DCI), wherein the DCI may indicate that precoding was performed per tone.

In some examples of the method, apparatus, or non-transitory computer-readable medium described above, each vector of the set of vectors corresponds to a different transmit stream, or a different combination of transmit stream and transmit antenna. Some examples of the method, apparatus, or non-transitory computer-readable medium described above may further include processes, features, means, or instructions for transforming each vector of the set of vectors from the frequency domain to a time domain, where selecting a subset of the non-frequency domain components of the vector comprises selecting a subset of time domain components of the vector.

In some examples of the method, apparatus, or non-transitory computer-readable medium described above, the subset of non-frequency domain components of a vector is selected based on: a power threshold, or a compactness restriction, or a sparseness restriction, or a fixed number of time domain components, or a combination thereof. In some examples of the method, apparatus, or non-transitory computer-readable medium described above, the selected subset of non-frequency domain components for at least one vector comprises a single grouping of adjacent non-frequency domain components.

In some examples of the method, apparatus, or non-transitory computer-readable medium described above, the selected subset of non-frequency domain components for the vector consists of one non-frequency domain component. Some examples of the method, apparatus, or non-transitory computer-readable medium described above may further include processes, features, means, or instructions for identifying a set of channel responses corresponding to a set of channels across a third set of tone subsets, where each channel of the set of channels corresponds to a pairing of a transmit antenna with a receive antenna. Some examples of the method, apparatus, or non-transitory computer-readable medium described above may further include processes, features, means, or instructions for selecting, for each channel of the set of channels, a subset of non-frequency domain components of the channel response for the channel, where the set of intermediate precoders is identified based on the selected subset of non-frequency domain components for each channel of the set of channels across a fourth set of tone subsets.

Some examples of the method, apparatus, or non-transitory computer-readable medium described above may further include processes, features, means, or instructions for transforming each channel response for each of the set of channels from a frequency domain to a time domain, where selecting the subset of non-frequency domain components of a channel response comprises selecting a subset of time domain components of the channel response.

In some examples of the method, apparatus, or non-transitory computer-readable medium described above, the subset of non-frequency domain components for a channel is selected based on: a power threshold, or a compactness restriction, or a sparseness restriction, or a fixed number of time domain components, or a combination thereof. Some examples of the method, apparatus, or non-transitory computer-readable medium described above may further include processes, features, means, or instructions for receiving at least one pilot signal over at least one of the set of channels. Some examples of the method, apparatus, or non-transitory computer-readable medium described above may further include processes, features, means, or instructions for identifying at least one of the set of channel responses based on the at least one pilot signal.

In some examples of the method, apparatus, or non-transitory computer-readable medium described above, at least one of the first set of tone subsets and the second set of tone subsets comprises at least one of single tone subsets and tone bundles. In some examples of the method, apparatus, or non-transitory computer-readable medium described above, the first plurality of tone subsets is different from the second plurality of tone subsets.

A method of wireless communication is described. The method may include identifying an allocated bandwidth for receiving DL transmissions at a UE and selecting at least one channel estimation scheme based at least in part on the allocated bandwidth.

An apparatus for wireless communication is described. The apparatus may include means for identifying an allocated bandwidth for receiving DL transmissions at a UE and means for selecting at least one channel estimation scheme based at least in part on the allocated bandwidth.

A further apparatus is described. The apparatus may include a processor, memory in electronic communication with the processor, and instructions stored in the memory. The instructions may be operable to cause the processor to identify an allocated bandwidth for receiving DL transmissions at a UE and select at least one channel estimation scheme based at least in part on the allocated bandwidth.

A non-transitory computer readable medium for wireless communication is described. The non-transitory computer-readable medium may include instructions to cause a processor to identify an allocated bandwidth for receiving DL transmissions at a UE and select at least one channel estimation scheme based on the allocated bandwidth.

In some examples of the method, apparatus, or non-transitory computer-readable medium described above, the at least one channel estimation scheme comprises an RMMSE channel estimation scheme or an IFFT channel estimation scheme. In some examples, the RMMSE channel estimation scheme is selected when the allocated bandwidth is below a threshold and the IFFT channel estimation scheme is selected when the allocated bandwidth is at or above the threshold. In certain examples, the at least one channel estimation scheme comprises hybrid channel estimation scheme in which a first channel estimation scheme is applied to a first sub-band of the allocated bandwidth and a second channel estimation scheme is applied to a second sub-band of the allocated bandwidth. The first channel estimation scheme may include, for example, an IFFT channel estimation scheme and the second channel estimation scheme may include an RMMSE channel estimation scheme.

In some examples of the method, apparatus, or non-transitory computer-readable medium described above, the allocated bandwidth comprises a group of RBs that are contiguous in frequency within the allocated bandwidth. In some examples, a same precoding matrix is applied to each of the RBs of the allocated bandwidth. In certain examples, the precoding values applied to adjacent tones of the allocated bandwidth differ by less than a threshold amount. In some examples, a spacing of UE-specific reference signal tones is uniform through the allocated bandwidth.

Some examples of the method, apparatus, or non-transitory computer-readable medium described above may further include processes, features, means, or instructions for receiving a UE-specific reference signal on DL transmissions in the allocated bandwidth. Some examples of the method, apparatus, or non-transitory computer-readable medium described above may further include processes, features, means, or instructions for performing the at least one channel estimation scheme on the UE-specific reference signal.

In some examples of the method, apparatus, or non-transitory computer-readable medium described above, the allocated bandwidth comprises a set of RBs that are contiguous in frequency over the allocated bandwidth, and the at least one channel estimation scheme may be performed by dividing the set of RBs into band-edge RBs and in-band RBs. In some examples, the channel estimation scheme may be performed by scaling an unscaled UE-specific reference signal of each of the band-edge RBs according to a scaling factor that is based on a proximity of each band-edge RB with an edge of the allocated bandwidth, applying a first channel estimation scheme to the UE-specific reference signal contained in the in-band RBs and to the scaled UE-specific reference signal contained in the band-edge RBs, and applying a second channel estimation scheme to the unscaled UE-specific reference signal contained in the band-edge RBs and one or more UE-specific reference signal in one or more RBs adjacent to the band-edge RBs. In some examples the scaling the UE-specific reference signal may include applying a tapering function, such as a Hanning window, to scale the UE-specific reference signal of the band-edge RBs.

In some examples of the method, apparatus, or non-transitory computer-readable medium described above the second channel estimation scheme may be performed by applying the second channel estimation scheme to the band-edge RBs and at least one in-band RB adjacent to the band-edge RBs.

In some examples of the method, apparatus, or non-transitory computer-readable medium described above, the allocated bandwidth comprises a set of RBs that are contiguous in frequency over the allocated bandwidth, and performing the at least one channel estimation scheme comprises: dividing the allocated bandwidth into a set of sub-bands each comprising a subset of the set of RBs. In some examples the method, apparatus, or non-transitory computer-readable medium described above may further include processes, features, means, or instructions for applying, for each of the set of sub-bands, a second channel estimation scheme to the UE-specific reference signal contained in the RBs within the sub-band and at least one adjacent RB of an adjacent sub-band.

In some examples of the method, apparatus, or non-transitory computer-readable medium described above, performing the at least one channel estimation scheme comprises: determining that the allocated bandwidth includes a DC tone, identifying a positive bandwidth portion of the allocated bandwidth having frequencies above the DC tone, and identifying a negative bandwidth portion of the allocated bandwidth having frequencies below the DC tone. In some examples the at least one channel estimation scheme may be applied separately to the positive bandwidth portion and the negative bandwidth portion.

A method of wireless communication is described. The method may include determining a bandwidth allocation for DL transmissions to a UE and identifying UE-specific reference signal tone locations in the bandwidth allocation that are uniformly spaced within the bandwidth allocation.

An apparatus for wireless communication is described. The apparatus may include means for determining a bandwidth allocation for DL transmissions to a UE and means for identifying UE-specific reference signal tone locations in the bandwidth allocation that are uniformly spaced within the bandwidth allocation.

A further apparatus is described. The apparatus may include a processor, memory in electronic communication with the processor, and instructions stored in the memory. The instructions may be operable to cause the processor to determine a bandwidth allocation for DL transmissions to a UE and identify UE-specific reference signal tone locations in the bandwidth allocation that are uniformly spaced within the bandwidth allocation.

A non-transitory computer readable medium for wireless communication is described. The non-transitory computer-readable medium may include instructions to cause a processor to determine a bandwidth allocation for DL transmissions to a UE and identify UE-specific reference signal tone locations in the bandwidth allocation that are uniformly spaced within the bandwidth allocation.

Some examples of the method, apparatus, or non-transitory computer-readable medium described above may further include processes, features, means, or instructions for applying a same precoding matrix or continuous precoding to tones in the allocated bandwidth. Some examples of the method, apparatus, or non-transitory computer-readable medium described above may further include processes, features, means, or instructions for transmitting the DL transmissions to the UE. The bandwidth allocation may include, in some examples, a set of RBs that are contiguous in frequency over the bandwidth allocation. In some examples, a frequency spacing of the UE-specific reference signal tone locations may be selected to allow the UE to perform at least one of an RMMSE channel estimation scheme or an IFFT channel estimation scheme using a UE-specific reference signal transmitted at the UE-specific reference signal tone locations.

In one example, a method for wireless communication is described. The method may include identifying a plurality of intermediate precoders corresponding to a plurality of tone subsets. The plurality of intermediate precoders may define a plurality of vectors across the plurality of tone subsets. The method may further include selecting, for each vector of the plurality of vectors, a subset of non-frequency domain components of the vector; modifying the plurality of intermediate precoders to a plurality of smoothed precoders based at least in part on the selected subset of non-frequency domain components for each vector; and precoding a plurality of transmit streams using the plurality of smoothed precoders. The plurality of smoothed precoders may be smoothed in a frequency domain compared to the plurality of intermediate precoders.

In some examples of the method, each vector of the plurality of vectors may corresponds to a different transmit stream, or a different combination of transmit stream and transmit antenna. In some examples, the method may include transforming each vector of the plurality of vectors from the frequency domain to a time domain, and selecting a subset of non-frequency domain components of a vector may include selecting a subset of time domain components of the vector. In some examples, the subset of non-frequency domain components of a vector may be selected based at least in part on a power threshold, or a compactness restriction, or a sparseness restriction, or a fixed number of time domain components, or a combination thereof. In some examples, the selected subset of non-frequency domain components for at least one vector may include a single grouping of adjacent non-frequency domain components. In some examples, the selected subset of non-frequency domain components for a vector may consist of one non-frequency domain component.

In some examples, the method may include identifying a plurality of channel responses corresponding to a plurality of channels, where each channel of the plurality of channels corresponds to a pairing of a transmit antenna with a receive antenna, and selecting, for each channel of the plurality of channels, a subset of non-frequency domain components of the channel response for the channel. In these examples, the plurality of intermediate precoders may be identified based at least in part on the selected subset of non-frequency domain components for each channel of the plurality of channels. In some examples, the method may include transforming each channel response for each of the plurality of channels from a frequency domain to a time domain, and selecting a subset of non-frequency domain components of a channel response may include selecting a subset of time domain components of the channel response. In some examples, the subset of non-frequency domain components for a channel may be selected based at least in part on a power threshold, or a compactness restriction, or a sparseness restriction, or a fixed number of time domain components, or a combination thereof. In some examples, the method may include receiving at least one pilot signal over at least one of the plurality of channels, and identifying at least one of the plurality of channel responses based at least in part on the at least one pilot signal. In some examples, the plurality of tone subsets may include single tone subsets. In some examples, the plurality of tone subsets may include tone bundles.

In one example, an apparatus for wireless communication is described. The apparatus may include means for identifying a plurality of intermediate precoders corresponding to a plurality of tone subsets. The plurality of intermediate precoders may define a plurality of vectors across the plurality of tone subsets. The apparatus may also include means for selecting, for each vector of the plurality of vectors, a subset of non-frequency domain components of the vector; means for modifying the plurality of intermediate precoders to a plurality of smoothed precoders based at least in part on the selected subset of non-frequency domain components for each vector; and means for precoding a plurality of transmit streams using the plurality of smoothed precoders. The plurality of smoothed precoders may be smoothed in a frequency domain compared to the plurality of intermediate precoders.

In some examples of the apparatus, each vector of the plurality of vectors may correspond to a different transmit stream, or a different combination of transmit stream and transmit antenna. In some examples, the apparatus may include means for transforming each vector of the plurality of vectors from the frequency domain to a time domain, and the means for selecting a subset of non-frequency domain components of a vector may include means for selecting a subset of time domain components of the vector. In some examples, the subset of non-frequency domain components of a vector may be selected based at least in part on a power threshold, or a compactness restriction, or a sparseness restriction, or a fixed number of time domain components, or a combination thereof. In some examples, the selected subset of non-frequency domain components for at least one vector may include a single grouping of adjacent non-frequency domain components. In some examples, the selected subset of non-frequency domain components for a vector may consist of one non-frequency domain component.

In some examples, the apparatus may include means for identifying a plurality of channel responses corresponding to a plurality of channels, where each channel of the plurality of channels corresponds to a pairing of a transmit antenna with a receive antenna, and means for selecting, for each channel of the plurality of channels, a subset of non-frequency domain components of the channel response for the channel. In these examples, the plurality of intermediate precoders may be identified based at least in part on the selected subset of non-frequency domain components for each channel of the plurality of channels. In some examples, the apparatus may include means for transforming each channel response for each of the plurality of channels from a frequency domain to a time domain, and the means for selecting a subset of non-frequency domain components of a channel response may include means for selecting a subset of time domain components of the channel response. In some examples, the subset of non-frequency domain components for a channel may be selected based at least in part on a power threshold, or a compactness restriction, or a sparseness restriction, or a fixed number of time domain components, or a combination thereof. In some examples, the apparatus may include means for receiving at least one pilot signal over at least one of the plurality of channels, and means for identifying at least one of the plurality of channel responses based at least in part on the at least one pilot signal. In some examples, the plurality of tone subsets may include single tone subsets. In some examples, the plurality of tone subsets may include tone bundles.

In one example, another apparatus for wireless communication is described. The apparatus may include an intermediate precoder identifier to identify a plurality of intermediate precoders corresponding to a plurality of tone subsets. The plurality of intermediate precoders may define a plurality of vectors across the plurality of tone subsets. The apparatus may also include a precoder vector parser to select, for each vector of the plurality of vectors, a subset of non-frequency domain components of the vector; a precoder modifier to modify the plurality of intermediate precoders to a plurality of smoothed precoders based at least in part on the selected subset of non-frequency domain components for each vector; and a stream precoder to precode a plurality of transmit streams using the plurality of smoothed precoders. The plurality of smoothed precoders may be smoothed in a frequency domain compared to the plurality of intermediate precoders.

In some examples of the apparatus, the precoder vector parser may transform each vector of the plurality of vectors from the frequency domain to a time domain, and select a subset of non-frequency domain components of a vector by selecting a subset of time domain components of the vector. In some examples, the subset of non-frequency domain components of a vector may be selected based at least in part on a power threshold, or a compactness restriction, or a sparseness restriction, or a fixed number of time domain components, or a combination thereof.

In some examples, the apparatus may include a channel response identifier to identify a plurality of channel responses corresponding to a plurality of channels, where each channel of the plurality of channels corresponds to a pairing of a transmit antenna with a receive antenna, and a channel response parser to select, for each channel of the plurality of channels, a subset of non-frequency domain components of the channel response for the channel. In these examples, the intermediate precoder identifier may identify the plurality of intermediate precoders based at least in part on the selected subset of non-frequency domain components for each channel of the plurality of channels. In some examples, the channel response parser may transform each channel response for each of the plurality of channels from a frequency domain to a time domain, and select a subset of non-frequency domain components of a channel response by selecting a subset of time domain components of the channel response. In some examples, the subset of non-frequency domain components for a channel may be selected based at least in part on a power threshold, or a compactness restriction, or a sparseness restriction, or a fixed number of time domain components, or a combination thereof. In some examples, the plurality of tone subsets may include single tone subsets.

In one example, a non-transitory computer-readable medium storing computer-executable code for wireless communication is described. The code may be executable by a processor to identify a plurality of intermediate precoders corresponding to a plurality of tone subsets. The plurality of intermediate precoders may define a plurality of vectors across the plurality of tone subsets. The code may also be executable by the processor to select, for each vector of the plurality of vectors, a subset of non-frequency domain components of the vector; to modify the plurality of intermediate precoders to a plurality of smoothed precoders based at least in part on the selected subset of non-frequency domain components for each vector; and to precode a plurality of transmit streams using the plurality of smoothed precoders. The plurality of smoothed precoders may be smoothed in a frequency domain compared to the plurality of intermediate precoders.

In one example of the non-transitory computer-readable medium, the code may be executable by the processor to transform each vector of the plurality of vectors from the frequency domain to a time domain, and the code executable by the processor to select a subset of non-frequency domain components of a vector may include code executable by the processor to select a subset of time domain components of the vector. In some examples, the subset of non-frequency domain components of a vector may be selected based at least in part on a power threshold, or a compactness restriction, or a sparseness restriction, or a fixed number of time domain components, or a combination thereof.

In some examples, the code may be executable by the processor to identify a plurality of channel responses corresponding to a plurality of channels, where each channel of the plurality of channels corresponds to a pairing of a transmit antenna with a receive antenna, and to select, for each channel of the plurality of channels, a subset of non-frequency domain components of the channel response for the channel. In these examples, the code executable by the processor to identify the plurality of intermediate precoders may identify the plurality of intermediate precoders based at least in part on the selected subset of non-frequency domain components for each channel of the plurality of channels.

DETAILED DESCRIPTION

Figure 1:
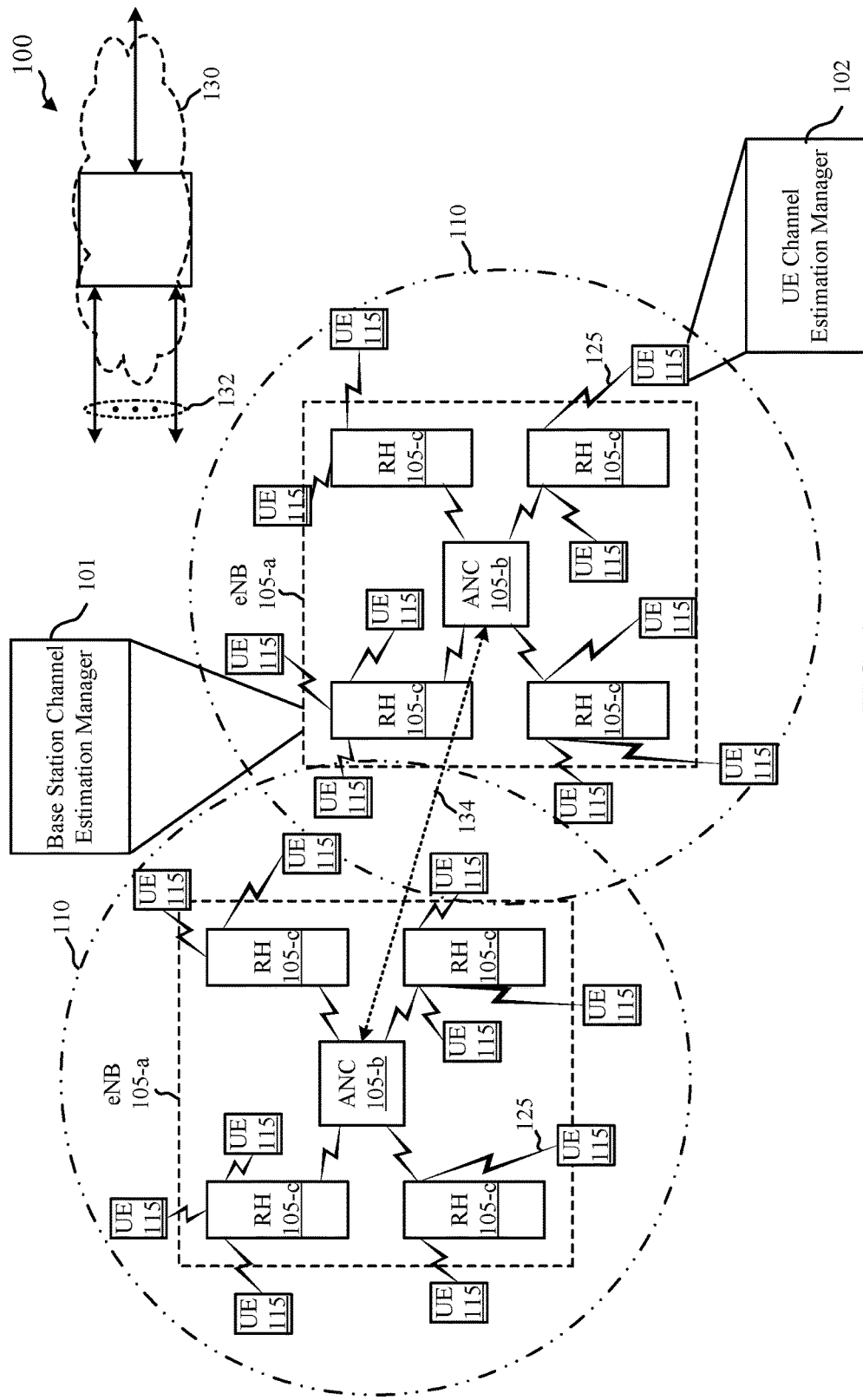
FIG. 1 illustrates an example of a wireless communications system that supports channel estimation using UE-specific reference signals in accordance with one or more aspects of the present disclosure.

Various techniques provided herein describe channel estimation schemes for UE-specific reference signals provided in tones spaced uniformly across an allocated bandwidth. Generally, the described techniques provide channel estimation schemes to reduce channel estimation error that may increase at edges of transmission frequency bands, or channel estimation error around a direct current (DC) tone when an allocated transmission bandwidth includes a DC tone. In some examples, UE-specific reference signal may be provided by a base station that is uniformly spaced in the frequency domain across an allocated transmission bandwidth. Such a UE-specific reference signal may be a demodulation reference signal (DMRS) that is provided in alternating tones across a frequency range of an allocated bandwidth. A uniformly spaced reference signal may allow UEs to perform an inverse fast Fourier transform (IFFT) based channel estimation in some scenarios, and may provide enhanced channel estimation. In some examples, UEs may perform robust minimum mean-square error (RMMSE)-based channel estimation technique on all of a portion of UE-specific reference signal tones in an allocated bandwidth.

In some examples, a UE may select a channel estimation scheme based on the allocated bandwidth, such as an IFFT or RMMSE channel estimation scheme. An IFFT scheme may be used, for example, if the allocated bandwidth exceeds a threshold, and an RMMSE scheme may be used if the allocated bandwidth is at or below the threshold. In some cases, a UE may divide tones into in-band tones and band-edge tones. For example, tones towards the outside of a frequency band may be referred to as band-edge tones, while other tones (such as tones towards the middle of the frequency band, or tones other than band-edge tones) may be referred to as in-band tones. In some examples, a hybrid channel estimation technique may be used, in which IFFT-based channel estimation is used in obtaining the channel estimates for in-band tones, and RMMSE-based channel estimation is used in obtaining the channel estimates for band-edge tones. Such a hybrid technique may be used if the allocated bandwidth exceeds a threshold value, for example. In some examples, a tapering function may be applied to a UE-specific reference signal that tapers band-edge DMRS tones prior to applying an IFFT-based channel estimation technique. An RMMSE-based channel estimation technique may be used for the band-edge tones and a channel estimate may be determined based on both estimations. In some examples, an allocated bandwidth may be separated into multiple sub-bands on either side of a DC tone, and channel estimation techniques, or hybrid channel estimation techniques, may be separately applied to each sub-band.

The present disclosure may further relate to techniques for smoothing precoders in a frequency domain based on selected time domain components of channel response vectors (where a channel response vector is a vector defined by a subset of channel estimates corresponding to a pairing of a transmit antenna with a receive antenna across a plurality of tone subsets) or precoder vectors (where a precoder vector is a vector defined by a transmit stream, or by a combination of a transmit stream and a transmit antenna, across a plurality of tone subsets). In some cases, smoothing precoders, such as at a transmitter, may enable a receiver, such as a UE, to employ the described channel estimation techniques. Further, the channel estimation techniques may allow a UE to achieve higher data throughput due to reduced channel estimation error.

Techniques such as disclosed herein may provide enhanced channel estimation in some deployments. Such enhanced estimation may be the result of certain channel estimation techniques having increased error in tones close to band edges (e.g., IFFT-based channel estimation techniques), which may be compensated by using a different (e.g., RMMSE) channel estimation technique for such tones. Other channel estimation techniques may be computationally challenging if a number of UE-specific reference signal tones becomes too large (e.g., RMMSE-based channel estimation techniques), and a different channel estimation technique (e.g., IFFT-based channel estimation) may be applied to some or all tones if an allocated bandwidth exceeds a threshold value. Furthermore, in the event that a DC tone punctures an allocated bandwidth, channel estimation error around the DC tone may be impacted, which may be compensated by performing channel estimation for positive and negative frequencies from the DC tone separately.

Techniques are described in which precoders are smoothed in a frequency domain based on selected time domain components of channel response vectors or precoder vectors. Effective downlink beamforming can be an important aspect of an extreme bandwidth wireless communication system (e.g., a next generation or 5G network), and particularly so in a massive MIMO scenario deployed in high carrier frequencies. High carrier frequencies may require high beamforming gains to "close the link." Per tone beamforming may be optimal from a transmit beamforming perspective, because each tone of a system bandwidth may experience a different channel response, and per tone beamforming may provide the highest beamforming gains and greatest beamforming flexibility. However, precoders used for downlink beamforming in LTE/LTE-A networks are block-based (e.g., resource block-based). One of the motivations for using block-based precoders is to eliminate, or minimize, the jumps, i.e., amplitude or phase discontinuities, between any pair of adjacent tones, at least for adjacent tones within each resource block. However, jumps between the precoders used for adjacent blocks (or adjacent tones) can prevent a UE from using the low complexity wide-band channel estimation techniques, for at least the following reasons. Jumps between precoders can destroy the sparseness of channel impulse responses and make the delay spread of a precoded channel larger than the delay spread of the propagation channel. In some cases, the maximum delay spread that a channel estimator can handle is determined by the DMRS tone density in the frequency domain, which is typically chosen based on the maximum delay spread expected in the propagation channel. Further, at times, the smaller the delay spread, the more noise reduction in the channel estimates. Therefore, an increase in the delay spread of a precoded channel caused by jumps or discontinuities between precoders can significantly degrade the channel estimation performance at a UE. As such, a precoder may be considered smooth if it has minimal or reduced jumps or discontinuities, such as between blocks or tones. Therefore, smoothing precoders may involve reducing the delay spread of a precoded channel, such as through reducing jumps or discontinuities between precoders, compared to before the precoders were smoothed. It should be noted that if precoders are not smoothed, such as across large bandwidth deployments, a UE may not be able to use certain wideband channel estimation techniques (e.g., IFFT-based channel estimation, a hybrid channel estimation scheme as described herein, etc.) which may benefit the UE, such as through increased data-throughput. In addition, a transmitter may notify (e.g., through a DCI conveyed in the downlink control channel (PDCCH), etc.) the receiver, such as a UE, that the transmitter is employing a per tone smoothed precoding technique. Further, it may be implicit that if the transmitter is employing a per tone precoding technique, then it may be assumed or known (e.g., by a receiver or UE) that the transmitter smoothed the precoders.

The techniques described in the present disclosure can increase the sparseness of channel impulse responses and reduce the severity of jumps between precoders, thereby reducing the delay spread of a precoded channel and improving the channel estimation performance at a UE. Further, wideband channel estimation techniques, such as IFFT-based channel estimation or the hybrid channel estimation techniques as described herein, may be employed if precoders are smoothed, which may result in increased data throughput due to improved beamforming gain and channel estimation performance.

Aspects of the disclosure are initially described in the context of a wireless communication system. Further examples are provided of channel estimation techniques using UE-RS tones. Aspects of the disclosure are further illustrated by and described with reference to apparatus diagrams, system diagrams, and flowcharts that relate to channel estimation techniques using UE-specific reference signals.

FIG. 1 illustrates an example of a wireless communication system 100, in accordance with one or more aspects of the present disclosure. The wireless communication system 100 may include network access devices 105, UEs 115, and a core network 130. Wireless communications system 100 may support channel estimation techniques using UE-specific reference signals.

The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart RHs 105-c. In an alternative configuration of the wireless communication system 100, the functionality of an ANC 105-b may be provided by a RH 105-c or distributed across the RHs 105-c of an eNB 105-a. In another alternative configuration of the wireless communication system 100, the radio heads 105-c may be replaced with base stations, and the ANCs 105-may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110, and may provide one or more remote transceivers associated with an ANC 105-b. A radio head 105-c may perform many of the functions of a LTE/LTE-A base station. In some examples, an ANC 105-b may be implemented in distributed form, with a portion of the ANC 105-b being provided in each radio head 105-c. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNodeBs, etc. The wireless communication system 100 may include radio heads 105-c (or base stations or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, another electronic device having a wireless communication interface, or the like. A UE may be able to communicate with various types of eNBs 105-a, radio heads 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a radio head 105-c, and/or DL channels, from a radio head 105-c to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques (e.g., as described with reference to FIGS. 3-8). In some examples, the control information transmitted during a transmission time interval (TTI) of a downlink channel may be distributed between different control regions in a cascaded manner (e.g., between a common control region and one or more UE-specific control regions).

One or more of eNBs 105-*a* may include a base station channel estimation manager 101, which may provide UE-specific reference signals (e.g., a DMRS) in uniformly spaced tones through a bandwidth allocated to a UE 115 for a downlink transmission. In some examples, the base station channel estimation manager 101 may identify one or more RBs for transmission of data to a UE 115 and tones for DMRS to be included in the RB. The UE-specific reference signal may be used, for example, for channel estimation by the UE. UEs 115 may include a UE channel estimation manager 102, which may receive UE-specific reference signal tones and perform channel estimation based on the received tones. The UE channel estimation manager 102 may, in some examples, determine a channel estimation scheme based on an allocated bandwidth for a transmission. For example, a first channel estimation scheme (e.g., IFFT) may be used if the bandwidth exceeds the threshold value, and a second channel estimation scheme (e.g., RMMSE) may be used if the allocated bandwidth is less than a threshold value. In some examples, a hybrid estimation scheme that uses both the first and second channel estimation schemes may be used. In some examples, a DC tone may be present in an allocated bandwidth, and a channel estimation scheme may be selected to be applied separately for positive and negative frequencies from the DC tone. Base station channel estimation manager 101 may be an example of base station channel estimation manager 2205 described with reference to FIG. 22. UE channel estimation manager 102 may be an example of UE channel estimation manager 2105 described with reference to FIG. 21.

One or more of the network access devices 105 (e.g., one or more eNBs 105-*a*) may include a base station channel estimation manager 101. In some examples, the base station channel estimation manager 101 may be used to identify a plurality of intermediate precoders corresponding to a plurality of tone subsets, such as a plurality of tone subsets defined for the plurality of intermediate precoders. The plurality of intermediate precoders may define a plurality of vectors across the plurality of tone subsets, such as the plurality of tone subsets defined for the plurality of intermediate precoders. The base station channel estimation manager 101 may select, for each vector of the plurality of vectors, a subset of non-frequency domain components of the vector, and may modify the plurality of intermediate precoders to a plurality of smoothed precoders based at least in part on the selected subset of non-frequency domain components for each vector. The plurality of smoothed precoders may be used by the base station channel estimation manager 101 to precode a plurality of transmit streams transmitted to one or more of the UEs 115. The plurality of smoothed precoders may be smoothed in a frequency domain compared to the plurality of intermediate precoders.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the radio heads 105-*c* and/or UEs 115 may include multiple antennas for employing antenna diversity schemes to improve communication quality and reliability between radio heads 105-*c* and UEs 115. Additionally or alternatively, radio heads 105-*c* and/or UEs 115 may employ MIMO techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A frame structure may be used to organize PHY resources. A frame may be a 10 ms interval that may be further divided into 10 equally sized sub-frames. Each sub-frame may include two consecutive time slots. Each slot may include 6 or 7 OFDMA symbol periods. A resource element (RE) consists of one symbol period and one subcarrier (a 15 KHz frequency range, also referred to as a "tone"). A RB may contain 12 consecutive subcarriers in the frequency domain and, for a normal cyclic prefix (CP) in each OFDM symbol, 7 consecutive OFDM symbols in the time domain (1 slot), or 84 REs. Some REs may include DL reference signals (DL-RS). The DL-RS may include a cell-specific reference signals (CRS) and a UE-RS. UE-RS may be transmitted on the RBs associated with physical downlink shared channel (PDSCH). The number of bits carried by each RE may depend on the modulation scheme (the configuration of symbols that may be selected during each symbol period). Thus, the more RBs that a UE receives and the higher the modulation scheme, the higher the data rate may be.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 REs in each RB based on the number of antenna ports or layers (up to 4) of the receiving UEs 115. In addition to CRS, which may be utilized by all UEs 115 in the coverage area 110 of the base station 105, DMRS may be directed toward specific UEs 115 and may be transmitted only on RBs assigned to those UEs 115. DMRS, in LTE/LTE-A systems may include signals on 6 REs in each RB in which they are transmitted. In some examples of the present disclosure, DMRS may include signals on the first two REs of alternating tones through an allocated bandwidth for transmissions to a UE 115. On the UL, a UE 115 may transmit a combination of periodic sounding reference signal (SRS) and UL DMRS for link adaptation and demodulation, respectively.

Figure 2:
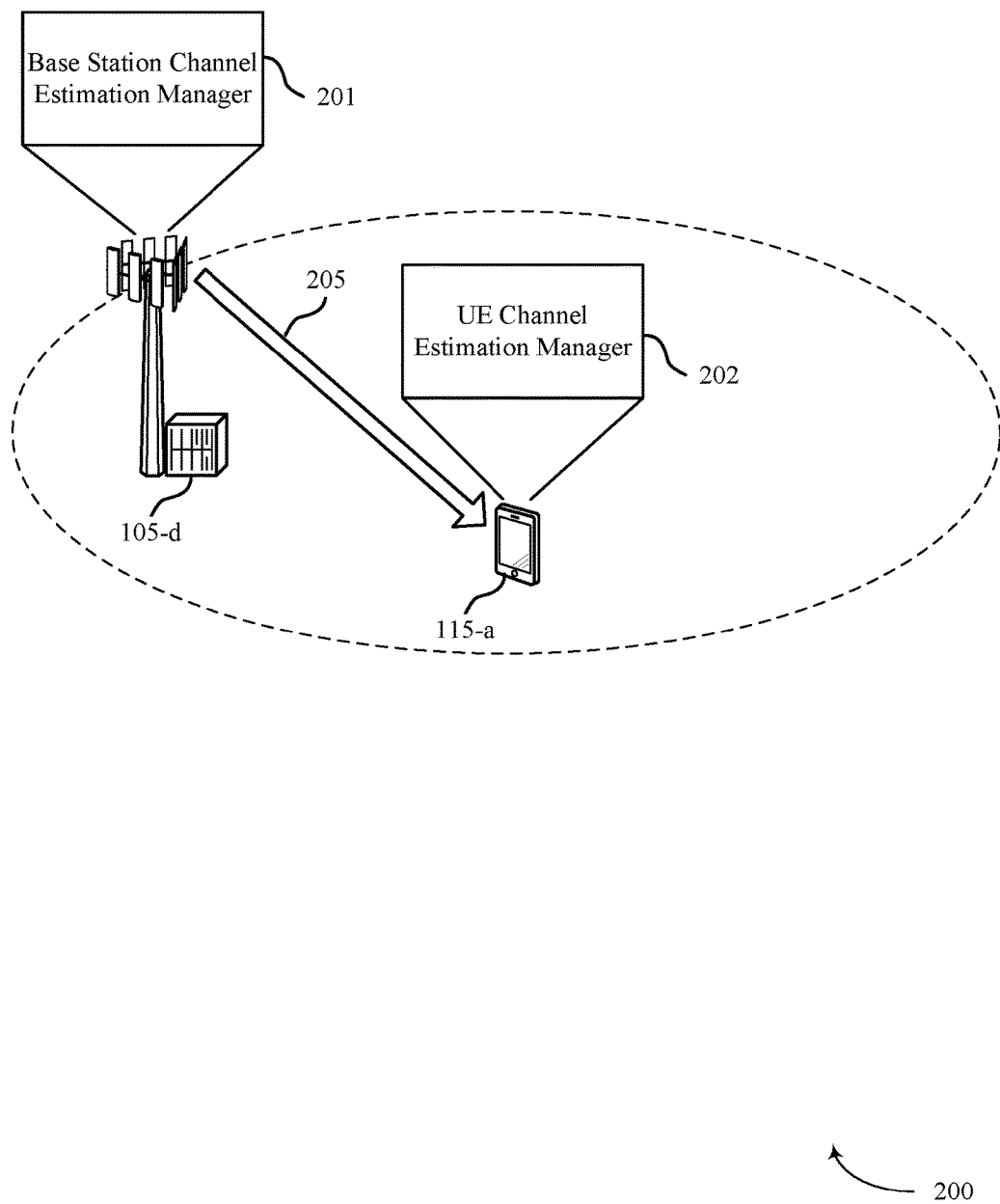
FIG. 2 illustrates an example of a wireless communications system that supports channel estimation using UE-specific reference signals in accordance with one or more aspects of the present disclosure.

FIG. 2 illustrates an example of a wireless communications system 200 for integrated control and data within RBs, in accordance with one or more aspects of the present disclosure. Wireless communications system 200 may include base station 105-d and UE 115-a, which may be examples of the corresponding devices described with reference to FIG. 1. Base station 105-d and UE 115-a may communicate over wireless link 205. Wireless communications system 200 may support integrated control and data within RBs to improve communication of control information.

Base station 105-d and UE 115-a may include base station channel estimation manager 201 and UE channel estimation manager 202, respectively. Base station channel estimation manager 201 may provide a UE-specific reference signal (e.g., DMRS) in uniformly spaced tones through a bandwidth allocated to a UE 115-a for a downlink transmission. In some examples, the base station channel estimation manager 201 may identify one or more RBs for transmission of data to UE 115-a and tones for DMRS to be included in the RB. The UE-specific reference signal may be used, for example, for channel estimation by the UE 115-a.

UE 115-a may include a UE channel estimation manager 202, which may receive UE-specific reference signal tones and perform channel estimation based on the received tones. The UE channel estimation manager 202 may, in some examples, determine a channel estimation scheme based on an allocated bandwidth for a transmission. For example, a first channel estimation scheme (e.g., IFFT) may be used if the bandwidth exceeds the threshold value, and a second channel estimation scheme (e.g., RMMSE) may be used if the allocated bandwidth is less than a threshold value. In some examples, a hybrid estimation scheme that uses both the first and second channel estimation schemes may be used. In some examples, a DC tone may be present in an allocated bandwidth, and a channel estimation scheme may be selected to be applied separately for positive and negative frequencies from the DC tone. Base station channel estimation manager 201 may be an example of base station channel estimation manager 2205 described with reference to FIG. 22. UE channel estimation manager 202 may be an example of UE channel estimation manager 2105 described with reference to FIG. 21.

In wireless communications system 200, base station 105-d, as mentioned above, may provide a DMRS pilot that is intended for single UE 115-a, that is sent using the same precoding as PDSCH transmissions to UE 115-a. The base station 105-d may, for example, determine a downlink allocation to UE 115-a, and transmit an indication of the downlink bandwidth (e.g., in DL grant information provided to UE 115-a). In some examples, precoders applied to adjacent tones of the allocated bandwidth are either constant, or differ by less than a threshold amount (which may be achieved by employing precoding smoothing techniques as discussed herein) so as to provide continuous precoding across the tones and enable wideband channel estimation by UE 115-a. The downlink allocation may be for a group of RBs that are contiguous in the frequency domain. The UE 115-a may perform channel estimation using a channel estimation scheme, or hybrid channel estimation scheme, as discussed in various examples herein.

As mentioned above, different channel estimation techniques may be applied to uniformly spaced DMRS tones, according to some examples. As also mentioned above, certain channel estimation schemes may provide enhanced channel estimation in certain situations. For example, RMMSE-based channel estimation may provide good performance in comparison with IFFT-based channel estimation. However, as the allocated bandwidth becomes large, directly computing RMMSE channel estimates using all the DMRS tones in the allocated bandwidth may become computationally prohibitive. Thus, in some examples, the allocated bandwidth may be divided into smaller sub-bands (e.g., 2 or 3 RBs), and RMMSE channel estimation may be performed for each sub-band, at the expense of performance. IFFT-based channel estimation may provide lower computational complexity and provide good channel estimation performance, but may have increased error near band edges. Thus, in some examples, UE 115-a may use RMMSE-based channel estimation for small bandwidth allocations and IFFT-based channel estimation for large bandwidth allocations.

In order to perform IFFT-based channel estimation, it may be beneficial to have uniformly spaced DMRS tones throughout the allocated bandwidth. Further, it may be beneficial for precoders to be smoothed, such as in the frequency domain, which may reduce the delay spread of the precoded channels, in comparison to the delay spread of the precoded channels obtained without the precoder smoothing. As mentioned above, in LTE/LTE-A systems, UE-RS tones, including DMRS tones, are not uniformly spaced across the RBs in frequency domain, which may inhibit IFFT-based channel estimation. Thus, in some examples, the base station 105-d may provide DMRS tones that are spaced uniformly in the frequency domain across the RBs, so that either IFFT-based wide-band channel estimation (suitable for large bandwidth allocations) or RMMSE channel estimation (suitable for small bandwidth allocations) can be applied. However, when IFFT-based channel estimation is employed, the channel estimation mean squared error (MSE) on band-edge tones may be higher than MSE on the in-band tones. In some examples, UE 115-a may apply a hybrid channel estimation scheme by applying IFFT-based channel estimation scheme to obtain the channel estimates for in-band tones, and RMMSE channel estimation scheme to obtain the channel estimates for band-edge tones. RMMSE channel estimation tends to have lower MSE on the band-edges than IFFT-based channel estimation, thus such a hybrid scheme may provide enhanced channel estimation. Additionally or alternatively, in some examples, when the allocated bandwidth includes a dc tone, UE 115-a may divide the allocated bandwidth into two subbands, one on the negative frequency and the other on the positive frequency, and apply the hybrid channel estimation scheme to each subband.

Figure 3:
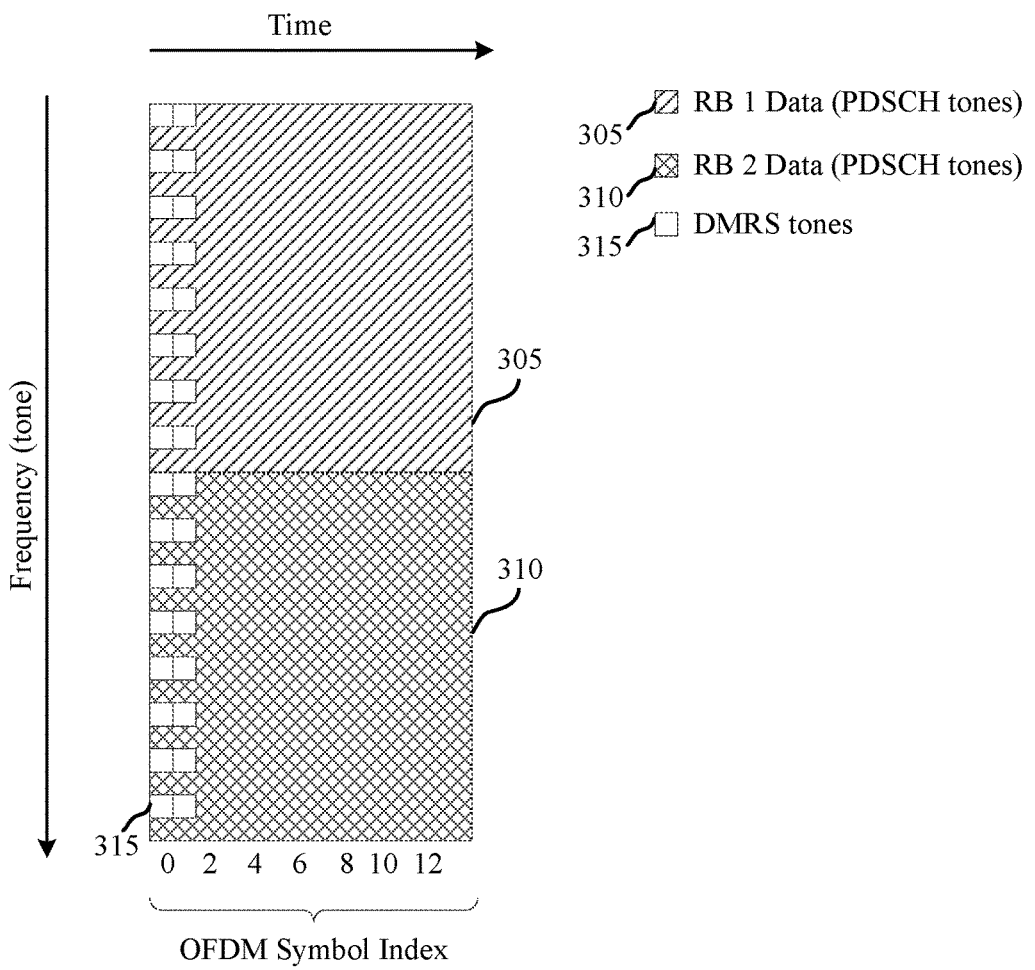
FIG. 3 illustrates an example of wireless resources that support channel estimation techniques using UE-RSs in accordance with one or more aspects of the present disclosure.

FIG. 3 illustrates an example of a resource allocation 300 that may include DMRS tones for channel estimation, in accordance with one or more aspects of the present disclosure. In some cases, resource allocation 300 may represent aspects of an allocation to a UE 115 from a base station 105 as described with reference to FIGS. 1-2. In this example, the resource allocation 300 may include an allocation for a first RB 305 and a second RB 310. DMRS tones 315 may be uniformly spaced in frequency domain, in alternate tones in this example, across the first RB 305 and second RB 310. Such a DMRS tone 315 spacing allows IFFT-based channel estimation to be applied at the UE, as well as RMMSE channel estimation.

Figure 4:
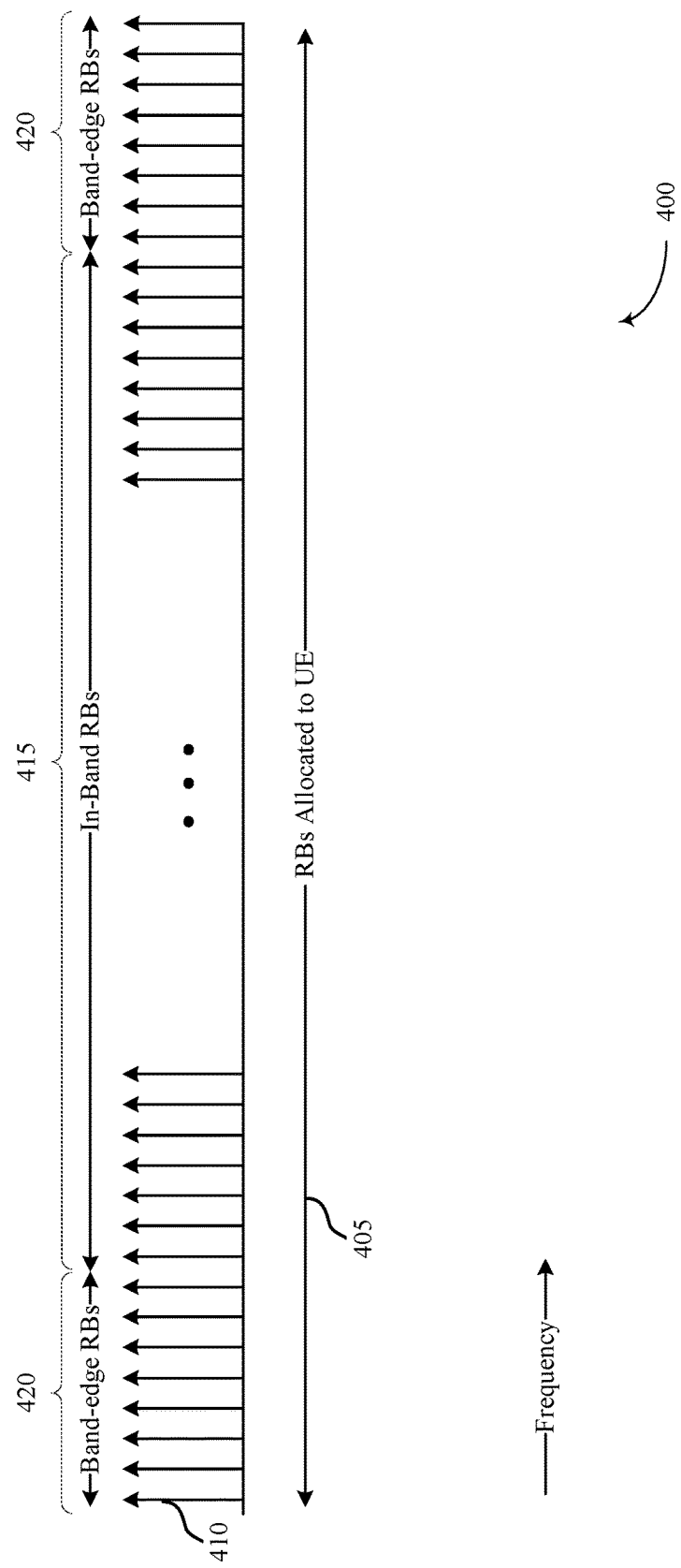
FIG. 4 illustrates an example of UE-RS tones uniformly spaced in an allocated bandwidth that support channel estimation techniques in accordance with one or more aspects of the present disclosure.

FIG. 4 illustrates an example 400 of UE-RS tones uniformly spaced in an allocated bandwidth that support channel estimation techniques, in accordance with one or more aspects of the present disclosure. In some cases, UE-RS tones may enable certain channel estimation techniques to be performed by a UE 115 or base station 105 as described with reference to FIGS. 1-2.

In the example 400 of FIG. 4, contiguous RBs may be transmitted in an allocated bandwidth 405 to a UE (e.g., a UE 115 of FIGS. 1-2). DMRS tones 410 may be provided that are uniformly spaced throughout the allocated bandwidth 405. In some examples, a UE may divide the allocated RBs into in-band RBs 415, band-edge RBs 420 located at the edges of the allocated bandwidth 405. The tones on the band-edge RBs 420, may be referred to as "band-edge tones." The DMRS tones 410 on the band-edge RBs 420, may be referred to as "band-edge DMRS tones." In some examples, as will be discussed in more detail below, the band-edge DMRS tones may be tapered for IFFT-based channel estimation. The rest of the DMRS tones 410 may be referred to as "in-band DMRS tones," located in the in-band RBs 415. The tones on the in-band RBs 415 may be referred to as "in-band tones." In some examples, the channel estimation for the in-band tones may be obtained from IFFT-based channel estimation and the channel estimation for the band-edge tones may be obtained from RMMSE-based channel estimation, according to a hybrid channel estimation technique.

Figure 5:
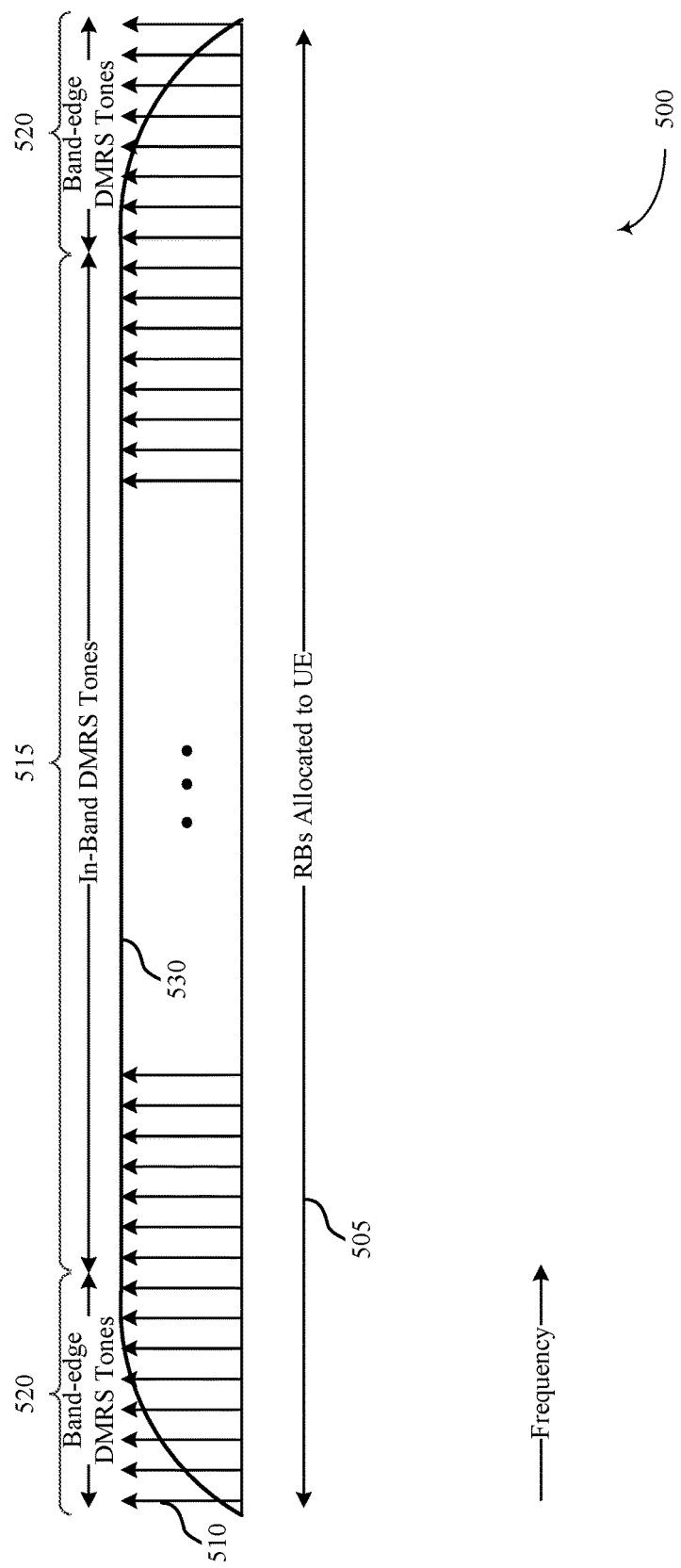
FIG. 5 illustrates an example of UE-RS tones and a tapering function that may be applied to the UE-RS tones, that support channel estimation techniques in accordance with one or more aspects of the present disclosure.

FIG. 5 illustrates an example 500 of UE-RS tones and a tapering function that may be applied to the UE-RS tones, that support channel estimation techniques, in accordance with one or more aspects of the present disclosure. In some cases, example 500 may represent aspects of techniques performed by a UE 115 or base station 105 as described with reference to FIGS. 1-2. In the example 500 of FIG. 5, an allocated bandwidth 505 may include allocated RBs to a UE, which may include uniformly spaced DMRS tones 510. The DMRS tones 510 may include band-edge DMRS tones 520, and in-band DMRS tones 515. As mentioned, a hybrid estimation scheme may be used, in which the band-edge DMRS tones 520 may be tapered such that DMRS tones closest to the band-edge are scaled down by a larger factor than DMRS tones closer to the in-band tones 515, such as illustrated by tapering function 530. Such a tapering function may be, for example, a Hanning window function, which is a taper formed using a weighted cosine, although other tapering functions may also be used.

Following the tapering function, the UE may perform IFFT-based channel estimation for the tones on in-band RB's 415, using the in-band DMRS tones 515 and the tapered band-edge DMRS tones 520. Such an IFFT-based channel estimation may include, in some examples, performing IFFT to obtain a time-domain channel impulse response (CIR), CIR windowing to weight the CIR taps to de-emphasize or remove the noisy CIR taps, zero-padding to the weighted CIR to the size of FFT for interpolation, perform FFT on the zero-padded CIR to interpolate the channel estimates for all the tones, and performing channel prediction of the channel for the tones of the subsequent OFDM symbols. Following the IFFT-based channel estimation, an RMMSE-based channel estimation may be performed for the tones on the band-edge RBs 420, as will be discussed in more detail with reference to FIG. 6.

Figure 6:
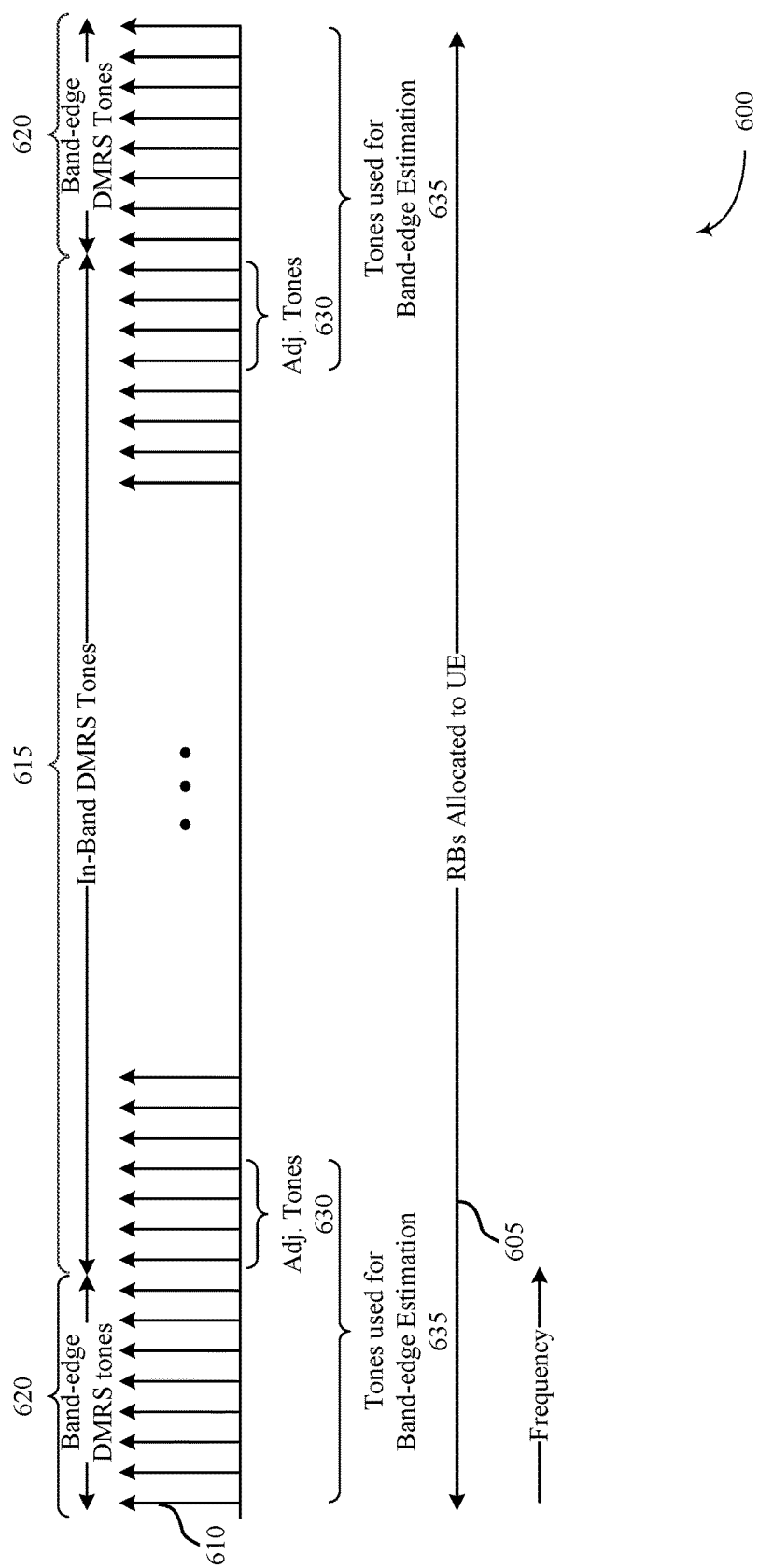
FIG. 6 illustrates an example of UE-RS tones used for band-edge channel estimation techniques in accordance with one or more aspects of the present disclosure.

FIG. 6 illustrates an example 600 of UE-RS tones and RMMSE-based channel estimation that may be applied to the UE-RS tones, that support channel estimation techniques in accordance with one or more aspects of the present disclosure. In some cases, example 500 may represent aspects of techniques performed by a UE 115 or base station 105 as described with reference to FIGS. 1-2. In the example 600 of FIG. 6, an allocated bandwidth 605 may include allocated RBs to a UE, which may include uniformly spaced DMRS tones 610. The DMRS tones 610 may include band-edge DMRS tones 620, and in-band DMRS tones 615.

As discussed above, following an IFFT-based channel estimation, UEs in some examples, may perform RMMSE-based channel estimation for the tones on the band-edge RBs 420. RMMSE channel estimation, however, may also have relatively large MSE on the edges of the subbands. Thus, in some examples, the RMMSE-based channel estimation may use the band-edge DMRS tones 620, and a number of adjacent DMRS tones 630 that are located in the in-band RBs 615, to provide DMRS tones used for band-edge estimation 635. Using the DMRS tones for band-edge estimation 635, the UE may perform RMMSE channel estimation to obtain channel estimates for the band-edge tones. Note that, at times, unlike IFFT-based channel estimation, no tapering is applied to DMRS tones for the RMMSE-based channel estimation. Two channel estimations may be computed, one for the left band-edge, and another for the right band-edge. In some examples, the RMMSE channel estimator may be a MMSE channel estimator with two assumptions on the second order statistics of the channel, a rectangular power delay profile (PDP) for frequency domain correlation, and Jakes model for time domain correlation. The RMMSE-based channel estimations may then be combined with the IFFT-based channel estimations to generate channel estimates that may be used by the UE for receiving downlink transmissions.

Figure 7:
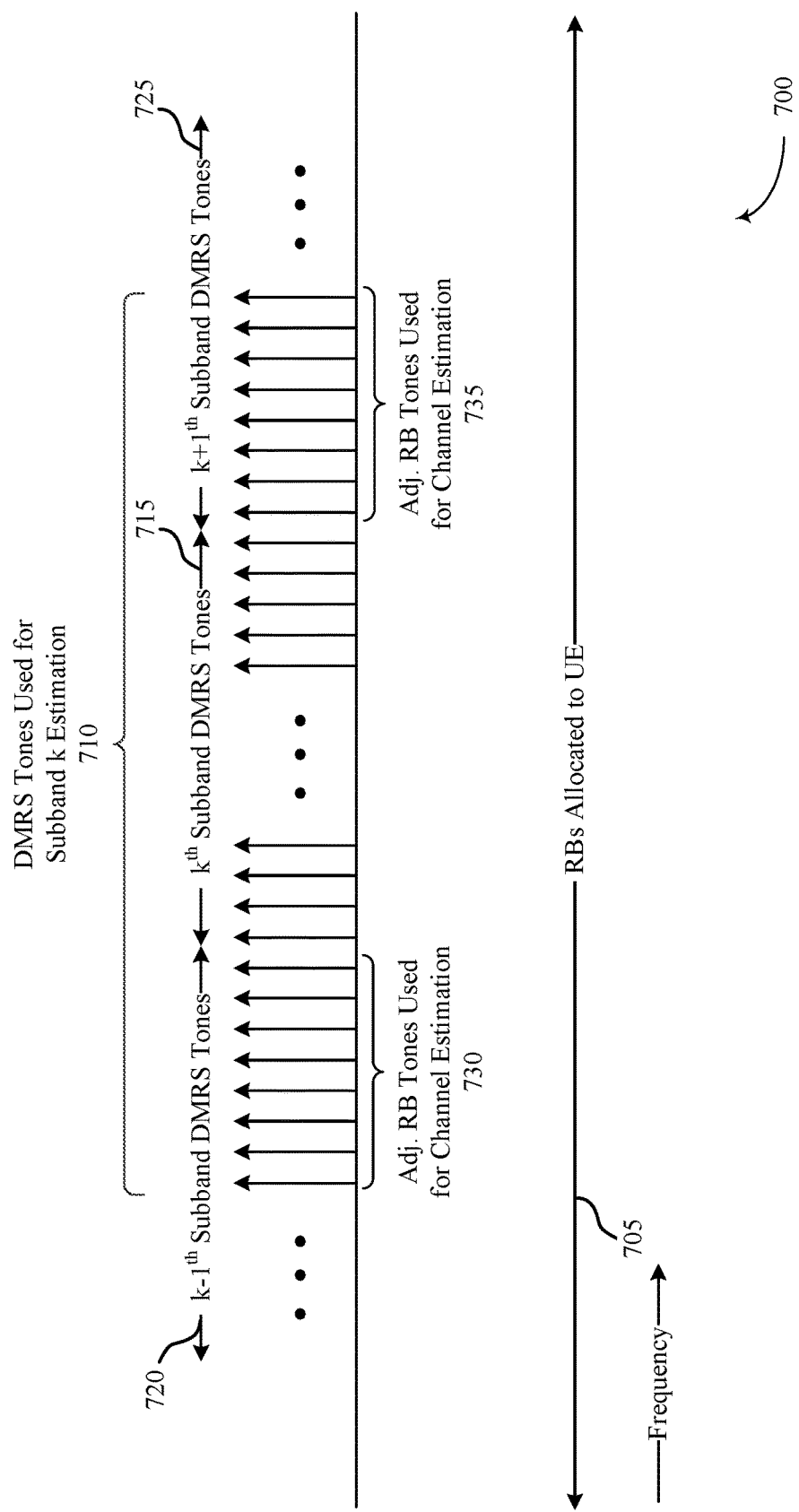
FIG. 7 illustrates an example of UE-RS tones used for channel estimation techniques in bandwidth allocations below a threshold value in accordance with one or more aspects of the present disclosure.

FIG. 7 illustrates an example 700 of UE-RS tones used for channel estimation techniques in bandwidth allocations below a threshold value in accordance with one or more aspects of the present disclosure. In some cases, techniques described with respect to example 700 may be performed by a UE 115 or base station 105 as described with reference to FIGS. 1-2. In the example 700 of FIG. 7, an allocated bandwidth 705 may include allocated RBs to a UE, which may include uniformly spaced DMRS tones, similarly as discussed above. In this example, a relatively narrow bandwidth may be allocated, that is below a threshold for performing IFFT-based channel estimation or a hybrid channel estimation. In such cases, a UE may perform RMMSE-based channel estimation for a number of subbands within the allocated bandwidth. In the example of FIG. 7, DMRS tones for a $k^{th}$ subband 715 are illustrated, along with adjacent DMRS tones of subband k−1 710 and k+1 725.

When performing a channel estimate for subband k using RMMSE-based channel estimation, a UE may use the DMRS tones of subband k 715, along with the DMRS tones 730 on the adjacent RB in subband k−1 720 and DMRS tones 735 on the adjacent RB in subband k+1, to provide the DMRS tones used for subband k estimation 710. As mentioned above, RMMSE channel estimation may also have a relatively large MSE on the edges of the subbands. In order to mitigate this error, the adjacent DMRS tones 730 and 735 are used. When performing the RMMSE-based channel estimation for subband k+1, the UE would similarly use some adjacent DMRS tones from adjacent subbands k and k+2. The different RMMSE-based channel estimates may then be combined to determine a channel estimate based on the DMRS tones.

Figure 8:
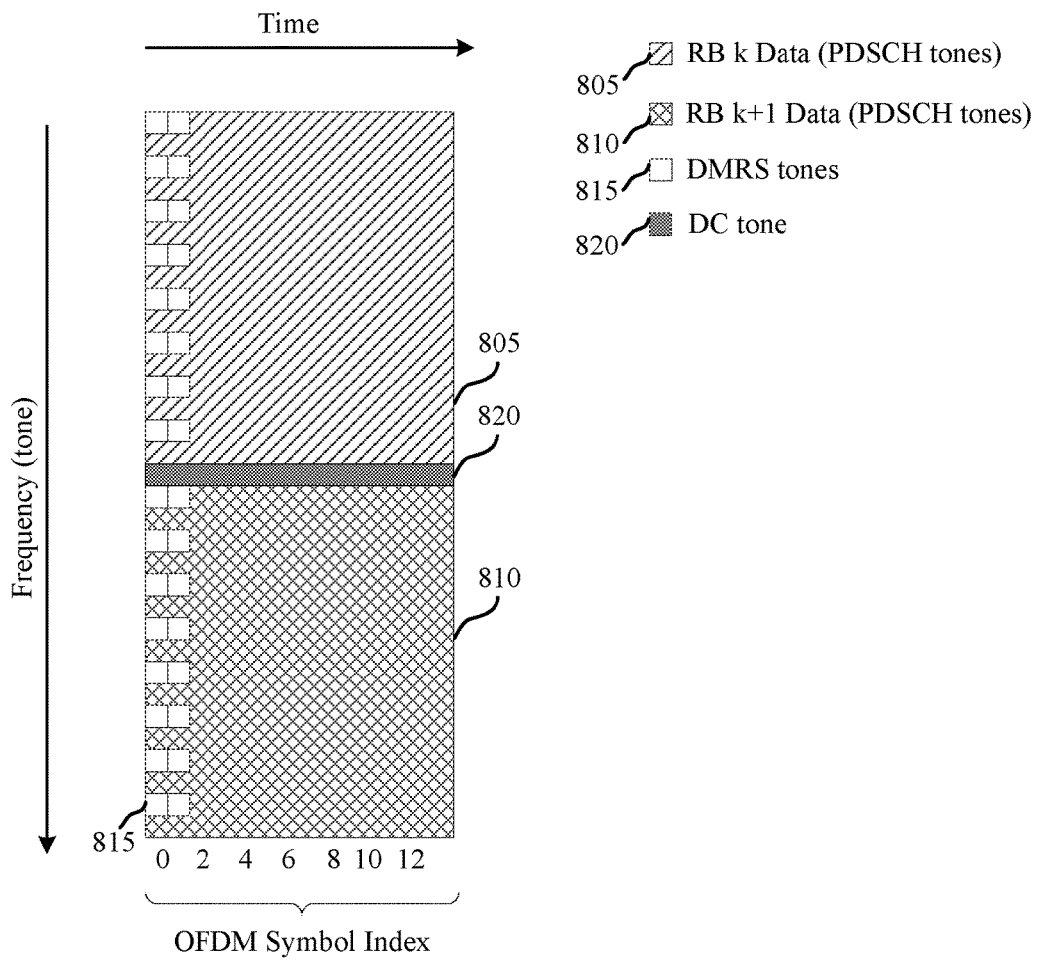
FIG. 8 illustrates an example of wireless resources including a DC tone that support channel estimation techniques using UE-RSs in accordance with one or more aspects of the present disclosure.

FIG. 8 illustrates an example of a resource allocation 800 that may include DMRS tones for channel estimation in accordance with one or more aspects of the present disclosure. In some cases, resource allocation 800 may represent aspects of an allocation to a UE 115 from a base station 105 as described with reference to FIGS. 1-2. In this example, the resource allocation 800 may include an allocation for a first RB 805 (RB k) and a second RB 810 (RB k+1). DMRS tones 815 may be uniformly spaced in frequency domain, in alternate tones in this example, across the first RB 805 and second RB 810. The resource allocation 800 also includes a DC tone 820. The presence of the DC tone 820, however, results in the DMRS tones 815 being non-uniform around the DC tone. This is because a DC tone may not be included as a resource element in the transmit waveform. If IFFT-based channel estimation is applied assuming the uniform DMRS tone spacing, the channel estimation error around the DC tone 820 may be large. In some examples, as will be discussed in more detail with respect to FIG. 9, this problem may be mitigated by applying a RMMSE, IFFT, or hybrid channel estimation scheme as described above to the tones on the negative frequency, and to the tones on the positive frequency, separately.

Figure 9:
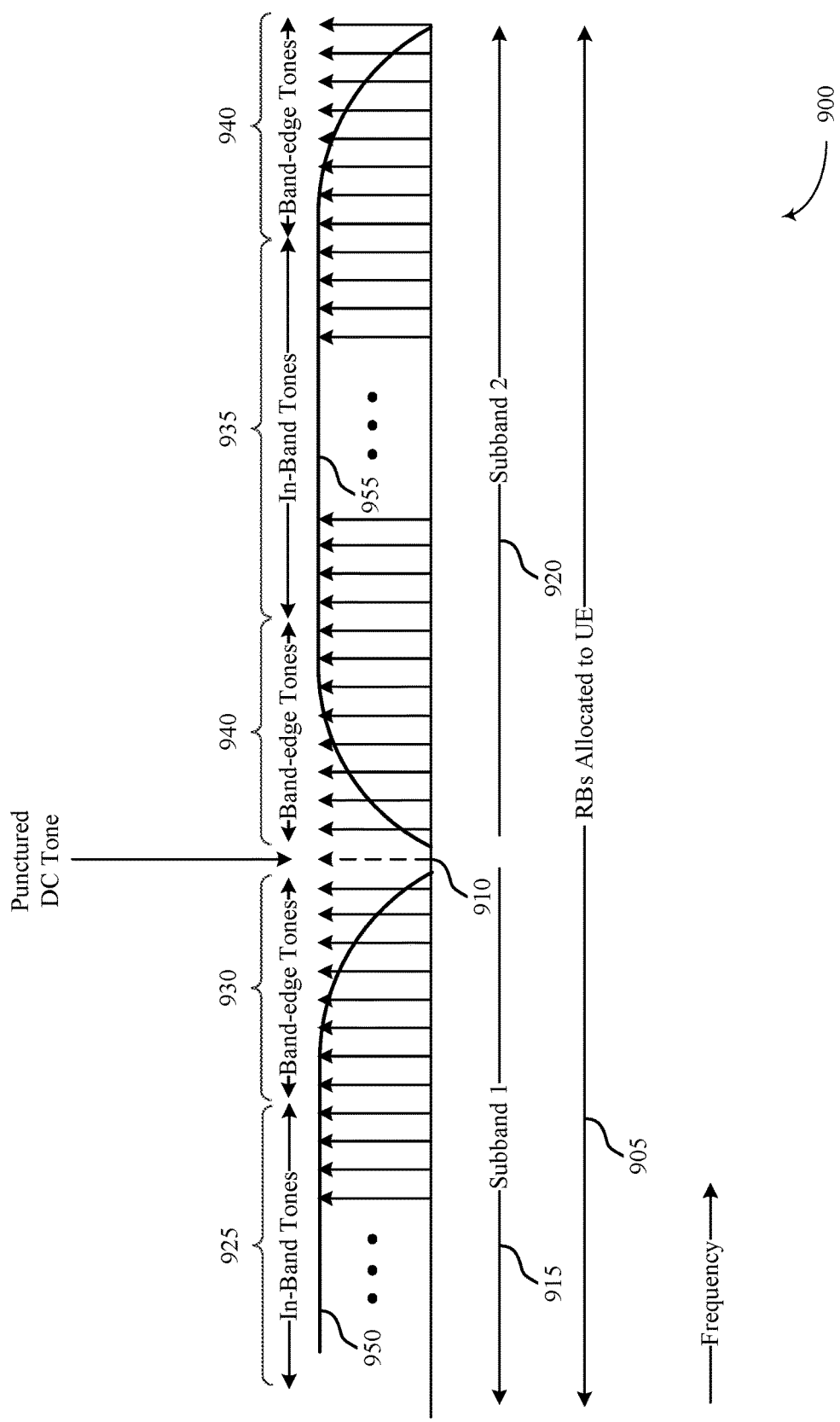
FIG. 9 illustrates an example of UE-RS tones and tapering functions used for channel estimation techniques in bandwidth allocations having a DC tone in accordance with one or more aspects of the present disclosure.

FIG. 9 illustrates an example 900 of UE-RS tones used for channel estimation techniques in bandwidth allocations that include a DC tone in accordance with one or more aspects of the present disclosure. In some cases, techniques described with respect to example 900 may be performed by a UE 115 or base station 105 as described with reference to FIGS. 1-2. In the example 900 of FIG. 9, an allocated bandwidth 905 may include allocated RBs to a UE, which may be punctured by a DC tone 910. Due to the DC tone 910, the DMRS tones may not be uniformly spaced around the DC tone, such as illustrated in FIG. 8. In this example, a UE may divide the allocated bandwidth into a first subband 915 for frequencies below the DC tone 910, and a second subband 920 for frequencies above the DC tone 910.

In some examples, a channel estimation scheme such as discussed above may be applied separately for each of the first subband 915 and the second subband 920. For example, the tones of the first subband 915 may be divided into in-band tones 925 and band-edge tones 930, a tapering function 950 applied to the DMRS tones in the first subband 915, an IFFT-based channel estimation scheme applied to obtain channel estimates for in-band tones in the first sub-band 915, and a RMMSE-based channel estimation scheme applied to obtain the channel estimated for band-edge tones 930. Likewise, the second subband 920 may be divided into in-band tones 935 and band-edge tones 940, a tapering function 955 applied to the DMRS tones in the second subband 920, an IFFT-based channel estimation scheme applied to obtain channel estimates for in-band tones in the second sub-band 920, and a RMMSE-based channel estimation scheme applied to obtain the channel estimates for band-edge tones 940.

Figure 10:
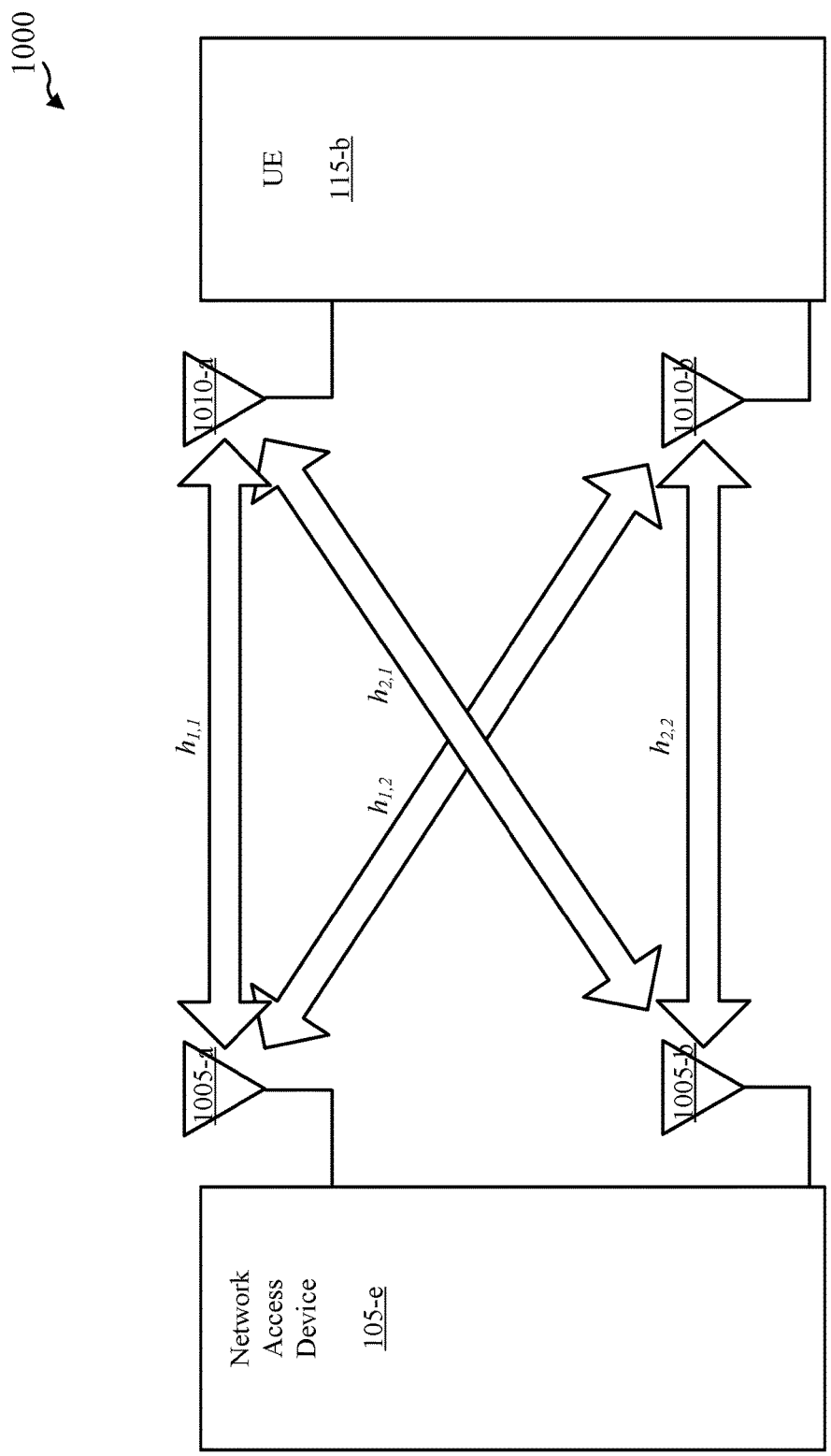
FIG. 10 illustrates an example of a wireless communication system in which downlink beamforming may be used, in accordance with one or more aspects of the present disclosure.

FIG. 10 illustrates an example of a wireless communication system 1000 in which downlink beamforming may be used, in accordance with one or more aspects of the present disclosure. The wireless communication system 1000 includes a network access device 105-*e* and a UE 115-*b*, which may be respective examples of the network access devices 105 and UEs 115 described with reference to FIGS. 1 and 2. The network access device 105-*e* may be, for example, an eNB, an ANC, a radio head, or a base station.

In the example wireless communication system 1000, the number of transmit antennas of the network access device 105-*e* is two (including a first transmit antenna 1005-*a* and a second transmit antenna 1005-*b*), the number of receive antennas of the UE 115-*b* is two (including a first receive antenna 1010-*a* and a second receive antenna 1010-*b*), and the number of transmit streams to be spatially multiplexed on the transmit antennas 1005 and received by the receive antennas 1010 is two (including a first transmit stream, $x_1^k$ and a second transmit stream, $x_2^k$) at some tone k. Symbols from the two transmit streams may be matrix multiplied by a precoder matrix at this tone, $P_k$; transmitted from the transmit antennas 1005 to the receive antennas 1010 over a plurality of channels (e.g., channels $h_{1,2}$, $h_{2,2}$, $h_{2,1}$, and $h_{2,2}$); and received at the UE 115-*b* as received streams $y_1^k$ and $y_2^k$ at some tone k. The precoding matrices $\{P_k\}$ may be different per tone.

The vector of received streams in every tone k, $$y_k = \begin{bmatrix} y_1^k \\ y_2^k \end{bmatrix},$$

can be expressed as follows:

$$\begin{bmatrix} y_1^k \\ y_2^k \end{bmatrix} = H_k \cdot P_k \cdot \begin{bmatrix} x_1^k \\ x_2^k \end{bmatrix} + n_k$$

where $n_k$ represents the received noise and interference vector at the UE 115-*b* at tone k. The two-by-two precoder matrix, $P_k$, may express the way in which transmitted symbols are multiplexed before transmission from the transmit antennas 1005, and $H_k$ is the two-by-two matrix that contains the values of the four channels $h_{1,2}$, $h_{2,2}$, $h_{2,1}$, and $h_{2,2}$ for tone k.

In one aspect of the wireless communication system 1000, the network access device 105-*e* may have more or fewer transmit antennas 1005 and may transmit more or fewer transmit streams. Similarly, the UE 115-*b* may have more or fewer receive antennas 1010 and may receive more or fewer received streams. The number of transmit antennas may be less than, equal to, or greater than the number of receive antennas. In some examples, the wireless communication system 1000 may include a plurality of UEs, and the network access device 105-*e* may transmit different transmit streams to different UEs, using the same or different transmit antennas. The set of precoding matrices, $\{P_k\}$, where k is the tone index, may be used to provide downlink beamforming for the transmit streams.

Figure 11:
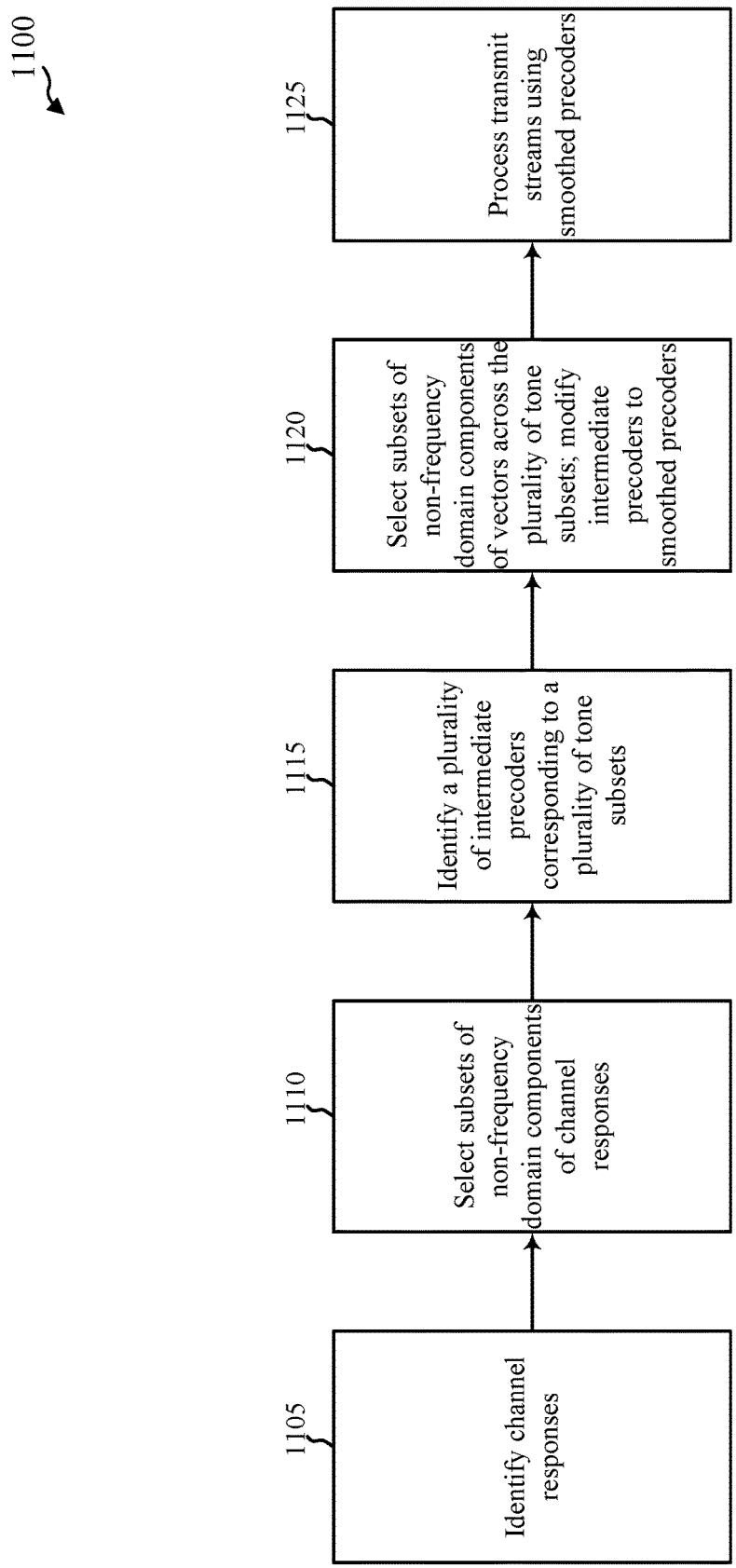
FIG. 11 shows a process flow for wireless communication, in accordance with one or more aspects of the present disclosure.

FIG. 11 shows a process flow 1100 for wireless communication, in accordance with one or more aspects of the present disclosure. The process flow 1100 may be performed by a network access device (e.g., an eNB, an ANC, a radio head, or a base station), such as one of the network access devices 105 described with reference to FIG. 1, 2, or 10.

At block 1105, the network access device may identify a plurality of channel responses corresponding to a plurality of channels. Each channel of the plurality of channels may correspond to a pairing of a transmit antenna (of the network access device) with a receive antenna (e.g., of a UE). Each of the channel responses may be represented by a channel frequency response across a plurality of tone subsets, such as the plurality of tone subsets as defined for the array of channel estimates. In some examples, a plurality of tone subsets, such as the plurality of tone subsets defined for the array of channel estimates, may be dispersed across, or may define, a system bandwidth. In some examples, a plurality of tone subsets may include single tone subsets. In some examples, a plurality of tone subsets may include tone bundles, in which case each tone bundling includes a plurality of tones and the index "k" is used to refer to a channel matrix or precoder that corresponds to all the tones inside the respective tone subset.

At block 1110, the network access device may select, for each channel of the plurality of channels, a subset of non-frequency domain components (e.g., a subset of time domain components) of the channel response for the channel. In some examples, the selection of a subset of non-frequency domain components of a channel response can be considered a "pruning" of the channel response.

At block 1115, the network access device may identify a plurality of intermediate precoders corresponding to the plurality of tone subsets defined for the plurality of intermediate precoders. The plurality of intermediate precoders may define a plurality of vectors across the plurality of tone subsets defined for the plurality of intermediate precoders. In some examples, the plurality of intermediate precoders may be identified based at least in part on the selected subset of non-frequency domain components for each channel of the plurality of channels. In some examples, each vector of the plurality of vectors may correspond to a different transmit stream, or to a different combination of transmit stream and transmit antenna.

At block 1120, the network access device may select, for each vector of the plurality of vectors, a subset of non-frequency domain components of the vector. In some examples, the selection of a subset of non-frequency domain components of a vector can be considered a "pruning" of the vector. Also at block 1120, the plurality of intermediate precoders may be modified to a plurality of smoothed precoders based at least in part on the selected subset of non-frequency domain components of each vector. The plurality of smoothed precoders may be smoothed in a frequency domain compared to the plurality of intermediate precoders.

At block 1125, the network access device may process a plurality of transmit streams using the plurality of smoothed precoders. In some cases, the network access device may transmit a signal, such as through DCI which may be a part of a PDCCH, which indicates that the precoders are smoothed. Additionally or alternatively, the network access device may transmit a signal, such as through a control channel, which indicates that the precoders are per tone. By indicating that the precoders are per tone, the network access device may signal to a UE that wideband channel estimation techniques, such as IFFT-based channel estimation or a hybrid channel estimation technique, may be used.

In some examples, the process flow 1100 may include the pruning at block 1110 or the pruning at block 1120. In other examples, the process flow 1100 may include the pruning at block 1110 and the pruning at block 1120. Further details of the operations performed at blocks 1105, 1110, 1115, 1120, and 1125 are described with reference to FIGS. 12A, 12B, 12C, 12D, 12E, 13, 14A, 14B, 15, 16A, and 16B. FIGS. 12A, 12B, 12C, 12D, and 12E describe a progression of operations that may be performed during a process flow such as the process flow 1100.

Figure 12A:
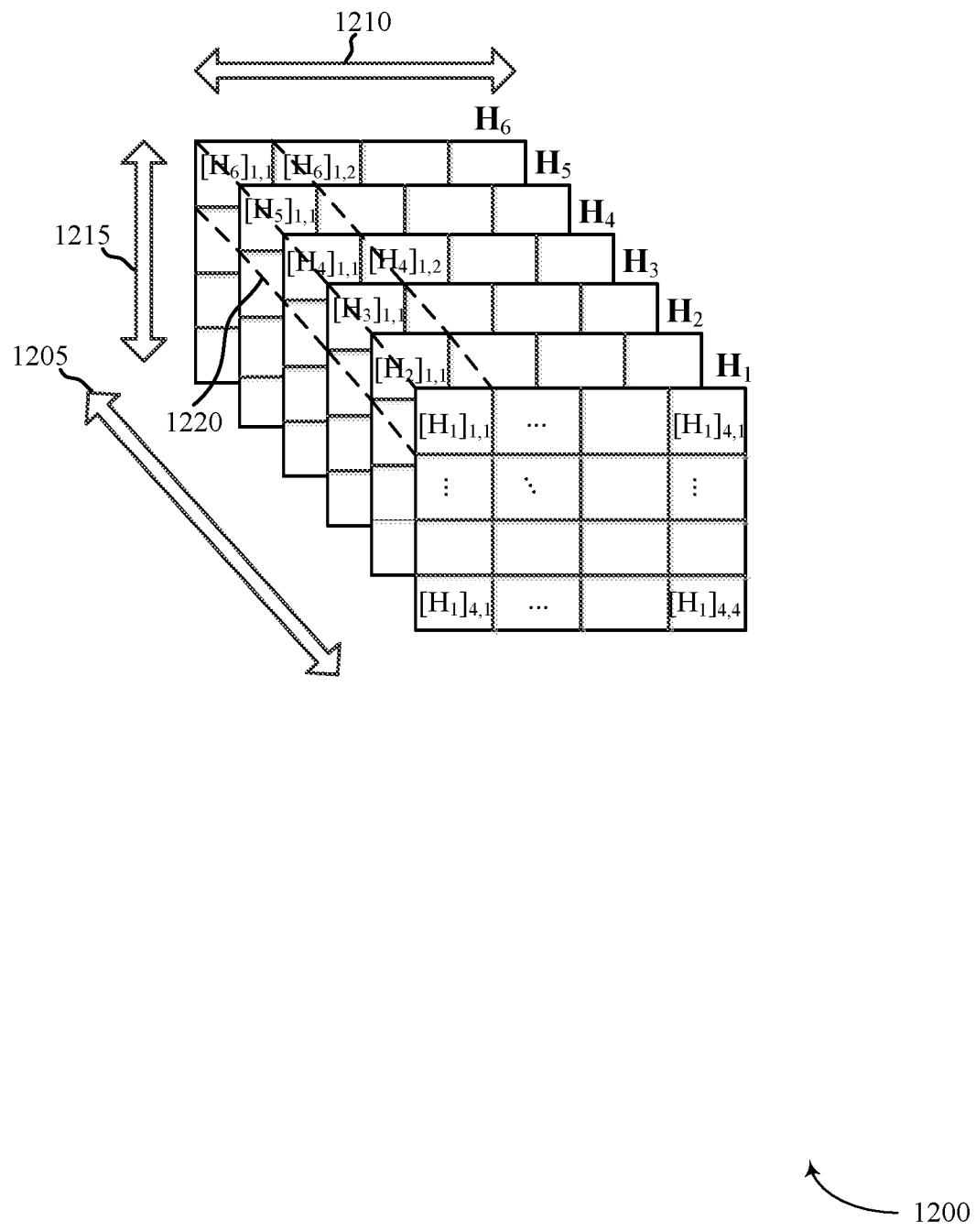
FIG. 12A shows an example of an array of channel estimates, in accordance with one or more aspects of the present disclosure.

FIG. 12A shows an example of an array of channel estimates 1200, in accordance with one or more aspects of the present disclosure. The array of channel estimates 1200 may be identified (e.g., received and/or determined) by a network access device (e.g., an eNB, an ANC, a radio head, or a base station), such as one of the network access devices 105 described with reference to FIG. 1, 2, or 10.

By way of example, the array of channel estimates 1200 is shown to have a first dimension 1205 defined by a plurality of tone subsets (e.g., 6 tone subsets) defined for the array of channel estimates 1200. In some examples, the plurality of tone subsets may include single tone subsets. In some examples, the plurality of tone subsets may include tone bundles. In some examples, the plurality of tone subsets may dispersed across, or may define, a system bandwidth (BW) of a network access device. By way of further example, the array of channel estimates 1200 is shown to have a second dimension 1210 defined by a number of transmit antennas (e.g., 4 transmit antennas) of the network access device, and a third dimension 1215 defined by a number of receive antennas (e.g., 4 receive antennas) of a UE. A plurality of channels are defined by the intersections of columns and rows of the array of channel estimates 1200, where the columns correspond to the transmit antenna and the rows correspond to the receive antennas. For each channel, a set of channel estimates $[H_k]_{i,j}$ may be identified, where k is the $k^{th}$ tone subset in the first dimension 1205, i is the $i^{th}$ receive antenna in the third dimension 1215, and j is the $j^{th}$ transmit antenna in the second dimension 1210. An array of channel estimates associated with a tone subset, k, is designated $H_k$.

In some examples, a network access device may identify (e.g., determine) at least one of the channel estimates using reciprocal channel estimation. For example, the network access device may receive and measure at least one pilot signal received over at least one receive channel and determine at least one of the channel estimates, $[H_k]_{i,j}$, for at least one transmit channel. In some examples, a pilot signal may include a sounding reference signal (SRS) transmitted by a UE. In some examples, a network access device may identify (e.g., determine) at least one of the channel estimates for at least one transmit channel based at least in part on CSI received for the at least one transmit channel.

In some examples, just some of the channel estimates, $[H_k]_{i,j}$, may be identified. In some examples, at least one channel estimate may be identified based at least in part on at least one other channel estimate. In some examples, at least one channel estimate may be identified based at least in part on an average of other channel estimates.

A channel response is defined as the subset of channel estimates corresponding to a pairing of a transmit antenna with a receive antenna, across the plurality of tone subsets defined for the array of channel estimates 1200. For example, a first channel response 1220 may include the channel estimates $[H_1]_{1,1}$, $[H_2]_{1,1}$, $[H_3]_{1,1}$, $[H_4]_{1,1}$, $[H_5]_{1,1}$, and $[H_6]_{1,1}$.

When the tone subsets include tone bundles, a channel estimate $[H_k]_{i,j}$ may be a channel estimate that corresponds to each of a plurality of adjacent tones in a tone bundle (e.g., a channel estimate $[H_k]_{i,j}$ may be the channel estimate at the middle tone of a tone bundle, or an average channel estimate for the tones of a tone bundle).

Figure 12B:
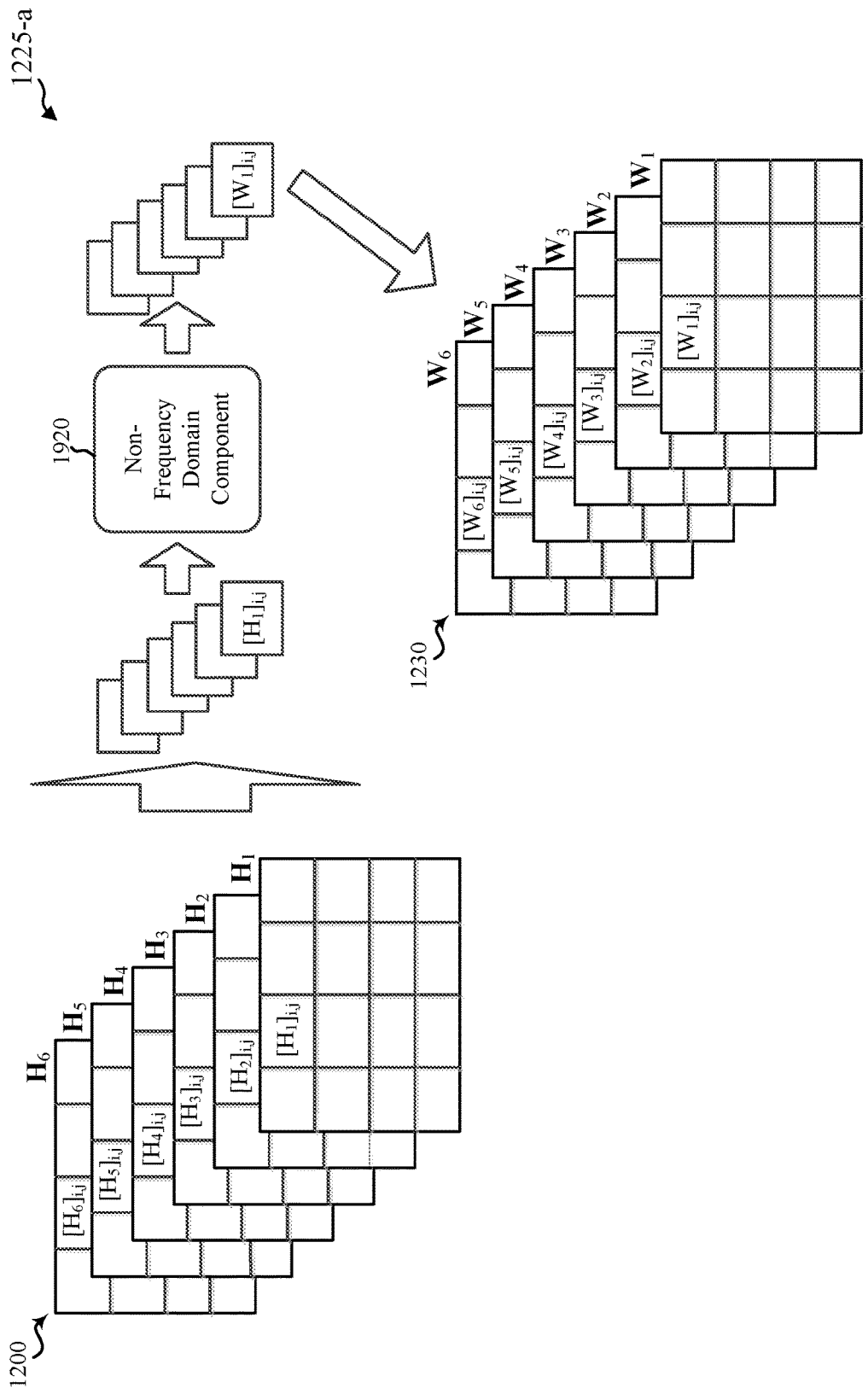
FIG. 12B shows an example process flow for selecting a subset of non-frequency domain components of a channel response for a channel, in accordance with one or more aspects of the present disclosure.

FIG. 12B shows an example process flow 1225-a for selecting a subset of non-frequency domain components of a channel response for a channel, in accordance with one or more aspects of the present disclosure. The process flow 1225-a may be performed by a network access device (e.g., an eNB, an ANC, a radio head, or a base station), such as one of the network access devices 105 described with reference to FIG. 1, 2, or 10. The process flow 1225-a may receive, as an input, the array of channel estimates 1200 described with reference to FIG. 12A.

The process flow 1225-a may be executed serially or in parallel for each channel response (or vector) $h_{i,j}$, where $h_{i,j} = \{[H_1]_{i,j}; [H_2]_{i,j}; [H_3]_{i,j}; \ldots\}$. A channel response $h_{i,j}$ may be provided as input to a non-frequency domain component 1920. The non-frequency domain component 1920 may select, such as for each channel response, a subset of non-frequency domain components of the channel response. The subset of non-frequency domain components of a channel response is designated $w'_{i,j} = \{[w_1]_{i,j}; [w_2]_{i,j}; [w_3]_{i,j}; \ldots\}$. The subset of non-frequency domain components of a channel response, $w'_{i,j}$, may be translated back to the frequency domain as $w_{i,j}$. Some of the values $[w_k]_{i,j}$ may be zero values. Each subset of non-frequency domain components selected by the non-frequency domain component 1920 may be used to generate and output a modified array of channel estimates 1230, $W_k$, for tone subset k as defined for the modified array of channel estimates 1230, with vectors $w_{i,j} = \{[W_1]_{i,j}; [W_2]_{i,j}; [W_3]_{i,j}; \ldots\}$ (i.e., a modified version of the array of channel estimates 1200, which modified version is based at least in part on the subsets of non-frequency domain components selected for each channel response input to the non-frequency domain component 1920). In some examples, the subsets of non-frequency domain components may be selected, by the non-frequency domain component 1920, to make each channel response of the modified array of channel estimates 1230 more sparse or more compact in the non-frequency domain. In some examples, the non-frequency domain components selected by the non-frequency domain component 1920 may include time domain components.

In some cases, the plurality of tone subsets defined for the modified array of channel estimates 1230 may be different from the plurality of tone subsets defined for the array of channel estimates 1200. For example, there may be three tone subsets defined for the array of channel estimates 1200 and six tone subsets defined for the modified array of channel estimates 1230. At times, there may be four tone subsets defined for the array of channel estimates 1200 and two tone subsets defined for the modified array of channel estimates 1230. It should be noted that the number of tone subsets is not limiting and may include any number of tones, or tone subsets. In some examples, the plurality of tone subsets defined for the modified array of channel estimates 1230 may include the same number of tone subsets as the plurality of tone subsets defined for the array of channel estimates 1200. The plurality of tone subsets defined for the modified array of channel estimates 1230 may be the same tone subsets as the plurality of tone subsets defined for the array of channel estimates 1200, for example tone subset 1 defined for the modified array of channel estimates 1230 may correspond to tone subset 1 defined for the array of channel estimates 1200, or the tone subsets may be different.

Figure 12C:
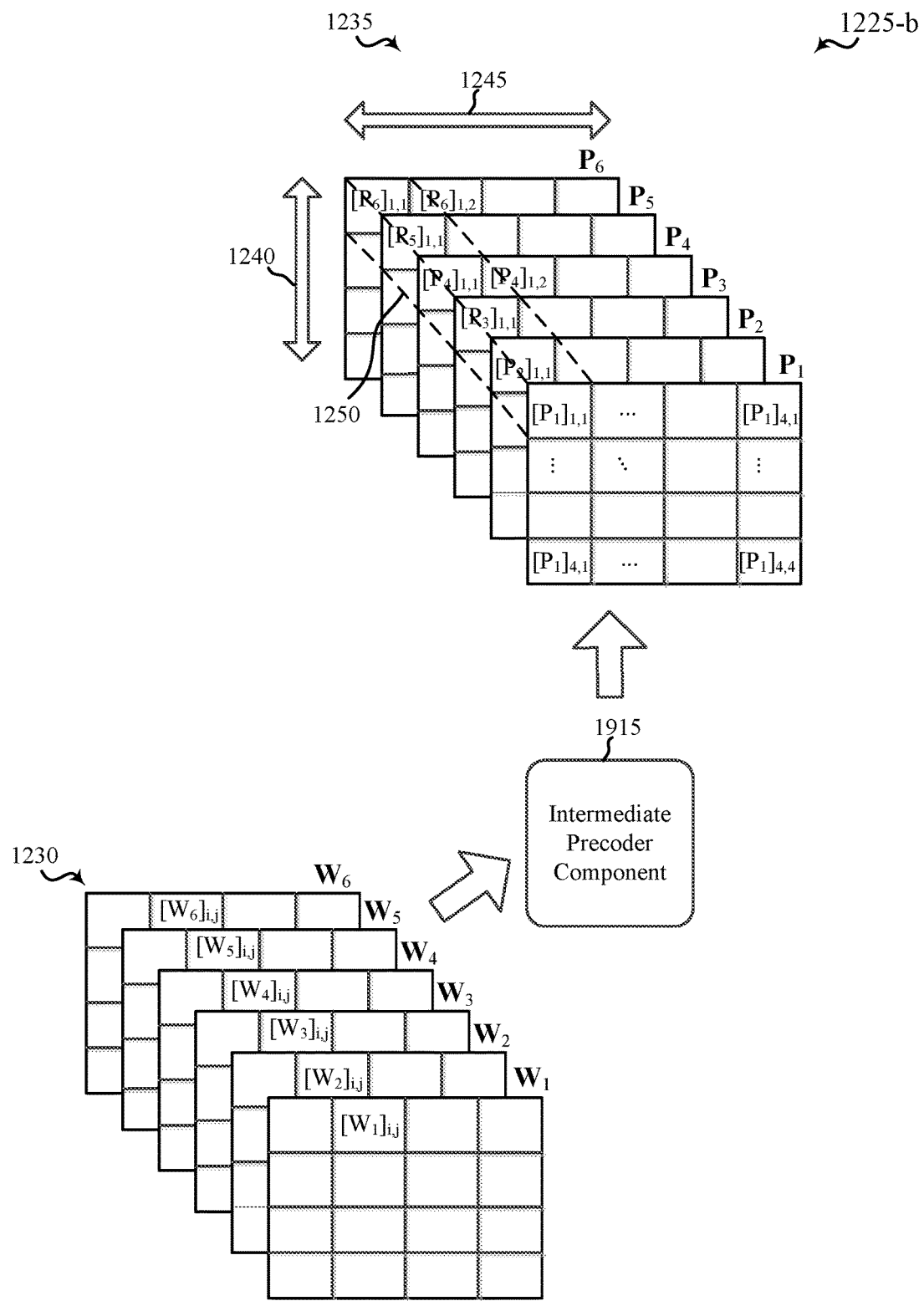
FIG. 12C shows an example process flow for identifying a plurality of intermediate precoders corresponding to a plurality of tone subsets, in accordance with one or more aspects of the present disclosure.

FIG. 12C shows an example process flow 1225-*b* for identifying a plurality of intermediate precoders corresponding to a plurality of tone subsets defined for the intermediate precoders, in accordance with one or more aspects of the present disclosure. The process flow 1225-*b* may be performed by a network access device (e.g., an eNB, an ANC, a radio head, or a base station), such as one of the network access devices 105 described with reference to FIG. 1, 2, or 10. The process flow 1225-*b* may receive, as an input, the modified array of channel estimates 1230 described with reference to FIG. 12B.

The modified array of channel estimates 1230 may be used by an intermediate precoder component 1915 to identify a plurality of intermediate precoders 1235 (e.g., precoders $P_1, P_2, P_3, P_4, P_5,$ and $P_6$) corresponding to a plurality of tone subsets, such as tone subsets defined for the intermediate precoders 1235. In some cases, the plurality of tone subsets defined for the intermediate precoders 1235 may be different from, such as the union of, a number of the plurality of tone subsets defined for the modified array of channel estimates 1230. For example, $P_1$ may correspond to the first tone subset, the second tone subset, and the third tone subset of the modified array of channel estimates 1230, and/or $P_2$ may correspond to the fourth tone subset and the sixth tone subset of the modified array of channel estimates 1230. Further, in some cases, the plurality of tone subsets defined for the intermediate precoders 1235 is the same as the plurality of tone subsets defined for the modified array of channel estimates 1230. For example, $P_1$ may correspond to the first tone subset (or the fourth tone subset) of the modified array of channel estimates 1230, $P_2$ may correspond to the second tone subset (or the third tone subset) of the modified array of channel estimates 1230, etc. In one aspect, the plurality of tone subsets defined for an intermediate precoder may be a subset of the plurality of tone subsets defined for the modified array of channel estimates 1230. For example, $P_1$, $P_2$, and $P_4$ may correspond to the fifth tone subset of the modified array of channel estimates 1230.

In some examples, a plurality of tone subsets, such as the plurality of tone subsets defined for the intermediate precoders 1235, may include single tone subsets. In some examples, a plurality of tone subsets may include tone bundles. In some examples, a plurality of tone subsets, such as the plurality of tone subsets defined for the intermediate precoders 1235, may be dispersed across, or may define, a system bandwidth (BW) of a network access device. By way of example, each precoder, $P_k$, is shown to have a first dimension 1240 defined by a number of transmit antennas (e.g., 4 transmit antennas) of a network access device, and a second dimension 1245 defined by a number of transmit streams (e.g., 4 transmit streams) to be spatially multiplexed and transmitted from the transmit antennas. For each intersection of a column and a row of a precoder, where the rows correspond to transmit streams and the columns correspond to transmit antennas, a precoder value, $[P_k]_{s,i}$, may be identified (e.g., determined or looked up). For the precoder value $[P_k]_{s,i}$, k is the $k^{th}$ tone subset defined for the intermediate precoders 1235, s is the $s^{th}$ transmit antenna, and i is the $i^{th}$ transmit stream.

When the tone subsets defined for the intermediate precoders 1235 include tone bundles, the precoders, $P_k$, may be precoders that correspond to each of a plurality of adjacent tones in a tone bundle. At times, an intermediate precoder 1235, such as the precoders, $P_k$, may be fixed or constant for all tones inside a tone bundle.

In some examples, the plurality of intermediate precoders 1235 may be generated based at least in part on singular value decomposition (SVD) precoder design techniques or matched filtering precoder design techniques. When SVD precoder design techniques are used, the angle between the two eigenvectors that correspond to the same channel in adjacent tone subsets (i.e., first and second tone subsets) may be checked to determine whether the angle is between $$[-\frac{\pi}{2}, \frac{\pi}{2}].$$

When the angle is not between $$[-\frac{\pi}{2}, \frac{\pi}{2}],$$

the sign in the eigenvector of the second tone subset may be flipped. The plurality of intermediate precoders 1235 may define a plurality of vectors across the plurality of tone subsets defined for the intermediate precoders 1235. For example, a first vector 1250 may include the precoder values $[P_1]_{1,1}$, $[P_2]_{1,1}$, $[P_3]_{1,1}$, $[P_4]_{1,1}$, $[P_5]_{1,1}$, and $[P_6]_{1,1}$. In some examples, each vector of the plurality of vectors may correspond to a different transmit stream, or to a different combination of transmit stream and transmit antenna. In some examples, each of the plurality of tone subsets of the modified array of channel estimates has a single tone, and each of the plurality of tone subsets of the intermediate precoders has $N_{tones}$ tones with indeces of each tone $m_1, \ldots, m_{N_{tones}}$ which may correspond to the SVD of the correlation matrix $$G = \frac{1}{N_{tones}} \sum_{m=m_1}^{m_{N_{tones}}} W_m^* W_m,$$

which is used for all the tones in the tone subset defined for the intermediate precoders 1235 (constant precoder inside each tone subset). In some cases, a tone subset k may be a subset of the tone indeces $m_{N_{tones}}$, for example tone index $m_2$ may include tone subsets $k_1$, $k_2$, and $k_4$, each of which may include a number of tones. In some examples, tone index $m_{N_{tones}}$ may be a subset of a tone subset k. At times, the precoder may then be smoothed, which may result in the precoder no longer being constant inside any tone subset.

Figure 12D:
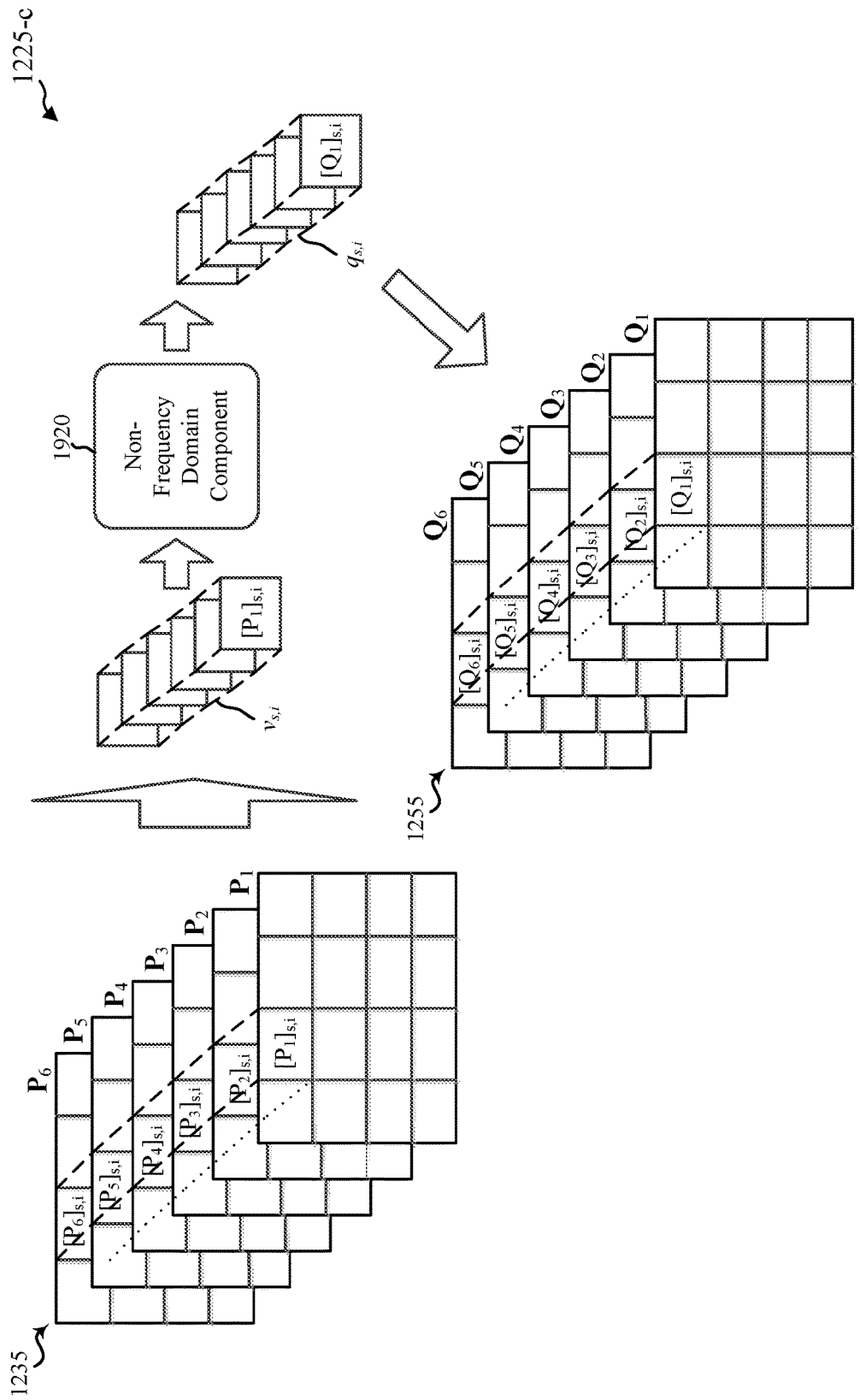
FIG. 12D shows an example process flow for selecting a subset of non-frequency domain components of a vector defined across a plurality of intermediate precoders, in accordance with one or more aspects of the present disclosure.

FIG. 12D shows an example process flow 1225-*c* for selecting a subset of non-frequency domain components of a vector defined across a plurality of intermediate precoders, in accordance with one or more aspects of the present disclosure. The process flow 1225-*c* may be performed by a network access device (e.g., an eNB, an ANC, a radio head, or a base station), such as one of the network access devices 105 described with reference to FIG. 1, 2, or 10. The process flow 1225-*c* may receive, as an input, the plurality of intermediate precoders 1235 described with reference to FIG. 12C.

The process flow 1225-*c* may be executed serially or in parallel for each vector $v_{s,i}$, where $v_{s,i} = \{[P_1]_{s,i}; [P_2]_{s,i}; [P_3]_{s,i}; \ldots\}$. By way of example, FIG. 12D shows a vector $v_{s,i}$ being provided as input to a non-frequency domain component 1920. The non-frequency domain component 1920 may select, for each vector of the plurality of vectors, a subset of non-frequency domain components of the vector. The subset of non-frequency domain components of a vector is designated $q'_{s,i} = \{[q_1]_{s,i}; [q_2]_{s,i}; [q_3]_{s,i}; \ldots\}$. The subset of non-frequency domain components of a vector, $q'_{s,i}$, may be translated back to the frequency domain as $q_{s,i}$. Some of the values $[q_k]_{s,i}$ may be zero values. Each subset of non-frequency domain components selected by the non-frequency domain component 1920 may be used by the non-frequency domain component 1920 to modify the plurality of intermediate precoders 1235 to a plurality of smoothed precoders 1255, $Q_k$, for tone subset k as defined for the smoothed precoders 1255, with vectors $q_{s,i} = \{[Q_1]_{s,i}; [Q_2]_{s,i}; [Q_3]_{s,i}; \ldots\}$. For example, the vector with a subset of non-frequency domain components, $q'_{s,i}$, may be combined with other vectors with a subset of non-frequency domain components representing other transmit streams and/or transmit antennas to create modified precoders, which may be smoothed precoders 1255. Specifically, at times, $q'_{1,1}$ may be combined with $q'_{1,2}$, $q'_{1,3}$, $q'_{1,4}$, $q'_{2,1}$, etc., which when combined and transformed into the frequency domain, may result in smoothed precoders 1255 $Q_1$, $Q_2$, $Q_3$, $Q_4$, $Q_5$, and $Q_6$. The plurality of smoothed precoders 1255 may be smoothed in a frequency domain compared to the plurality of intermediate precoders 1235. In some examples, the subsets of non-frequency domain components may be selected, by the non-frequency domain component 1920, to make each vector across the smoothed precoders 1255 more sparse or more compact in the non-frequency domain. In some examples, the non-frequency domain components selected by the non-frequency domain component 1920 may include time domain components.

In some cases, the plurality of tone subsets defined for the smoothed precoders 1255 may be different from the plurality of tone subsets defined for the intermediate precoders 1235. For example, there may be three tone subsets defined for the intermediate precoders 1235 and six tone subsets defined for the smoothed precoders 1255. At times, there may be four tone subsets defined for the intermediate precoders 1235 and two tone subsets defined for the smoothed precoders 1255. It should be noted that the number of tone subsets is not limiting and may include any number of tones, or tone subsets. In some examples, the plurality of tone subsets defined for the smoothed precoders 1255 may include the same number of tone subsets as the plurality of tone subsets defined for the intermediate precoders 1235. The plurality of tone subsets defined for the smoothed precoders 1255 may be the same tone subsets as the plurality of tone subsets defined for the intermediate precoders 1235, for example tone subset 1 defined for the smoothed precoders 1255 may correspond to tone subset 1 defined for the intermediate precoders 1235, or the tone subsets may be different.

In some examples, the smoothed precoders 1255 may be normalized based at least in part on at least one transmit power constraint.

Figure 12E:
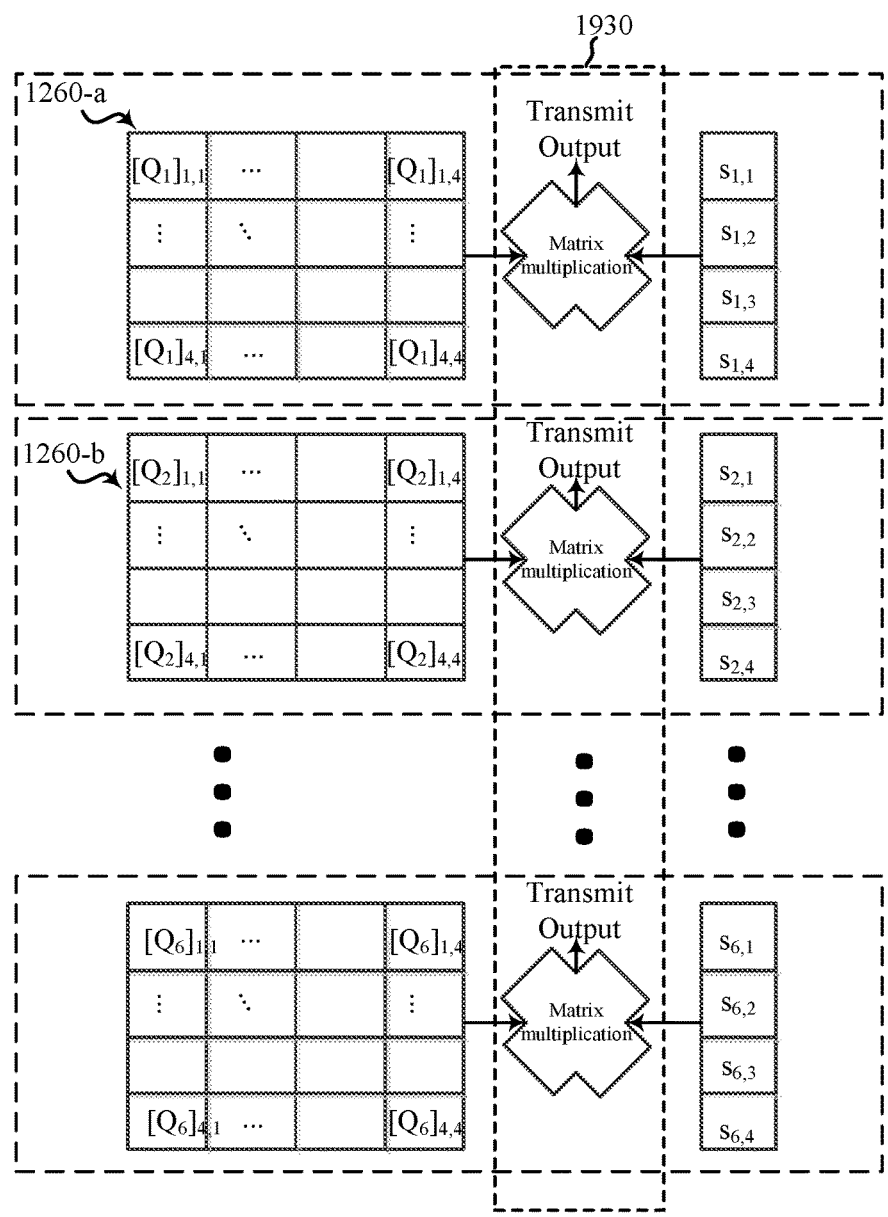
FIG. 12E shows an example process flow for processing a plurality of transmit signal streams using a plurality of smoothed precoders, in accordance with one or more aspects of the present disclosure.

FIG. 12E shows an example process flow 1225-*d* for processing a plurality of transmit signal streams using a plurality of smoothed precoders, in accordance with one or more aspects of the present disclosure. The process flow 1225-*d* may be performed by a network access device (e.g., an eNB, an ANC, a radio head, or a base station), such as one of the network access devices 105 described with reference to FIG. 1, 2, or 10. The process flow 1225-*d* may receive, as an input, the plurality of smoothed precoders 1255 described with reference to FIG. 12D.

As shown in FIG. 12E, the precoder values of a first precoder 1260-*a* (e.g., a smoothed precoder $Q_1$) corresponding to a first tone subset defined for the smoothed precoders may be matrix multiplied with the symbols of a set of transmit streams that are to be transmitted on the first tone subset (e.g., the symbols $s_{1,1}$, $s_{1,2}$, $s_{1,3}$, and $s_{1,4}$ of the transmit streams $s_1$, $s_2$, $s_3$, and $s_4$), such as the first tone subset defined for the smoothed precoders. Similarly, the precoder values of a second precoder 1260-*b* (e.g., a smoothed precoder $Q_2$) corresponding to a second tone subset defined for the smoothed precoders may be matrix multiplied with the symbols of the set of transmit streams to be transmitted on the second tone subset (e.g., the symbols $s_{2,1}$, $s_{2,2}$, $s_{2,3}$, and $s_{2,4}$ of the transmit streams $s_1$, $s_2$, $s_3$, and $s_4$), such as the second tone subset defined for the smoothed precoders. Other precoder values of other smoothed precoders corresponding to other tone subsets defined for the smoothed precoders may be matrix multiplied with the symbols of the set of transmit streams to be transmitted on the other tone subsets, such as other tone subsets defined for the smoothed precoders. In some examples, the matrix multiplying performed for each of the tone subsets defined for the smoothed precoders may be performed by a stream precoding component 1930.

Figure 13:
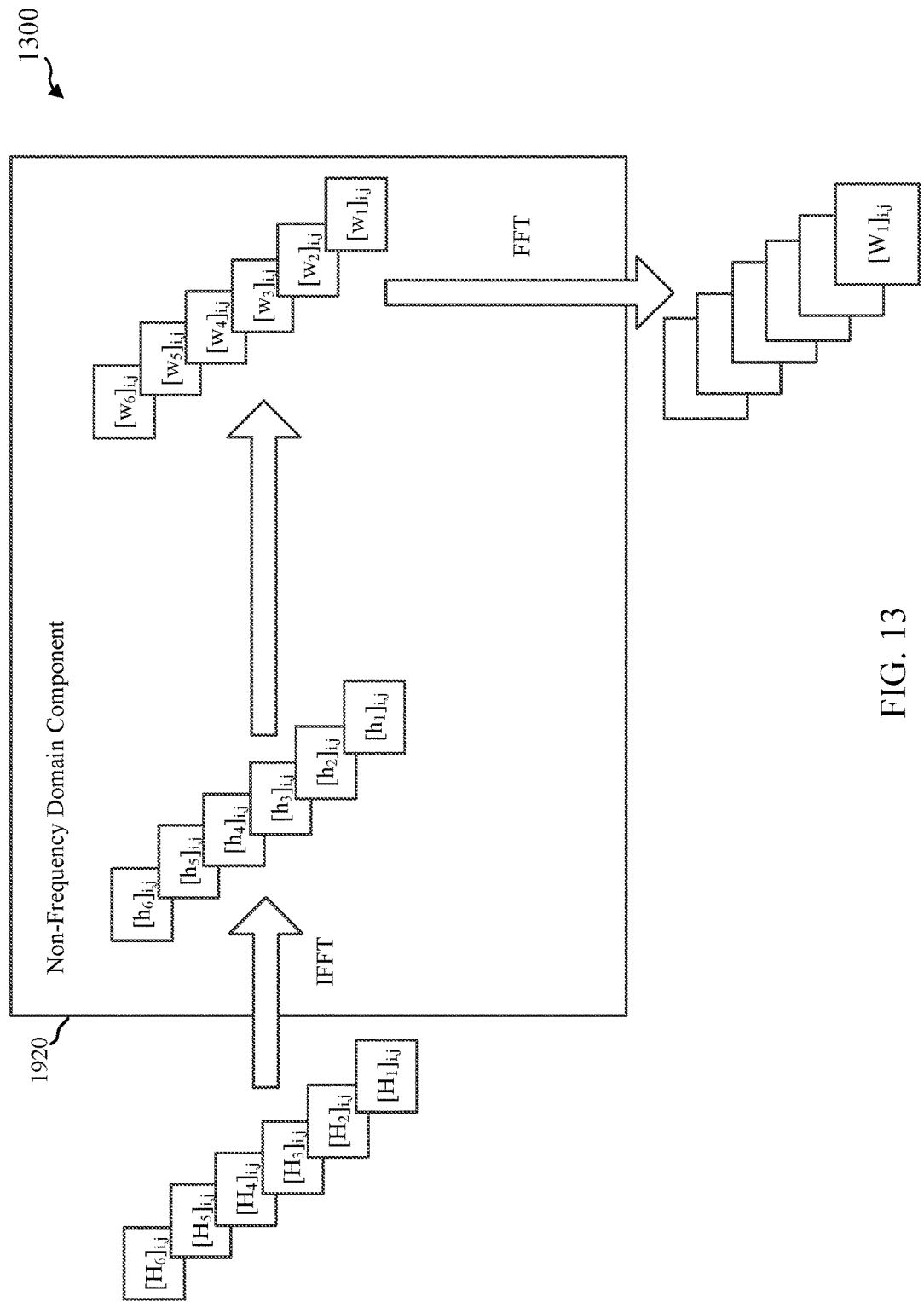
FIG. 13 shows an example process flow for selecting a subset of non-frequency domain components of a channel response, in accordance with one or more aspects of the present disclosure.

FIG. 13 shows an example process flow 1300 for selecting a subset of non-frequency domain components of a channel response, in accordance with one or more aspects of the present disclosure. The process flow 1300 may be performed by a network access device (e.g., an eNB, an ANC, a radio head, or a base station), such as one of the network access devices 105 described with reference to FIG. 1, 2, or 10. In some examples, the process flow 1300 may be performed by a non-frequency domain component 1920, which may be an example of the non-frequency domain component 1920 described with reference to FIG. 12B. The process flow 1300 may receive, as an input, an array of channel estimates, such as the array of channel estimates 1200 described with reference to FIG. 12A.

The process flow 1300 may be executed serially or in parallel for each channel response (or vector) $h_{i,j}$, where $h_{i,j} = \{[H_1]_{i,j}; [H_2]_{i,j}; [H_3]_{i,j}; \ldots\}$. By way of example, FIG. 13 shows a channel response $h_{i,j}$ being provided as input to a non-frequency domain component 1920. The non-frequency domain component 1920 may transform the channel response $h_{i,j}$ from the frequency domain to a time domain (e.g., by performing an IFFT on the channel response $h_{i,j}$). The non-frequency domain component 1920 may then select, in the time domain and from the transformed channel response, $h'_{i,j}$ (where $h'_{i,j} = \{[h_1]_{i,j}; [h_2]_{i,j}; [h_3]_{i,j}; \ldots\}$), a subset of time domain components of the channel response. The subset of time domain components of the vector $h_{i,j}$ or $h'_{i,j}$ is designated $w'_{i,j} = \{([w_1]_{i,j}; [w_2]_{i,j}; [w_3]_{i,j}; \ldots\}$. Some of the values $[w_k]_{i,j}$ may be zero values.

In some examples, the subset of time domain components $w'_{i,j}$ (or other subset of non-frequency domain components) of the channel response $h_{i,j}$ (or of the transformed channel response $h'_{i,j}$) may be selected based at least in part on a power threshold. For example, values of $h'_{i,j}$ exceeding a power threshold may be selected for inclusion in the subset of time domain components $w'_{i,j}$. In some examples, the subset of time domain components $w'_{i,j}$ (or other subset of non-frequency domain components) of the channel response $h_{i,j}$ (or of the transformed channel response $h'_{i,j}$) may be selected based at least in part on a compactness restriction. For example, a set of values of $h'_{i,j}$ that are within a defined window of time domain components may be selected for inclusion in the subset of time domain components $w'_{i,j}$ (and in some of these examples, all of the selected time domain components may be in a single grouping of adjacent time domain components (or other adjacent non-frequency domain components)). In some examples, the subset of time domain components $w'_{i,j}$ (or other subset of non-frequency domain components) of the channel response $h_{i,j}$ (or of the transformed channel response $h'_{i,j}$) may be selected based at least in part on a sparseness restriction. For example, a set of values of $h'_{i,j}$ that includes few non-zero elements may be selected for inclusion in the subset of time domain components $w'_{i,j}$. In some examples, the subset of time domain components $w'_{i,j}$ (or other subset of non-frequency domain components) of the channel response $h_{i,j}$ (or of the transformed channel response $h'_{i,j}$) may include (or be limited to) a fixed number of time domain components (e.g., from one to five time domain components (or from one to five other non-frequency domain components)). Non-selected time domain components of the channel response $h_{i,j}$ (or of the transformed channel response $h'_{i,j}$) may be set to zero in the subset of time domain components $w'_{i,j}$.

The non-frequency domain component 1920 may convert the selected subset of time domain components $w'_{i,j}$ back to the frequency domain (e.g., to $w_{i,j} = \{[W_1]_{i,j}; [W_2]_{i,j}; [W_3]_{i,j}; \ldots\}$). In some examples, the conversion of the selected subset of time domain components back to the frequency domain may be performed by performing a FFT on the subset of time domain components. In some examples, an orthonormal transformation other than an IFFT/FFT transformation may be used by the non-frequency domain component 1920. In some examples, the size of the FFT operation may be larger than the size of the IFFT operation, in which case the non-frequency domain component 1920 may include, or pad, zeros in the selected non-frequency domain components $w'_{i,j}$ before performing the FFT operation. In some cases, the length of zero padding may depend on the number of tones that each tone subset contains, and the size of $w_{i,j}$ may be larger than that of $h_{i,j}$ as a result, which means that the size of the tone subset of $[W_k]_{i,j}$, for any k may be smaller than the size of the tone subset of $[H_{k'}]_{i,j}$, for any k'. For example, if each of the tone subsets for $h_{i,j}$ has two tones, and $w_{i,j}$ has twice the size of $h_{i,j}$, then each of the tone subsets for $w_{i,j}$ will have one tone.

Figure 14A:
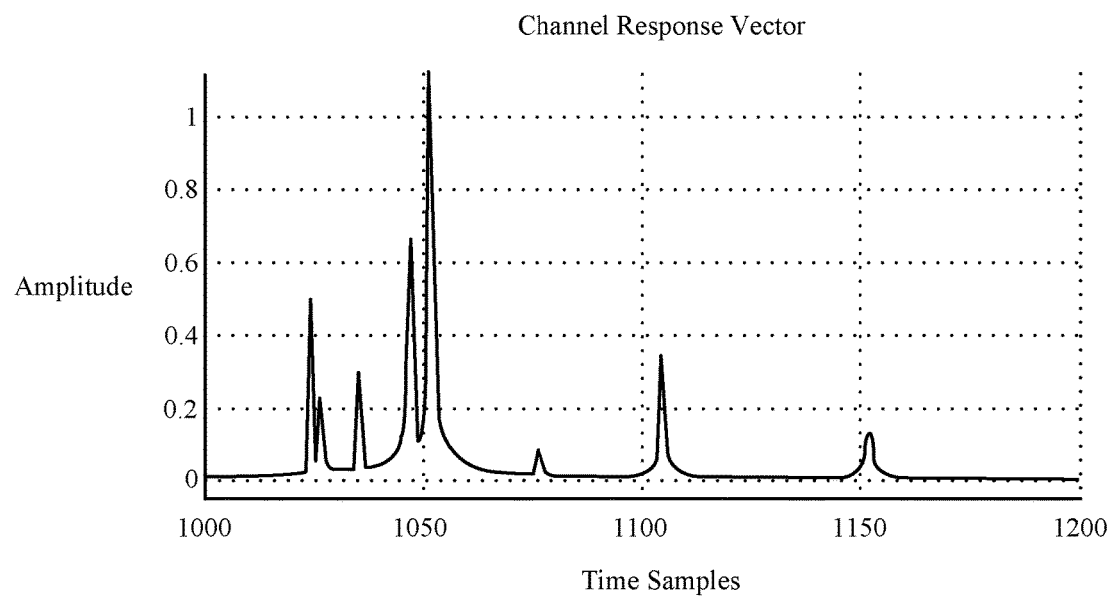
FIG. 14A shows an example time domain representation of a channel response, which channel response corresponds to a pairing of a transmit antenna (of a network access device) with a receive antenna (e.g., of a UE), in accordance with one or more aspects of the present disclosure.
Figure 14B:
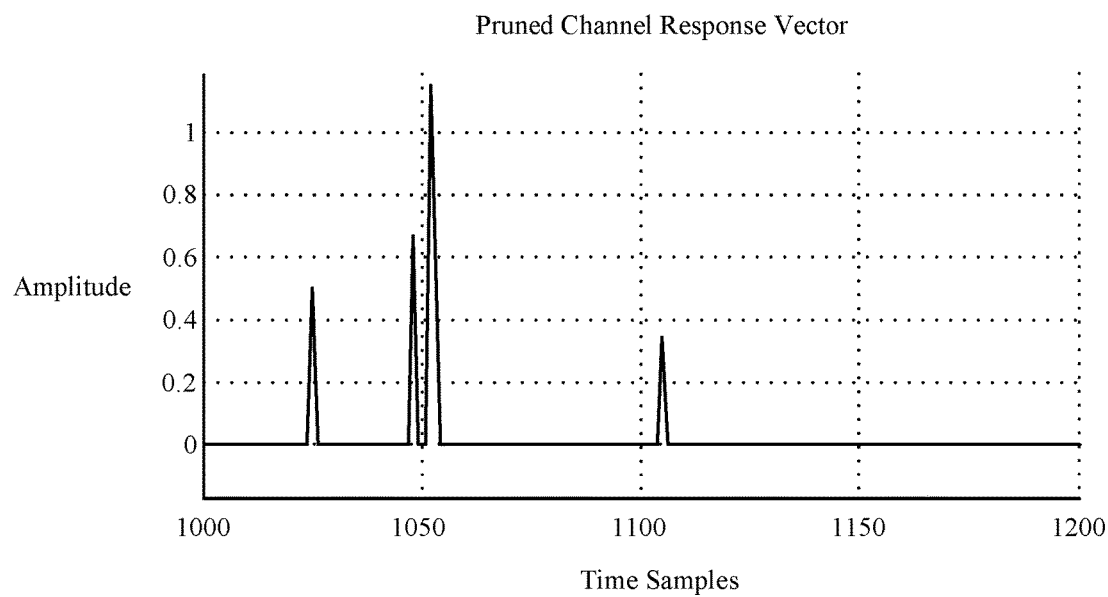
FIG. 14B shows an example time domain representation of a selected subset of time domain components of the channel response illustrated with reference to FIG. 14A, in accordance with one or more aspects of the present disclosure.

FIGS. 14A and 14B illustrate examples of the transformed channel response $h'_{i,j}$ and the subset of time domain components $w'_{i,j}$ in the time domain.

FIG. 14A shows an example time domain representation 1400-a of a channel response 1405, which channel response 1405 corresponds to a pairing of a transmit antenna (of a network access device) with a receive antenna (e.g., of a UE), in accordance with one or more aspects of the present disclosure. In some examples, the network access device may be one of the network access devices 105 described with reference to FIG. 1, 2, or 10. In some examples, the channel response 1405 may be an example of the transformed channel response $h'_{i,j}$ described with reference to FIG. 13.

By way of example, the time domain representation 1400-a of the channel response 1405 is a time domain impulse representation of the channel response 1405 in an x-y coordinate plane, in which time samples (or time domain components) of the channel response 1405 are indicated along an x-axis, and amplitudes of the time samples are indicated along a y-axis. As shown, the channel response 1405 may include a plurality of time domain components (or each of the represented time domain components). In accordance with the process flow 1300 described with reference to FIG. 13, a subset of time domain components (or other subset of non-frequency domain components) of the channel response 1405 may be selected based at least in part on a power threshold, a compactness restriction, a sparseness restriction, a fixed number of time domain components, or a combination thereof.

FIG. 14B shows an example time domain representation 1400-b of a selected subset of time domain components 1410 of the channel response 1405 illustrated with reference to FIG. 14A, in accordance with one or more aspects of the present disclosure. In some examples, the selected subset of time domain components 1410 may be an example of the subset of time domain components $w'_{i,j}$ described with reference to FIG. 13.

By way of example, the time domain representation 1400-b of the selected subset of time domain components 1410 of the channel response 1405 is a time domain impulse representation of the selected subset of time domain components 1410 in an x-y coordinate plane, in which time samples (or time domain components) of the subset of time domain components 1410 are indicated along an x-axis, and amplitudes of the time samples are indicated along a y-axis. As shown, the selected subset of time domain components 1410 may include fewer time domain components than the channel response 1405 illustrated with reference to FIG. 14A. The selected subset of time domain components 1410 may be used to modify an array of channel estimates, as described, for example, with reference to FIG. 12B.

Figure 15:
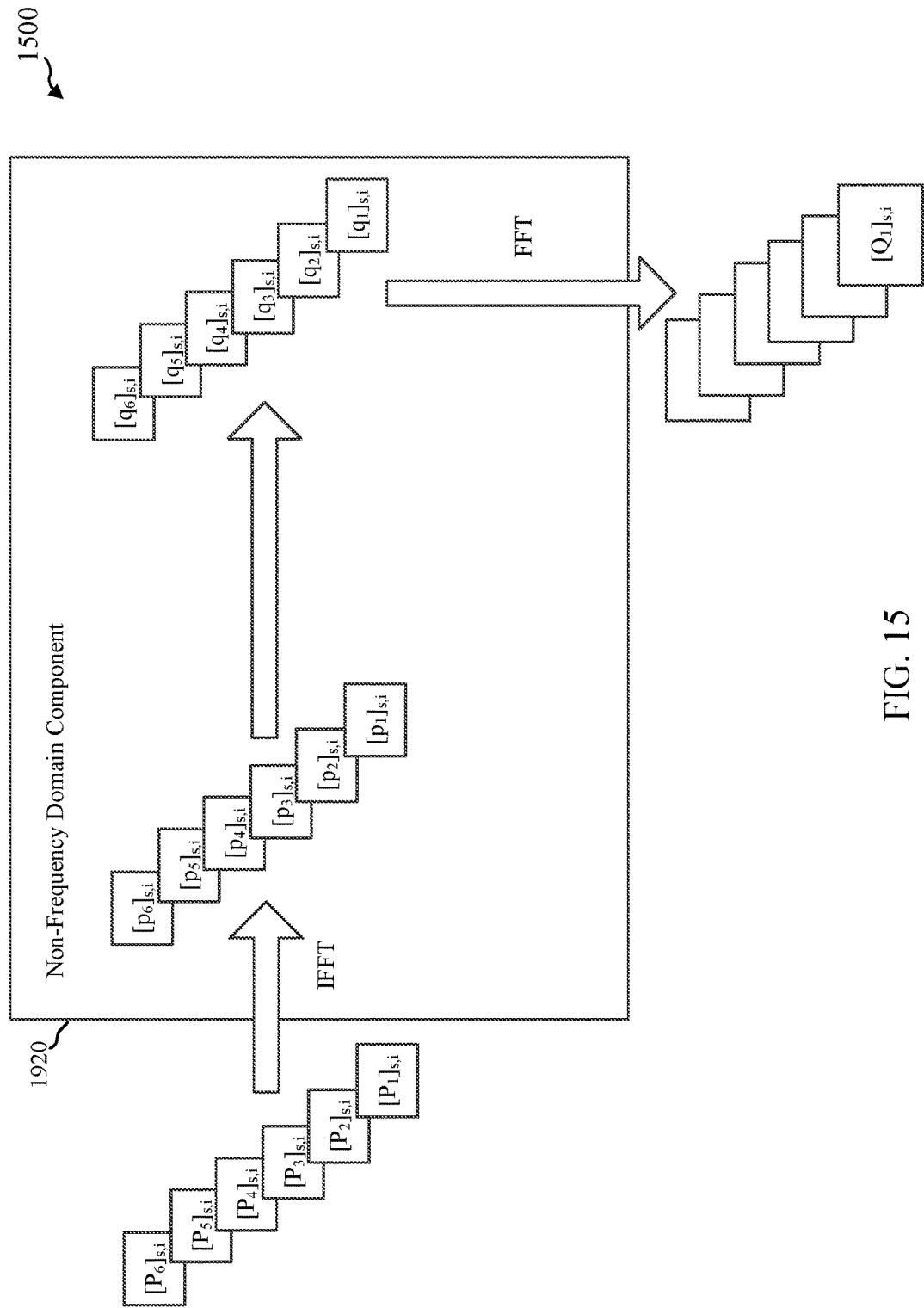
FIG. 15 shows an example process flow for selecting a subset of non-frequency domain components of a vector defined across a plurality of intermediate precoders, in accordance with one or more aspects of the present disclosure.

FIG. 15 shows an example process flow 1500 for selecting a subset of non-frequency domain components of a vector defined across a plurality of intermediate precoders, in accordance with one or more aspects of the present disclosure. The process flow 1500 may be performed by a network access device (e.g., an eNB, an ANC, a radio head, or a base station), such as one of the network access devices 105 described with reference to FIG. 1, 2, or 10. In some examples, the process flow 1500 may be performed by a non-frequency domain component 1920, which may be an example of the non-frequency domain component 1920 described with reference to FIG. 12D. The process flow 1500 may receive, as an input, a plurality of intermediate precoders, such as the plurality of intermediate precoders 1235 described with reference to FIG. 12C.

The process flow 1500 may be executed serially or in parallel for each vector $v_{s,i}$, where $v_{s,i}=\{[P_1]_{s,i}; [P_2]_{s,i}; [P_3]_{s,i}; \ldots\}$. By way of example, FIG. 15 shows a vector $v_{s,i}$ being provided as input to a non-frequency domain component 1920. The non-frequency domain component 1920 may transform the vector $v_{s,i}$ from the frequency domain to a time domain (e.g., by performing an IFFT on the vector $v_{s,i}$). The non-frequency domain component 1920 may then select, in the time domain and from the transformed vector, $v'_{s,i}$ (where $v'_{s,i}=\{[p_1]_{s,i}; [p_2]_{s,i}; [p_3]_{s,i}; \ldots\}$), a subset of time domain components of the vector. The subset of time domain components of the vector $v_{s,i}$ or $v'_{s,i}$ is designated $q'_{s,i}=\{[q_1]_{s,i}; [q_2]_{s,i}; [q_3]_{s,i}; \ldots\}$. Some of the values $[q_k]_{s,i}$ may be zero values.

In some examples, the subset of time domain components $q'_{s,i}$ (or other subset of non-frequency domain components) of the vector $v_{s,i}$ (or of the transformed vector $v'_{s,i}$) may be selected based at least in part on a power threshold. For example, values of $v'_{s,i}$ exceeding a power threshold may be selected for inclusion in the subset of time domain components $q'_{s,i}$. In some examples, the subset of time domain components $q'_{s,i}$ (or other subset of non-frequency domain components) of the vector $v_{s,i}$ (or of the transformed vector $v'_{s,i}$) may be selected based at least in part on a compactness restriction. For example, a set of values of $v'_{s,i}$ that are within a defined window of time domain components may be selected for inclusion in the subset of time domain components $q'_{s,i}$ (and in some of these examples, all of the selected time domain components may be in a single grouping of adjacent time domain components (or other adjacent non-frequency domain components)). In some examples, the subset of time domain components $q'_{s,i}$ (or other subset of non-frequency domain components) of the vector $v_{s,i}$ (or of the transformed vector $v'_{s,i}$) may be selected based at least in part on a sparseness restriction. For example, a set of values of $v'_{s,i}$ that includes few non-zero elements may be selected for inclusion in the subset of time domain components $q'_{s,i}$. In some examples, the subset of time domain components $q'_{s,i}$ (or other subset of non-frequency domain components) of the vector $v_{s,i}$ (or of the transformed vector $v'_{s,i}$) may include (or be limited to) a fixed number of time domain components (e.g., from one to five time domain components (or from one to five other non-frequency domain components)). Non-selected time domain components of the vector $v_{s,i}$ (or of the transformed vector $v'_{s,i}$) may be set to zero in the subset of time domain components $q'_{s,i}$.

The non-frequency domain component 1920 may convert the selected subset of time domain components $q'_{s,i}$ back to the frequency domain (e.g., to $q_{s,i}=\{[Q_1]_{s,i}; [Q_2]_{s,i}; [Q_3]_{s,i}; \ldots\}$). In some examples, the conversion of the selected subset of time domain components back to the frequency domain may be performed by performing a FFT on the subset of time domain components. In some examples, an orthonormal transformation other than an IFFT/FFT transformation may be used by the non-frequency domain component 1920. In some examples, the size of the FFT operation may be larger than the size of the IFFT operation, in which case the non-frequency domain component 1920 may pad zeros in the selected non-frequency domain components $q'_{s,i}$ before performing the FFT operation. In such examples, the length of zero padding may depend on the number of tones that each tone subset contains. In some examples, the length of zero padding may depend on the number of tones that each tone subset contains, and the size of $q_{s,i}$ may be larger than that of $v_{s,i}$ as a result, which means that the size of the tone subset of $[P_k]_{s,i}$, for any k may be smaller than the size the of the tone subset of $[Q_{k'}]_{s,i}$, for any k'. For example, if each of the tone subsets for $v_{s,i}$ has two tones, and $q_{s,i}$ has twice the size of $v_{s,i}$, then each of the tone subsets for $q_{s,i}$ will have one tone.

Figure 16A:
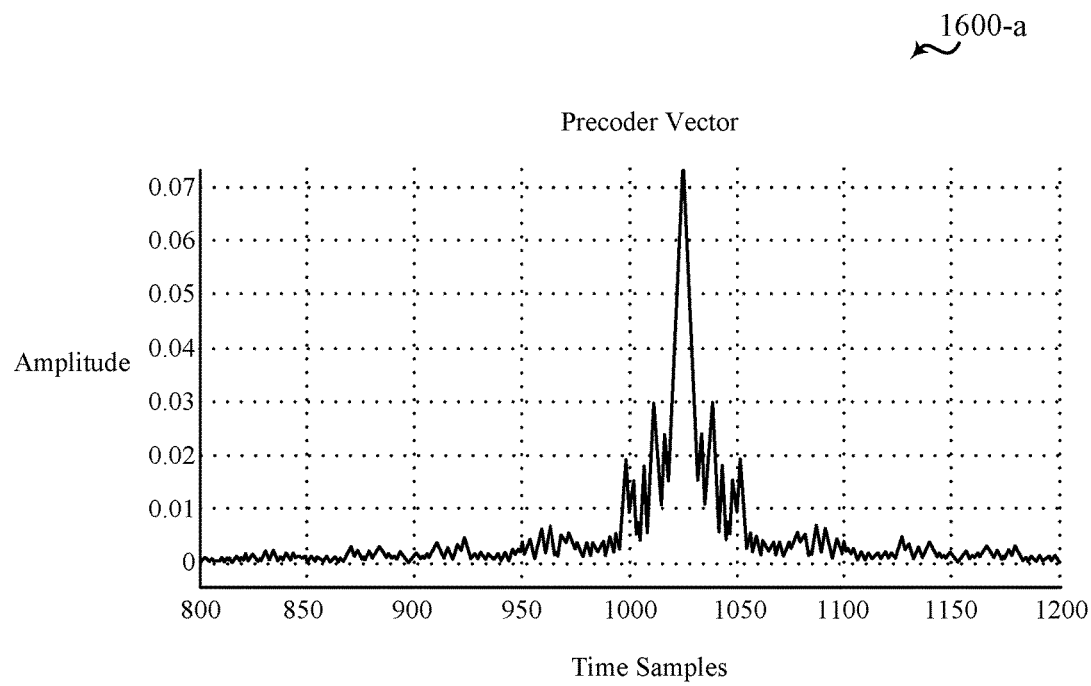
FIG. 16A shows an example time domain representation of a vector defined by a plurality of intermediate precoders, which vector corresponds to a combination of a transmit stream and a transmit antenna of a network access device, in accordance with one or more aspects of the present disclosure.
Figure 16B:
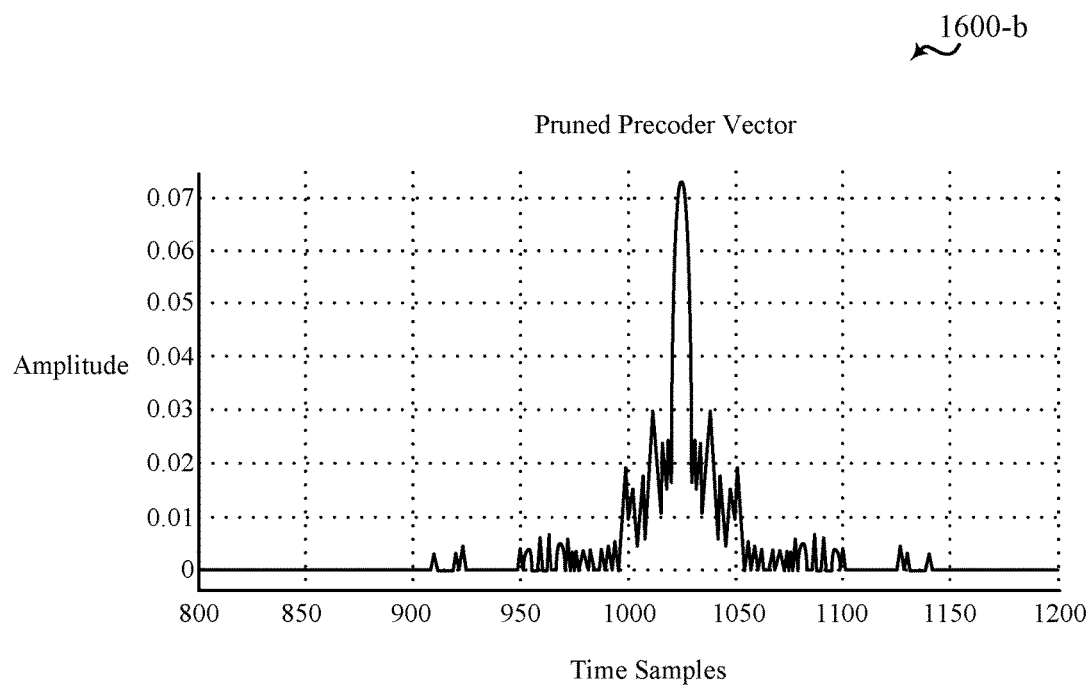
FIG. 16B shows an example time domain representation of a selected subset of time domain components of the vector illustrated with reference to FIG. 16A, in accordance with one or more aspects of the present disclosure.

FIGS. 16A and 16B illustrate examples of the transformed vector $v'_{s,i}$ and the subset of time domain components $q'_{s,i}$ in the time domain.

FIG. 16A shows an example time domain representation 1600-$a$ of a vector 1605 defined by a plurality of intermediate precoders, which vector 1605 corresponds to a combination of a transmit stream and a transmit antenna of a network access device, in accordance with one or more aspects of the present disclosure. In some examples, the network access device may be one of the network access devices 105 described with reference to FIG. 1, 2, or 10. In some examples, the vector 1605 may be an example of the transformed vector $v'_{s,i}$ described with reference to FIG. 15.

By way of example, the time domain representation 1600-$a$ of the vector 1605 is a time domain impulse representation of the vector 1605 in an x-y coordinate plane, in which time samples (or time domain components) of the vector 1605 are indicated along an x-axis, and amplitudes of the time samples are indicated along a y-axis. As shown, the vector 1605 may include a plurality of time domain components (or each of the represented time domain components). In accordance with the process flow 1500 described with reference to FIG. 15, a subset of time domain components (or other subset of non-frequency domain components) of the vector 1605 may be selected based at least in part on a power threshold, a compactness restriction, a sparseness restriction, a fixed number of time domain components, or a combination thereof.

FIG. 16B shows an example time domain representation 1600-$b$ of a selected subset of time domain components 1610 of the vector 1605 illustrated with reference to FIG. 16A, in accordance with one or more aspects of the present disclosure. In some examples, the selected subset of time domain components 1610 may be an example of the subset of time domain components $q'_{s,i}$ described with reference to FIG. 15.

By way of example, the time domain representation 1600-$b$ of the selected subset of time domain components 1610 of the vector 1605 is a time domain impulse representation of the selected subset of time domain components 1610 in an x-y coordinate plane, in which time samples (or time domain components) of the subset of time domain components 1610 are indicated along an x-axis, and amplitudes of the time samples are indicated along a y-axis. As shown, the selected subset of time domain components 1610 may include fewer time domain components than the vector 1605 illustrated with reference to FIG. 16A. The selected subset of time domain components 1610 may be used to modify an intermediate precoder to a smoothed precoder. The smoothed precoder may be smoothed in a frequency domain compared to the intermediate precoder.

The techniques described with reference to FIGS. 11, 12A, 12B, 12C, 12D, 12E, 13, 14A, 14B, 15, 16A, and 16B can enable the use of wideband channel estimation algorithms at a UE. Wideband FFT-based channel estimation for a UE-RS can save complexity compared to RB-based MMSE processing. In some examples, the selection of a subset of non-frequency domain components of a channel response vector or a precoder vector may be based at least in part on a goal such as: a target beamforming gain, or a target delay spread compression.

Figure 17:
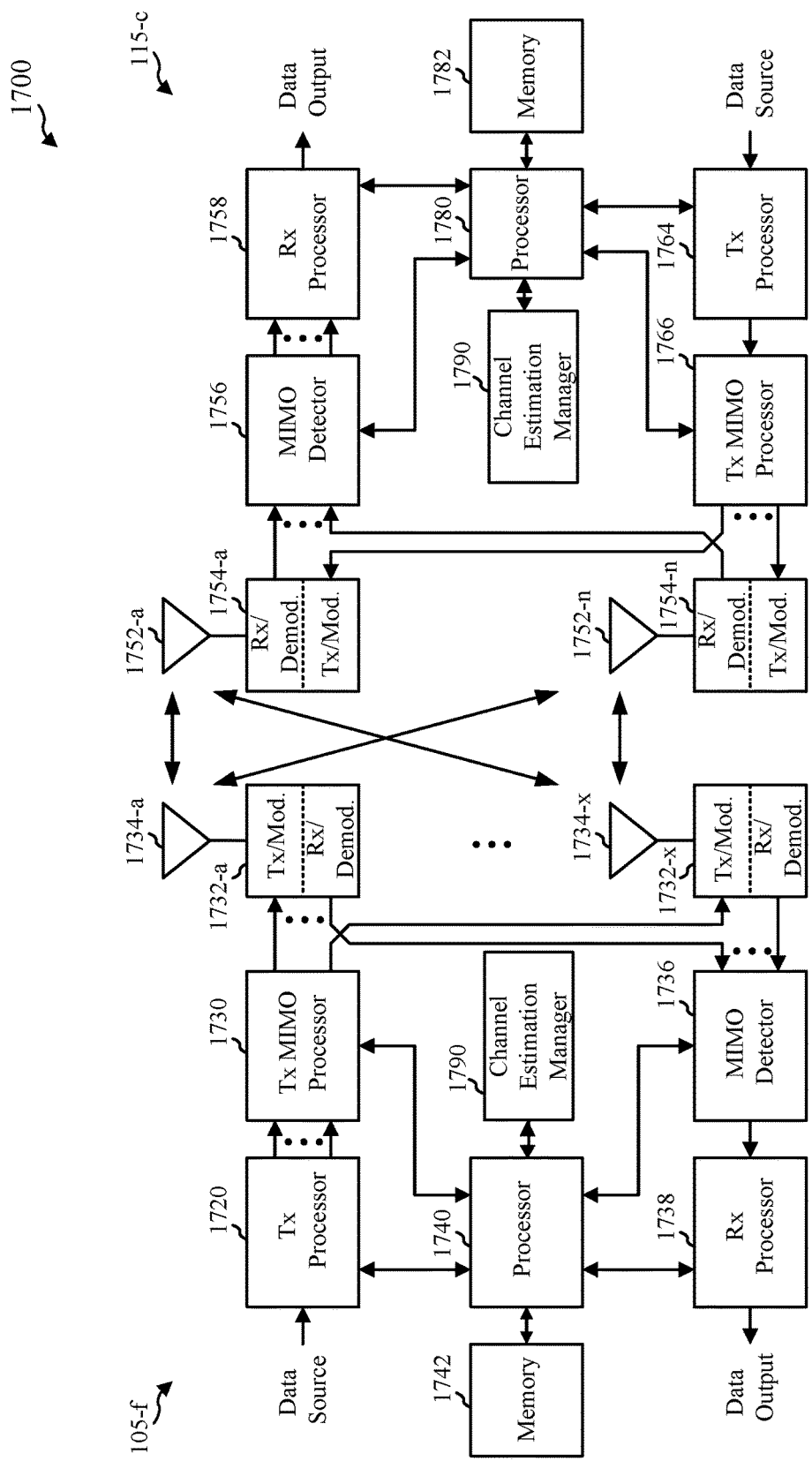
FIG. 17 is a block diagram of a multiple input/multiple output (MIMO) communication system, in accordance with one or more aspects of the present disclosure.

FIG. 17 is a block diagram of a MIMO communication system 1700, in accordance with one or more aspects of the present disclosure. The MIMO communication system 1700 may include a network access device 105-f and a UE 115-c. The MIMO communication system 1700 may illustrate aspects of the wireless communications system 100, 200, or 1000 shown in FIG. 1, 2, or 10. In some examples, the network access device 105-f may be an example of one or more aspects of a network access device (e.g., an eNB, an ANC, a radio head, or a base station), such as one of the network access devices 105 described with reference to FIG. 1, 2, or 10. The network access device 105-f may be equipped with antennas 1734-a through 1734-x, and the UE 115-c may be equipped with antennas 1752-a through 1752-n. In the MIMO communication system 1700, the network access device 105-f may be able to send data over multiple communication links at the same time. Each communication link may be called a "layer" and the "rank" of the communication link may indicate the number of layers used for communication. For example, in a 2×2 MIMO communications system where network access device 105-f transmits two "layers," the rank of the communication link between the network access device 105-f and the UE 115-c is two.

At the network access device 105-f, a transmit processor 1720 may receive data from a data source. The transmit processor 1720 may process the data. The transmit processor 1720 may also generate control symbols and/or reference symbols. A transmit (Tx) MIMO processor 1730 may perform spatial processing (e.g., precoding) on data symbols, control symbols, and/or reference symbols, if applicable, and may provide output symbol streams to the transmit modulators 1732-a through 1732-x. Each modulator 1732 may process a respective output symbol stream (e.g., for OFDM, etc.) to obtain an output sample stream. Each modulator 1732 may further process (e.g., convert to analog, amplify, filter, and upconvert) the output sample stream to obtain a DL signal. In one example, DL signals from modulators 1732-a through 1732-x may be transmitted via the antennas 1734-a through 1734-x, respectively.

At the UE 115-c, the UE antennas 1752-a through 1752-n may receive the DL signals from the network access device 105-f and may provide the received signals to the demodulators 1754-a through 1754-n, respectively. Each demodulator 1754 may condition (e.g., filter, amplify, downconvert, and digitize) a respective received signal to obtain input samples. Each demodulator 1754 may further process the input samples (e.g., for OFDM, etc.) to obtain received symbols. A MIMO detector 1756 may obtain received symbols from all the demodulators 1754-a through 1754-n, perform MIMO detection on the received symbols, if applicable, and provide detected symbols. A receive processor 1758 may process (e.g., demodulate, deinterleave, and decode) the detected symbols, providing decoded data for the UE 115-c to a data output, and provide decoded control information to a processor 1780, or memory 1782.

The processor 1780 may in some cases execute stored instructions to instantiate a channel estimation manager 1790. The channel estimation manager 1790 may be an example of aspects of the channel estimation manager 1810 described with reference to FIG. 18.

On the UL, at the UE 115-c, a transmit processor 1764 may receive and process data from a data source. The transmit processor 1764 may also generate reference symbols for a reference signal. The symbols from the transmit processor 1764 may be precoded by a transmit MIMO processor 1766 if applicable, further processed by the demodulators 1754-a through 1754-n (e.g., for SC-FDMA, etc.), and be transmitted to the network access device 105-f in accordance with the transmission parameters received from the network access device 105-f. At the network access device 105-f, the UL signals from the UE 115-c may be received by the antennas 1734, processed by the demodulators 1732, detected by a MIMO detector 1736 if applicable, and further processed by a receive processor 1738. The receive processor 1738 may provide decoded data to a data output and to the processor 1740 and/or memory 1742. The processor 1740 may in some cases execute stored instructions to instantiate a channel estimation manager 1790. The channel estimation manager 1790 may be used, for example, to transmit at least one pilot signal over at least one channels corresponding to at least one of a plurality of antenna pairings between the antennas 1734-a through 1734-x, and the antennas 1752-a through 1752-n. The channel estimation manager 1790 may also or alternatively be used, for example, to monitor at least one channel corresponding to at least one of the plurality of antenna pairings, determine CSI for the at least one of the plurality of channels, and transmit the CSI to the network access device 105-f.

The components of the UE 115-c may, individually or collectively, be implemented with one or more application specific integrated circuits (ASICs) adapted to perform some or all of the applicable functions in hardware. Each of the noted modules may be a means for performing one or more functions related to operation of the MIMO communication system 1700. Similarly, the components of the network access device 105-f may, individually or collectively, be implemented with one or more ASICs adapted to perform some or all of the applicable functions in hardware. Each of the noted components may be a means for performing one or more functions related to operation of the MIMO communication system 1700.

Figure 18:
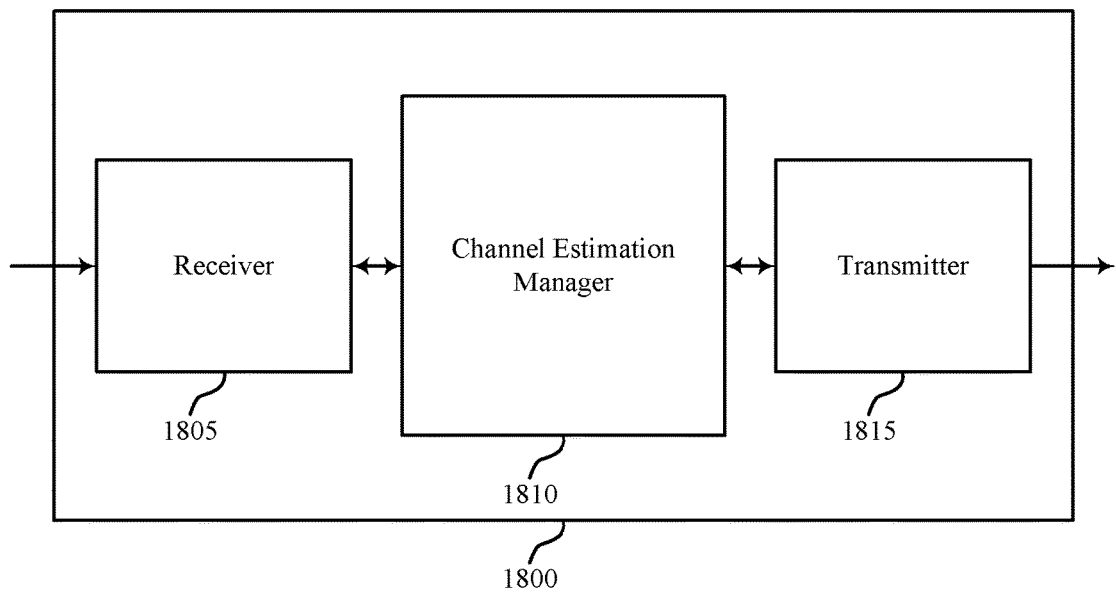
FIGS. 18 through 20 show block diagrams of a wireless device that supports channel estimation using UE-specific reference signals in accordance with one or more aspects of the present disclosure.

FIG. 18 shows a block diagram of a wireless device 1800 that supports channel estimation using UE-specific reference signals in accordance with one or more aspects of the present disclosure. Wireless device 1800 may be an example of aspects of a UE 115 or base station 105 described with reference to FIGS. 1, 2, 10, and 17. Wireless device 1800 may include receiver 1805, channel estimation manager 1810 and transmitter 1815. Wireless device 1800 may also include a processor. Each of these components may be in communication with each other.

The receiver 1805 may receive information such as packets, user data, or control information associated with various information channels (e.g., control channels, data channels, and information related to channel estimation using UE-specific reference signals, etc.). Information may be passed on to other components of the device. The receiver 1805 may be an example of aspects of the transceiver 2125 described with reference to FIG. 21 or the transceiver 2225 described with reference to FIG. 22.

The channel estimation manager 1810 may identify a set of intermediate precoders corresponding to a set of tone subsets, such as a plurality of tone subsets defined for the intermediate precoders, the set of intermediate precoders defining a set of vectors across the set of tone subsets, such as the plurality of tone subsets defined for the intermediate precoders, select, for each vector of the set of vectors, a subset of non-frequency domain components of the vector, modify the set of intermediate precoders to a set of smoothed precoders based on the selected subset of non-frequency domain components for each vector, where the set of smoothed precoders is smoothed in a frequency domain compared to the set of intermediate precoders, and precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation. The channel estimation manager 1810 may also be an example of aspects of the channel estimation manager 2105 described with reference to FIG. 21 or channel estimation manager 2205 described with reference to FIG. 22.

The transmitter 1815 may transmit signals received from other components of wireless device 1800. In some examples, the transmitter 1815 may be collocated with a receiver in a transceiver module. For example, the transmitter 1815 may be an example of aspects of the transceiver 2125 described with reference to FIG. 21 or the transceiver 2225 described with reference to FIG. 22. The transmitter 1815 may include a single antenna, or it may include a plurality of antennas.

Figure 19:
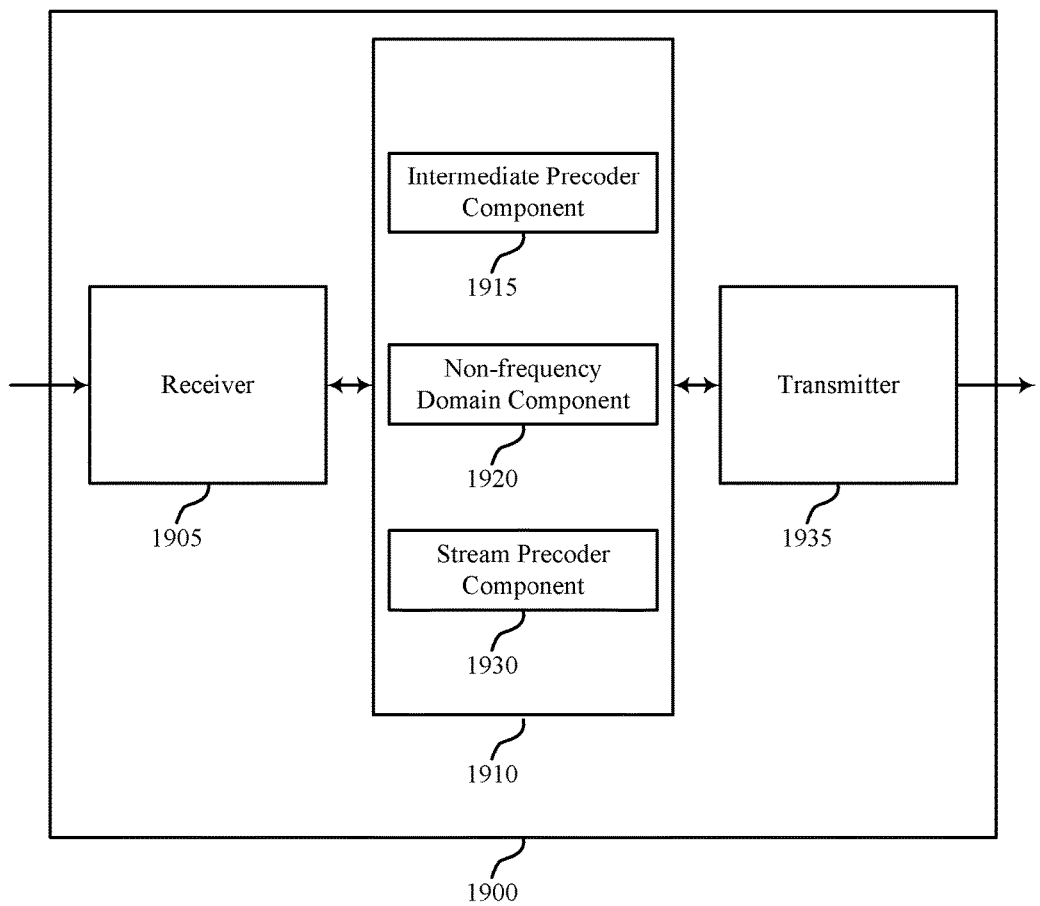

FIG. 19 shows a block diagram of a wireless device 1900 that supports channel estimation using UE-specific reference signals in accordance with one or more aspects of the present disclosure. Wireless device 1900 may be an example of aspects of a wireless device 1800 or a UE 115 or base station 105 described with reference to FIGS. 1, 2, 10, 17, and 18. Wireless device 1900 may include receiver 1905, channel estimation manager 1910 and transmitter 1935. Wireless device 1900 may also include a processor. Each of these components may be in communication with each other.

The receiver 1905 may receive information which may be passed on to other components of the device. The receiver 1905 may also perform the functions described with reference to the receiver 1805 of FIG. 18. The receiver 1905 may be an example of aspects of the transceiver 2125 described with reference to FIG. 21 or the transceiver 2225 described with reference to FIG. 22.

The channel estimation manager 1910 may be an example of aspects of channel estimation manager 1810 described with reference to FIG. 18. The channel estimation manager 1910 may include intermediate precoder component 1915, non-frequency domain component 1920, and stream precoding component 1930. The channel estimation manager 1910 may be an example of aspects of the channel estimation manager 2105 described with reference to FIG. 21 or the channel estimation manager 2205 described with reference to FIG. 22.

The intermediate precoder component 1915 may identify a set of intermediate precoders corresponding to a set of tone subsets, such as the plurality of tone subsets defined for the intermediate precoders, the set of intermediate precoders defining a set of vectors across the set of tone subsets, such as the plurality of tone subsets defined for the intermediate precoders. In some cases, each vector of the set of vectors corresponds to a different transmit stream, or a different combination of transmit stream and transmit antenna. In some cases, the set of tone subsets comprises single tone subsets. In some cases, the set of tone subsets comprises tone bundles.

The non-frequency domain component 1920 may transform each vector of the set of vectors from the frequency domain to a time domain, where selecting a subset of non-frequency domain components of a vector comprises selecting a subset of time domain components of the vector, select, for each channel of the set of channels, a subset of non-frequency domain components of the channel response for the channel, where the set of intermediate precoders is identified based on the selected subset of non-frequency domain components for each channel of the set of channels, transform each channel response for each of the set of channels from a frequency domain to a time domain, selecting a subset of non-frequency domain components of a channel response comprises selecting a subset of time domain components of the channel response, and select, for each vector of the set of vectors, a subset of non-frequency domain components of the vector.

In some cases, the subset of non-frequency domain components of a vector is selected based on: a power threshold, or a compactness restriction, or a sparseness restriction, or a fixed number of time domain components, or a combination thereof. In some cases, the selected subset of non-frequency domain components for at least one vector comprises a single grouping of adjacent non-frequency domain components. In some cases, the selected subset of non-frequency domain components for a vector consists of one non-frequency domain component. In some cases, the subset of non-frequency domain components for a channel is selected based on: a power threshold, or a compactness restriction, or a sparseness restriction, or a fixed number of time domain components, or a combination thereof.

The non-frequency domain component 1920 may modify the set of intermediate precoders to a set of smoothed precoders based on the selected subset of non-frequency domain components for each vector, where the set of smoothed precoders is smoothed in a frequency domain compared to the set of intermediate precoders. At times, the non-frequency domain component 1920 may prepare or identify control information, such as DCI for downlink, which indicates that the precoders are per tone. Further, the control information, such as DCI, may additionally indicate that the precoders are smoothed.

The stream precoding component 1930 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation. In some cases, a frequency spacing of the UE-specific reference signal tone locations is selected to allow the UE to perform at least one of an RMMSE channel estimation scheme or an IFFT channel estimation scheme or a hybrid channel estimation scheme, using a UE-specific reference signal transmitted at the UE-specific reference signal tone locations. At times, the stream precoding component 1930 may prepare or identify DCI which indicates that the precoders are per tone. Further, the DCI may additionally indicate that the precoders are smoothed.

The transmitter 1935 may transmit signals received from other components of wireless device 1900. In some examples, the transmitter 1935 may be collocated with a receiver in a transceiver module. For example, the transmitter 1935 may be an example of aspects of the transceiver 2125 described with reference to FIG. 21 or the transceiver 2225 described with reference to FIG. 22. The transmitter 1935 may utilize a single antenna, or it may utilize a plurality of antennas.

Figure 20:
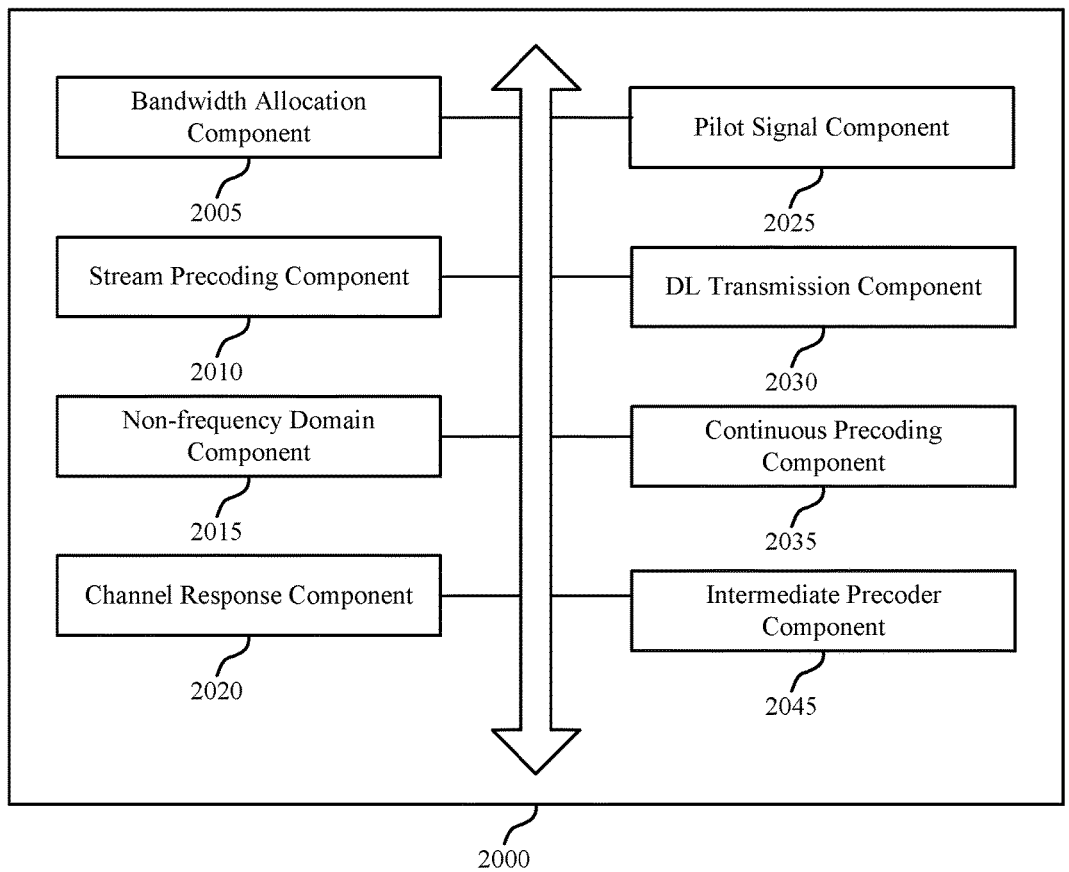

FIG. 20 shows a block diagram of a channel estimation manager 2000 which may be an example of the corresponding component of wireless device 1800 or wireless device 1900 in accordance with one or more aspects of the present disclosure. That is, channel estimation manager 2000 may be an example of aspects of channel estimation manager 1810 or channel estimation manager 1910 described with reference to FIGS. 18 and 19. The channel estimation manager 2000 may also be an example of aspects of the channel estimation manager 2105 described with reference to FIG. 21 or the channel estimation manager 2205 described with reference to FIG. 22.

The channel estimation manager 2000 may include bandwidth allocation component 2005, stream precoding component 2010, non-frequency domain component 2015, channel response component 2020, pilot signal component 2025, DL transmission component 2030, continuous precoding component 2035, and intermediate precoder component 2045. Each of these modules may communicate, directly or indirectly, with one another (e.g., via one or more buses).

The bandwidth allocation component 2005 may determine the bandwidth allocation for DL transmissions to a UE. The stream precoding component 2010 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation.

The non-frequency domain component 2015 may transform each vector of the set of vectors from the frequency domain to a time domain, where selecting a subset of non-frequency domain components of a vector comprises selecting a subset of time domain components of the vector, select, for each channel of the set of channels, a subset of non-frequency domain components of the channel response for the channel, where the set of intermediate precoders is identified based on the selected subset of non-frequency domain components for each channel of the set of channels, transform each channel response for each of the set of channels from a frequency domain to a time domain, selecting a subset of non-frequency domain components of a channel response comprises selecting a subset of time domain components of the channel response, and select, for each vector of the set of vectors, a subset of non-frequency domain components of the vector.

The non-frequency domain component 2015 may modify the set of intermediate precoders to a set of smoothed precoders based on the selected subset of non-frequency domain components for each vector, where the set of smoothed precoders is smoothed in a frequency domain compared to the set of intermediate precoders.

The channel response component 2020 may identify a set of channel responses corresponding to a set of channels, where each channel of the set of channels corresponds to a pairing of a transmit antenna with a receive antenna, and identify at least one of the set of channel responses based on the at least one pilot signal.

The pilot signal component 2025 may receive at least one pilot signal over at least one of the set of channels. The DL transmission component 2030 may transmit the DL transmissions to the UE. The continuous precoding component 2035 may apply continuous precoding to tones in the bandwidth allocation.

The intermediate precoder component 2045 may identify a set of intermediate precoders corresponding to a set of tone subsets, such as a plurality of tone subsets defined for the intermediate precoders, the set of intermediate precoders defining a set of vectors across the set of tone subsets, such as the plurality of tone subsets defined for the intermediate precoders.

Figure 21:
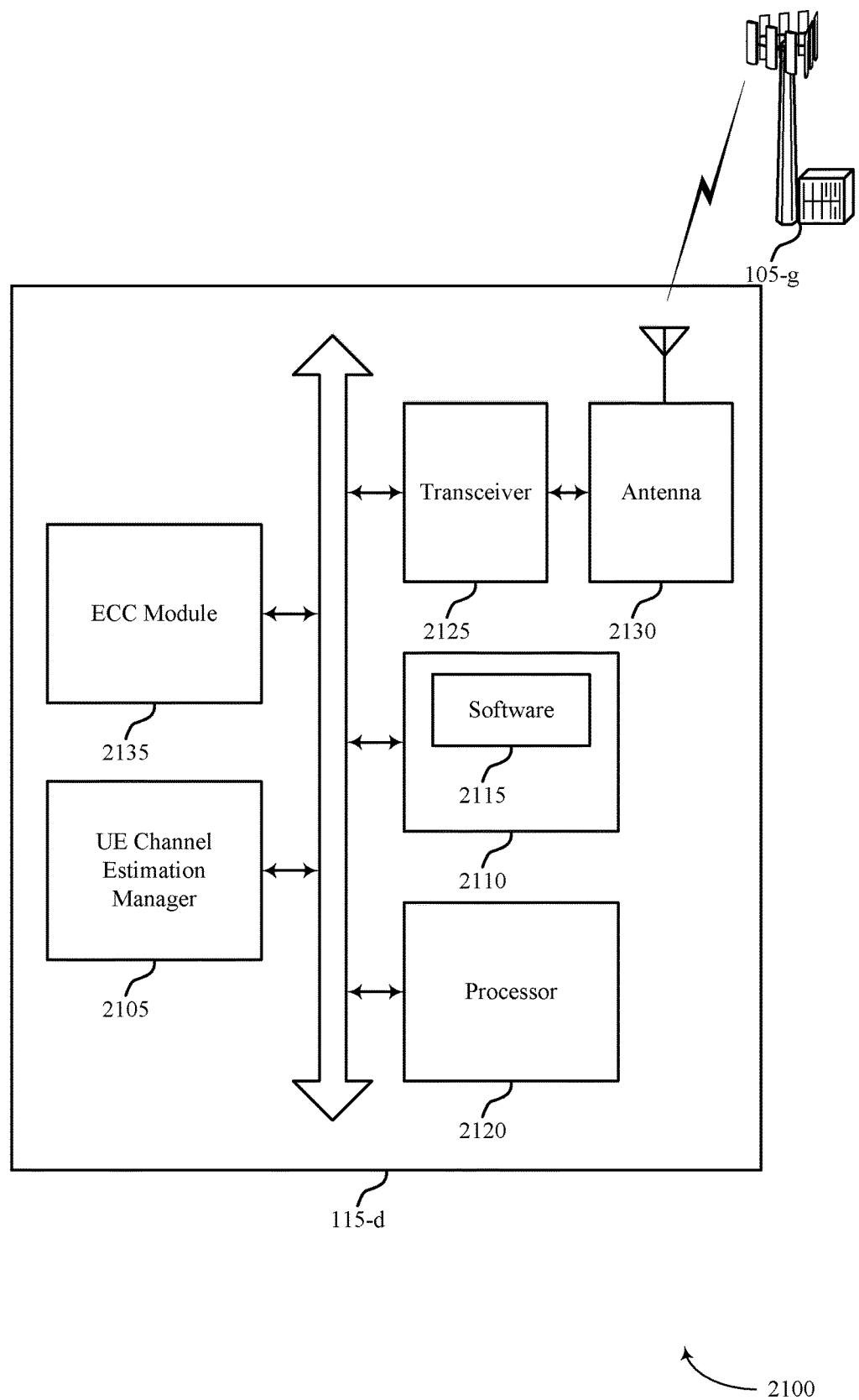
FIG. 21 illustrates a block diagram of a system including a UE that supports channel estimation using UE-specific reference signals in accordance with one or more aspects of the present disclosure.

FIG. 21 shows a diagram of a system 2100 including a device that supports channel estimation using UE-specific reference signals in accordance with one or more aspects of the present disclosure. For example, system 2100 may include UE 115-*d*, which may be an example of a wireless device 1800, a wireless device 1900, or a UE 115 as described with reference to FIGS. 1, 2, 10, 17, and 18 through 20.

UE 115-*d* may also include UE channel estimation manager 2105, memory 2110, processor 2120, transceiver 2125, antenna 2130 and enhanced component carrier (ECC) module 2135. Each of these modules may communicate, directly or indirectly, with one another (e.g., via one or more buses). The UE channel estimation manager 2105 may be an example of a channel estimation manager as described with reference to FIGS. 18 through 20.

The memory 2110 may include random access memory (RAM) and read only memory (ROM). The memory 2110 may store computer-readable, computer-executable software including instructions that, when executed, cause the processor to perform various functions described herein (e.g., channel estimation using UE-specific reference signals, etc.). In some cases, the software 2115 may not be directly executable by the processor but may cause a computer (e.g., when compiled and executed) to perform functions described herein. The processor 2120 may include an intelligent hardware device, (e.g., a central processing unit (CPU), a microcontroller, an ASIC, etc.)

The transceiver 2125 may communicate bi-directionally, via one or more antennas, wired, or wireless links, with one or more networks, as described above. For example, the transceiver 2125 may communicate bi-directionally with a base station 105 or a UE 115. The transceiver 2125 may also include a modem to modulate the packets and provide the modulated packets to the antennas for transmission, and to demodulate packets received from the antennas. In some cases, the wireless device may include a single antenna 2130. However, in some cases the device may have more than one antenna 2130, which may be capable of concurrently transmitting or receiving multiple wireless transmissions.

The ECC module 2135 may enable operations using ECCs such as communication using shared or unlicensed spectrum, using reduced TTIs or subframe durations, or using a large number of CCs.

Figure 22:
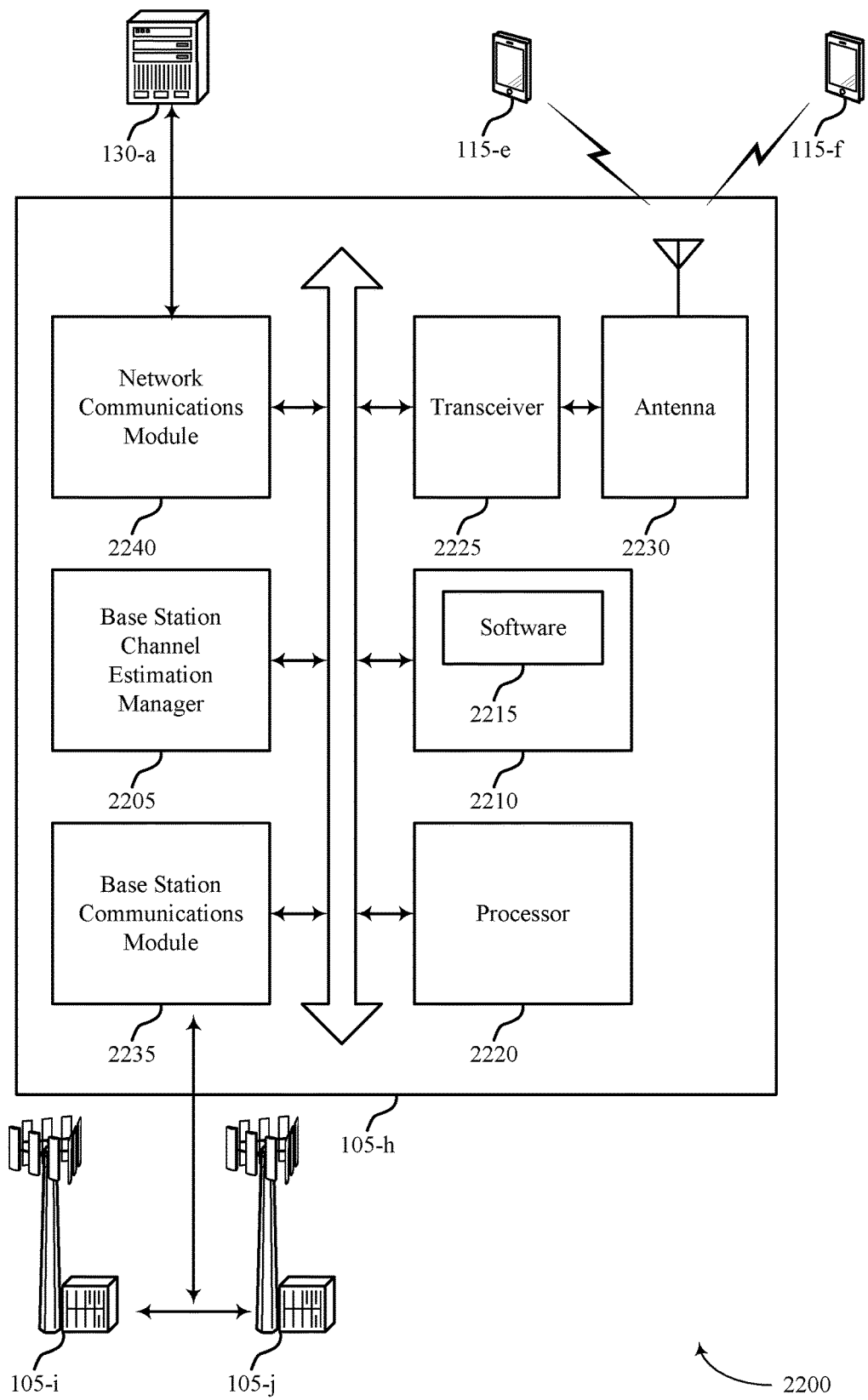
FIG. 22 illustrates a block diagram of a system including a base station that supports channel estimation using UE-specific reference signals in accordance with one or more aspects of the present disclosure.

FIG. 22 shows a diagram of a wireless system 2200 including a device configured that supports channel estimation using UE-specific reference signals in accordance with one or more aspects of the present disclosure. For example, system 2200 may include base station 105-*h*, which may be an example of a wireless device 1800, a wireless device 1900, or a base station 105 as described with reference to FIGS. 1, 2, 10, 17, and 18 through 20. Base station 105-*h* may also include components for bi-directional voice and data communications including components for transmitting communications and components for receiving communications. For example, base station 105-*h* may communicate bi-directionally with one or more UEs 115.

Base station 105-*h* may also include base station channel estimation manager 2205, memory 2210, processor 2220, transceiver 2225, antenna 2230, base station communications module 2235 and network communications module 2240. Each of these modules may communicate, directly or indirectly, with one another (e.g., via one or more buses).

The base station channel estimation manager 2205 may be an example of a channel estimation manager as described with reference to FIGS. 18 through 20.

The memory 2210 may include RAM and ROM. The memory 2210 may store computer-readable, computer-executable software including instructions that, when executed, cause the processor to perform various functions described herein (e.g., channel estimation using UE-specific reference signals, etc.). In some cases, the software 2215 may not be directly executable by the processor but may cause a computer (e.g., when compiled and executed) to perform functions described herein. The processor 2220 may include an intelligent hardware device, (e.g., a CPU, a microcontroller, an ASIC, etc.)

The transceiver 2225 may communicate bi-directionally, via one or more antennas, wired, or wireless links, with one or more networks, as described above. For example, the transceiver 2225 may communicate bi-directionally with a base station 105 or a UE 115. The transceiver 2225 may also include a modem to modulate the packets and provide the modulated packets to the antennas for transmission, and to demodulate packets received from the antennas. In some cases, the wireless device may include a single antenna 2230. However, in some cases the device may have more than one antenna 2130, which may be capable of concurrently transmitting or receiving multiple wireless transmissions.

The base station communications module 2235 may manage communications with other base station 105, and may include a controller or scheduler for controlling communications with UEs 115 in cooperation with other base stations 105. For example, the base station communications module 2235 may coordinate scheduling for transmissions to UEs 115 for various interference mitigation techniques such as beamforming or joint transmission. In some examples, base station communications module 2235 may provide an X2 interface within an LTE/LTE-A wireless communication network technology to provide communication between base stations 105.

The network communications module 2240 may manage communications with the core network (e.g., via one or more wired backhaul links). For example, the network communications module 2240 may manage the transfer of data communications for client devices, such as one or more UEs 115.

Figure 23:
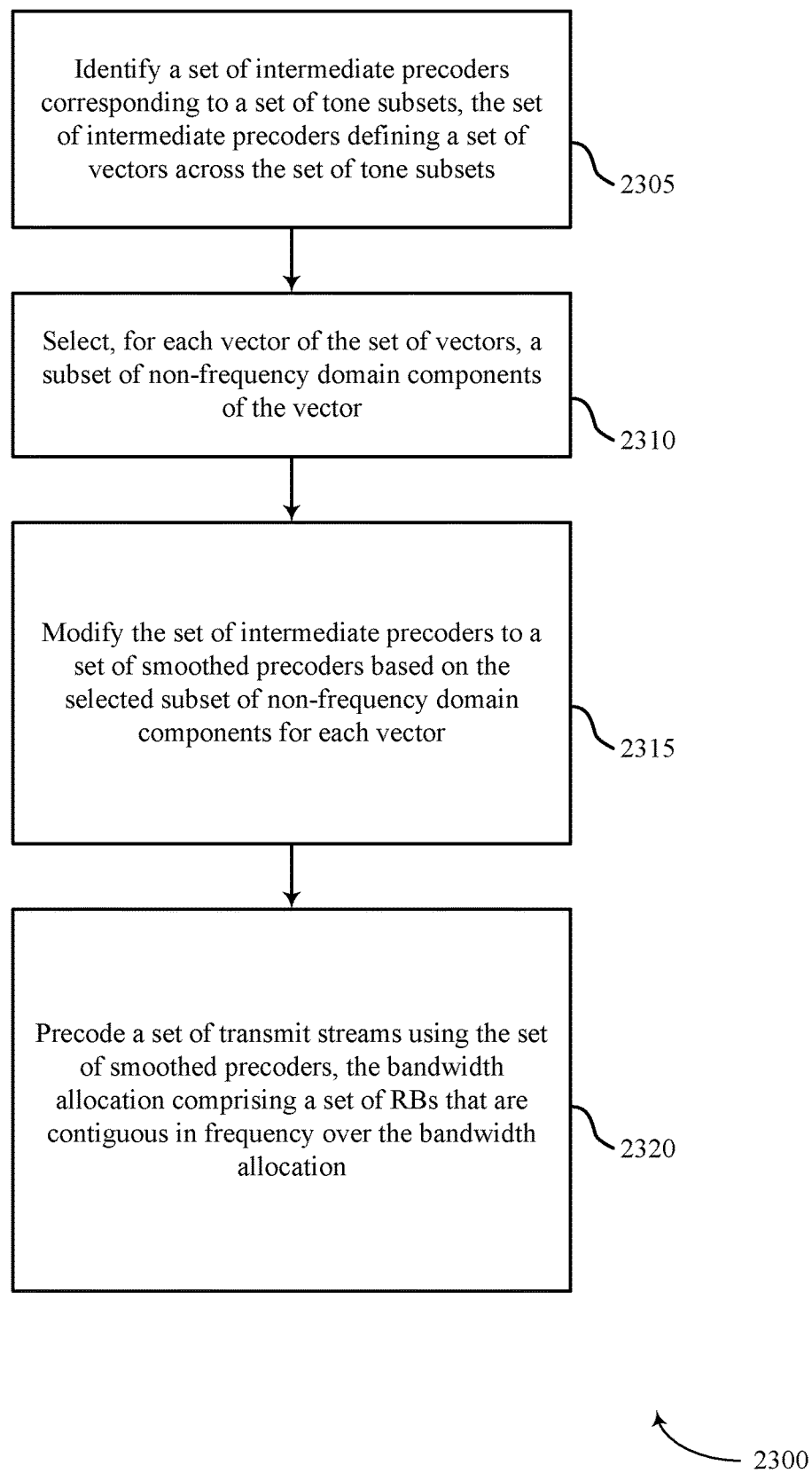
FIGS. 23 through 27 illustrate methods for channel estimation using UE-specific reference signals in accordance with one or more aspects of the present disclosure.

FIG. 23 shows a flowchart illustrating a method 2300 for channel estimation using UE-specific reference signals in accordance with one or more aspects of the present disclosure. The operations of method 2300 may be implemented by a device such as a UE 115 or base station 105 or its components as described with reference to FIGS. 1, 2, 10, 17, and 18-22. For example, the operations of method 2300 may be performed by the channel estimation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 2305, the UE 115 or base station 105 may identify a set of intermediate precoders corresponding to a first set of tone subsets, such as a plurality of tone subsets defined for the intermediate precoders, the set of intermediate precoders defining a set of vectors across the first set of tone subsets, such as the plurality of tone subsets defined for the intermediate precoders, as described above with reference to FIGS. 1 through 22. In certain examples, the operations of block 2305 may be performed by the intermediate precoder component as described with reference to FIGS. 19 and 20.

At block 2310, the UE 115 or base station 105 may select, for each vector of the set of vectors, a subset of non-frequency domain components of the vector as described above with reference to FIGS. 1 through 22. In certain examples, the operations of block 2310 may be performed by the non-frequency domain component as described with reference to FIGS. 19 and 20.

At block 2315, the UE 115 or base station 105 may modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders as described above with reference to FIGS. 1 through 22. In certain examples, the operations of block 2315 may be performed by the non-frequency domain component as described with reference to FIGS. 19 and 20.

At block 2320, the UE 115 or base station 105 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation as described above with reference to FIGS. 1 through 22. In certain examples, the operations of block 2320 may be performed by the stream precoding component as described with reference to FIGS. 19 and 20.

Figure 24:
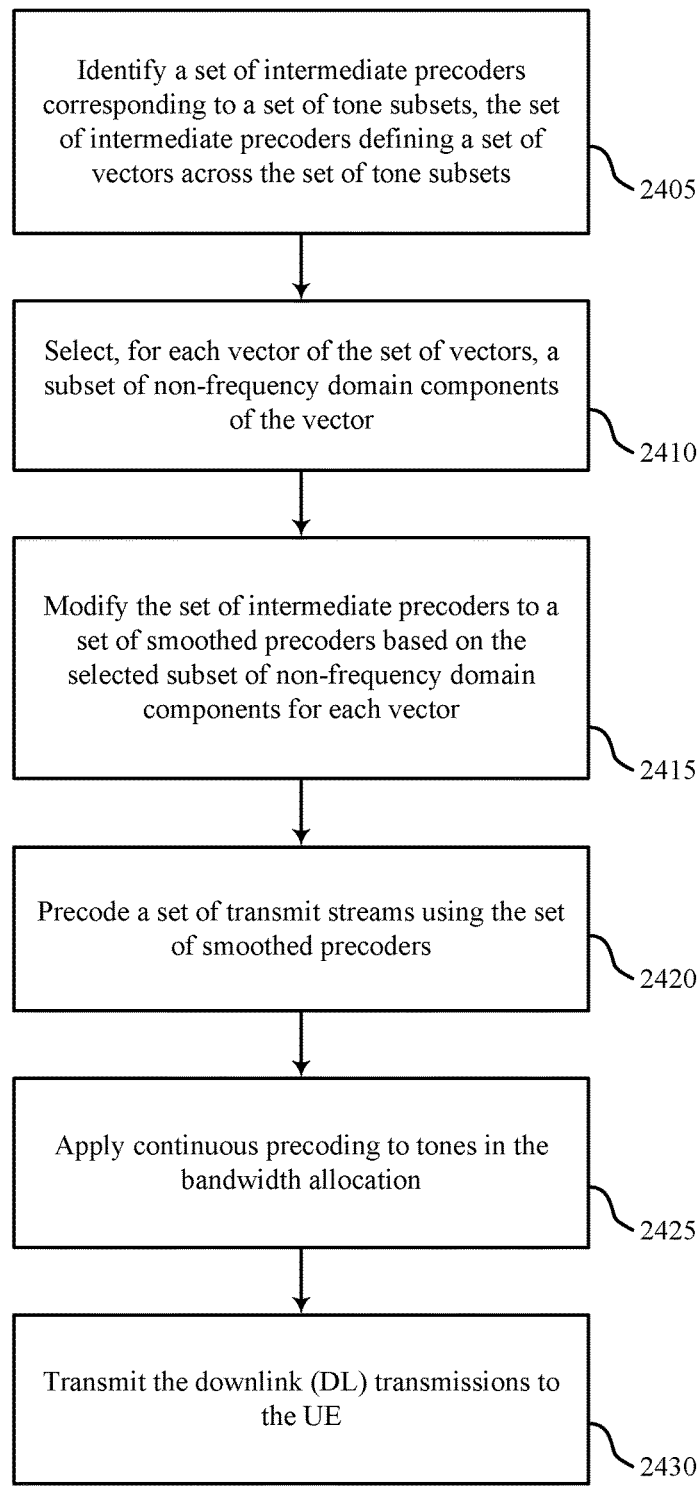

FIG. 24 shows a flowchart illustrating a method 2400 for channel estimation using UE-specific reference signals in accordance with one or more aspects of the present disclosure. The operations of method 2400 may be implemented by a device such as a UE 115 or base station 105 or its components as described with reference to FIGS. 1, 2, 10, 17, and 18-22. For example, the operations of method 2400 may be performed by the channel estimation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 2405, the UE 115 or base station 105 may identify a set of intermediate precoders corresponding to a first set of tone subsets, such as a plurality of tone subsets defined for the intermediate precoders, the set of intermediate precoders defining a set of vectors across the first set of tone subsets, such as the plurality of tone subsets defined for the intermediate precoders, as described above with reference to FIGS. 1 through 22. In certain examples, the operations of block 2405 may be performed by the intermediate precoder component as described with reference to FIGS. 19 and 20.

At block 2410, the UE 115 or base station 105 may select, for each vector of the set of vectors, a subset of non-frequency domain components of the vector as described above with reference to FIGS. 1 through 22. In certain examples, the operations of block 2410 may be performed by the non-frequency domain component as described with reference to FIGS. 19 and 20.

At block 2415, the UE 115 or base station 105 may modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders as described above with reference to FIGS. 1 through 22. In certain examples, the operations of block 2415 may be performed by the non-frequency domain component as described with reference to FIGS. 19 and 20.

At block 2420, the UE 115 or base station 105 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation as described above with reference to FIGS. 1 through 22. In certain examples, the operations of block 2420 may be performed by the stream precoding component as described with reference to FIGS. 19 and 20.

At block 2425, the UE 115 or base station 105 may apply continuous precoding to tones in the bandwidth allocation as described above with reference to FIGS. 1 through 22. In certain examples, the operations of block 2425 may be performed by the continuous precoding component as described with reference to FIGS. 19 and 20.

At block 2430, the UE 115 or base station 105 may transmit the DL transmissions to the UE as described above with reference to FIGS. 1 through 22. In certain examples, the operations of block 2430 may be performed by the DL transmission component as described with reference to FIGS. 19 and 20.

Figure 25:
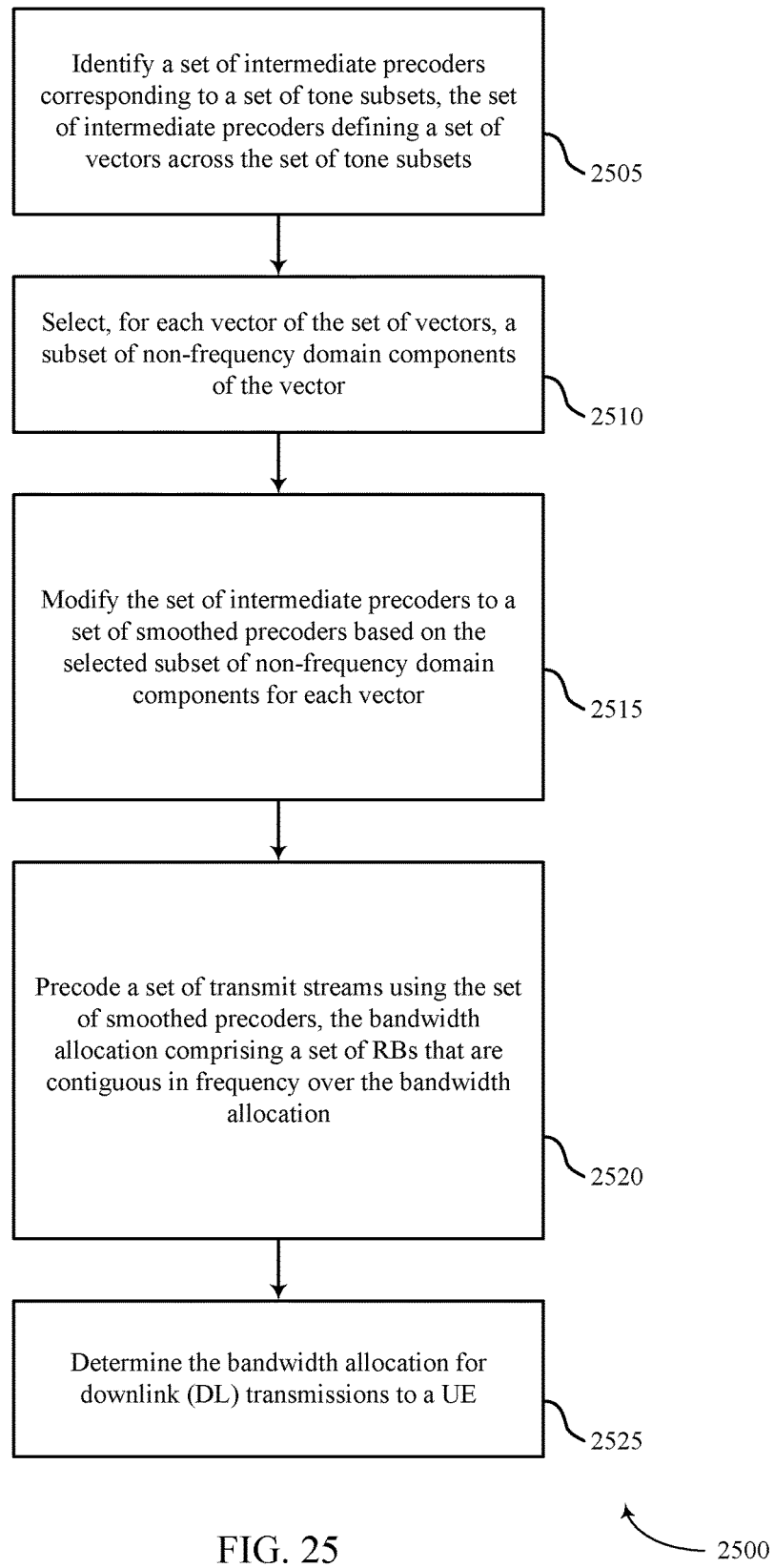

FIG. 25 shows a flowchart illustrating a method 2500 for channel estimation using UE-specific reference signals in accordance with one or more aspects of the present disclosure. The operations of method 2500 may be implemented by a device such as a UE 115 or base station 105 or its components as described with reference to FIGS. 1, 2, 10, 17, and 18-22. For example, the operations of method 2500 may be performed by the channel estimation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 2505, the UE 115 or base station 105 may identify a set of intermediate precoders corresponding to a first set of tone subsets, such as a plurality of tone subsets defined for the intermediate precoders, the set of intermediate precoders defining a set of vectors across the first set of tone subsets, such as the plurality of tone subsets defined for the intermediate precoders, as described above with reference to FIGS. 1 through 22. In certain examples, the operations of block 2505 may be performed by the intermediate precoder component as described with reference to FIGS. 19 and 20.

At block 2510, the UE 115 or base station 105 may select, for each vector of the set of vectors, a subset of non-frequency domain components of the vector as described above with reference to FIGS. 1 through 22. In certain examples, the operations of block 2510 may be performed by the non-frequency domain component as described with reference to FIGS. 19 and 20.

At block 2515, the UE 115 or base station 105 may modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders as described above with reference to FIGS. 1 through 22. In certain examples, the operations of block 2515 may be performed by the non-frequency domain component as described with reference to FIGS. 19 and 20.

At block 2520, the UE 115 or base station 105 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation as described above with reference to FIGS. 1 through 22. In certain examples, the operations of block 2520 may be performed by the stream precoding component as described with reference to FIGS. 19 and 20.

At block 2525, the UE 115 or base station 105 may determine the bandwidth allocation for DL transmissions to a UE as described above with reference to FIGS. 1 through 22. In certain examples, the operations of block 2525 may be performed by the bandwidth allocation component as described with reference to FIGS. 19 and 20.

Figure 26:
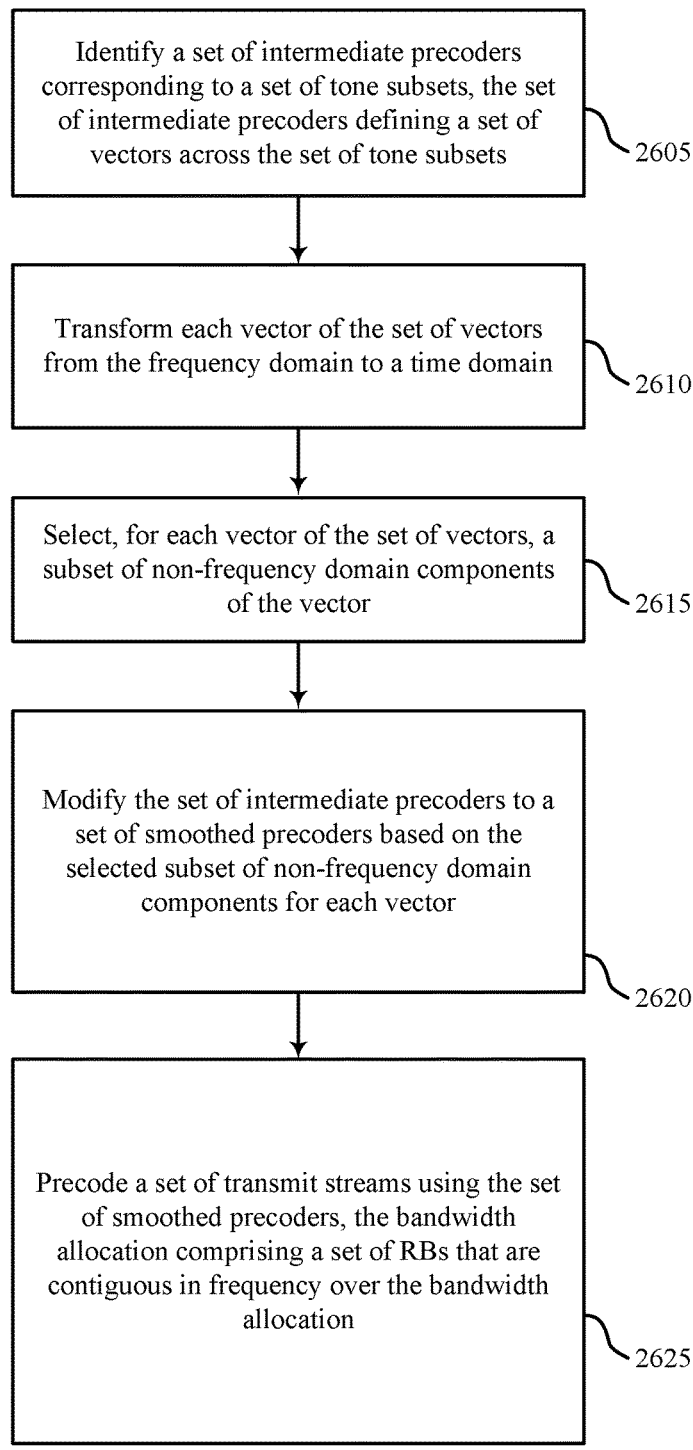

FIG. 26 shows a flowchart illustrating a method 2600 for channel estimation using UE-specific reference signals in accordance with one or more aspects of the present disclosure. The operations of method 2600 may be implemented by a device such as a UE 115 or base station 105 or its components as described with reference to FIGS. 1, 2, 10, 17, and 18-22. For example, the operations of method 2600 may be performed by the channel estimation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 2605, the UE 115 or base station 105 may identify a set of intermediate precoders corresponding to a first set of tone subsets, such as a plurality of tone subsets defined for the intermediate precoders, the set of intermediate precoders defining a set of vectors across the first set of tone subsets, such as the plurality of tone subsets defined for the intermediate precoders, as described above with reference to FIGS. 1 through 22. In certain examples, the operations of block 2605 may be performed by the intermediate precoder component as described with reference to FIGS. 19 and 20.

At block 2610, the UE 115 or base station 105 may transform each vector of the set of vectors from the frequency domain to a time domain. In certain examples, the operations of block 2610 may be performed by the non-frequency domain component as described with reference to FIGS. 19 and 20.

At block 2615, the UE 115 or base station 105 may select, for each vector of the set of vectors, a subset of non-frequency domain components of the vector as described above with reference to FIGS. 1 through 22. Selecting a subset of non-frequency domain components of a vector may include selecting a subset of time domain components of the vector as described above with reference to FIGS. 1 through 22. In certain examples, the operations of block 2615 may be performed by the non-frequency domain component as described with reference to FIGS. 19 and 20.

At block 2620, the UE 115 or base station 105 may modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders as described above with reference to FIGS. 1 through 22. In certain examples, the operations of block 2620 may be performed by the non-frequency domain component as described with reference to FIGS. 19 and 20.

At block 2625, the UE 115 or base station 105 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation as described above with reference to FIGS. 1 through 22. In certain examples, the operations of block 2625 may be performed by the stream precoding component as described with reference to FIGS. 19 and 20.

Figure 27:
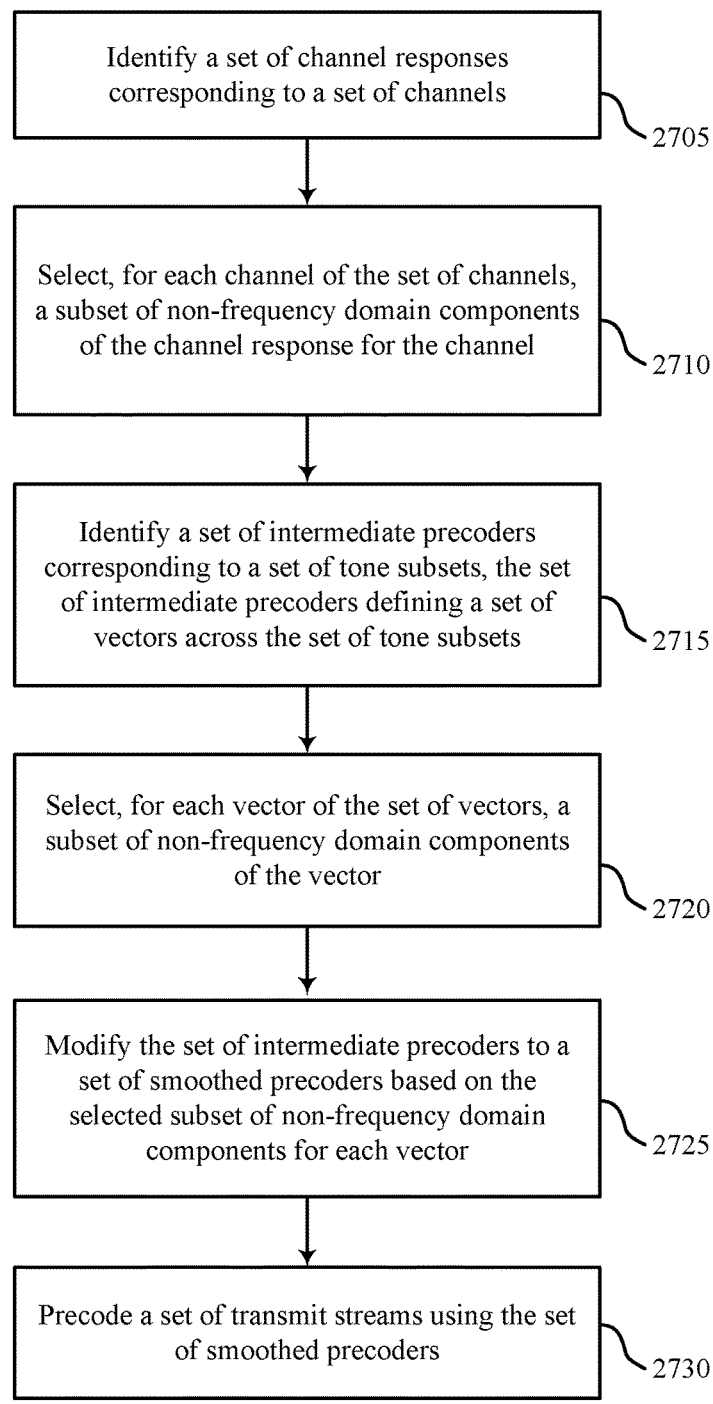

FIG. 27 shows a flowchart illustrating a method 2700 for channel estimation using UE-specific reference signals in accordance with one or more aspects of the present disclosure. The operations of method 2700 may be implemented by a device such as a UE 115 or base station 105 or its components as described with reference to FIGS. 1, 2, 10, 17, and 18-22. For example, the operations of method 2700 may be performed by the channel estimation manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 2705, the UE 115 or base station 105 may identify a set of channel responses corresponding to a set of channels across a third set of tone subsets, where each channel of the set of channels corresponds to a pairing of a transmit antenna with a receive antenna as described above with reference to FIGS. 1 through 22. In certain examples, the operations of block 2705 may be performed by the channel response component as described with reference to FIGS. 19 and 20.

At block 2710, the UE 115 or base station 105 may select, for each channel of the set of channels, a subset of non-frequency domain components of the channel response for the channel as described above with reference to FIGS. 1 through 22. In certain examples, the operations of block 2710 may be performed by the non-frequency domain component as described with reference to FIGS. 19 and 20.

At block 2715, the UE 115 or base station 105 may identify a set of intermediate precoders corresponding to a first set of tone subsets, such as a plurality of tone subsets defined for the intermediate precoders, the set of intermediate precoders defining a set of vectors across the first set of tone subsets, such as the plurality of tone subsets defined for the intermediate precoders, as described above with reference to FIGS. 1 through 22. In some cases, the set of intermediate precoders is identified based on the selected subset of non-frequency domain components for each channel of the set of channels across a fourth plurality of tone subsets as described above with reference to FIGS. 1 through 22. In certain examples, the operations of block 2715 may be performed by the intermediate precoder component as described with reference to FIGS. 19 and 20.

At block 2720, the UE 115 or base station 105 may select, for each vector of the set of vectors, a subset of non-frequency domain components of the vector as described above with reference to FIGS. 1 through 22. In certain examples, the operations of block 2720 may be performed by the non-frequency domain component as described with reference to FIGS. 19 and 20.

At block 2725, the UE 115 or base station 105 may modify the set of intermediate precoders to a set of smoothed precoders corresponding to a second plurality of tone subsets based on the selected subset of non-frequency domain components for each vector, where the set of smoothed precoders is smoothed in a frequency domain compared to the set of intermediate precoders as described above with reference to FIGS. 1 through 22. In certain examples, the operations of block 2725 may be performed by the non-frequency domain component as described with reference to FIGS. 19 and 20.

At block 2730, the UE 115 or base station 105 may precode a set of transmit streams using the set of smoothed precoders, where one or more of the set of transmit streams comprise a bandwidth allocation having UE-specific reference signal tone locations uniformly spaced within the bandwidth allocation, the bandwidth allocation comprising a set of RBs that are contiguous in frequency over the bandwidth allocation as described above with reference to FIGS. 1 through 22. In certain examples, the operations of block 2730 may be performed by the stream precoding component as described with reference to FIGS. 19 and 20.

It should be noted that these methods describe possible implementations, and that the operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide for channel estimation using UE-specific reference signals.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures, and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for channel estimation using UE-specific reference signals. It should be noted that these methods describe possible implementations, and that the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
identifying a plurality of intermediate precoders corresponding to a first plurality of tone subsets, the plurality of intermediate precoders defining a plurality of vectors across the first plurality of tone subsets, wherein each of the plurality of vectors comprises at least frequency domain components and non-frequency domain components;
selecting, for each vector of the plurality of vectors, a subset of the non-frequency domain components of the vector;
modifying the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders; and
precoding a plurality of transmit streams using the plurality of smoothed precoders, wherein one or more of the plurality of transmit streams comprise a bandwidth allocation having one or more user equipment (UE)-specific reference signal tone locations uniformly spaced within the bandwidth allocation, the bandwidth allocation comprising a plurality of resource blocks (RBs) that are contiguous in frequency over the bandwidth allocation.

2. The method of claim 1, further comprising:
applying continuous precoding to one or more tones in the bandwidth allocation; and
transmitting downlink (DL) transmissions to the UE.

3. The method of claim 1, further comprising:
determining the bandwidth allocation for downlink (DL) transmissions to a UE.

4. The method of claim 1, wherein a frequency spacing of the one or more UE-specific reference signal tone locations is selected to allow the UE to perform at least one of a robust minimum mean-square error (RMMSE) channel estimation scheme, an inverse fast Fourier transform (IFFT) channel estimation scheme, or a hybrid channel estimation scheme, using a UE-specific reference signal transmitted at the UE-specific reference signal tone locations.

5. The method of claim 1, further comprising:
transmitting downlink control information (DCI), wherein the DCI indicates that precoding was performed per tone.

6. The method of claim 1, wherein each vector of the plurality of vectors corresponds to a different transmit stream, or a different combination of transmit stream and transmit antenna.

7. The method of claim 1, further comprising:
transforming each vector of the plurality of vectors from the frequency domain to a time domain, wherein selecting the subset of the non-frequency domain components of the vector comprises selecting a subset of time domain components of the vector.

8. The method of claim 1, 6, or 7 wherein the subset of non-frequency domain components of the vector is selected based at least in part on a power threshold, or a compactness restriction, or a sparseness restriction, or a fixed number of time domain components, or a combination thereof.

9. The method of claim 1, wherein the selected subset of non-frequency domain components for at least one vector comprises a single grouping of adjacent non-frequency domain components.

10. The method of claim 1, wherein the selected subset of non-frequency domain components for the vector consists of one non-frequency domain component.

11. The method of claim 1, further comprising:
identifying a plurality of channel responses corresponding to a plurality of channels across a third plurality of tone subsets, wherein each channel of the plurality of channels corresponds to a pairing of a transmit antenna with a receive antenna; and
selecting, for each channel of the plurality of channels, a subset of non-frequency domain components of the channel response for the channel, wherein the plurality of intermediate precoders is identified based at least in part on the selected subset of non-frequency domain components for each channel of the plurality of channels across a fourth plurality of tone subsets.

12. The method of claim 11, further comprising:
transforming each channel response for each of the plurality of channels from a frequency domain to a time domain, wherein selecting the subset of non-frequency domain components of the channel response comprises selecting a subset of time domain components of the channel response.

13. The method of claim 11 or 12, wherein the subset of non-frequency domain components for the channel is selected based at least in part on: a power threshold, or a compactness restriction, or a sparseness restriction, or a fixed number of time domain components, or a combination thereof.

14. The method of claim 11, further comprising:
receiving at least one pilot signal over at least one of the plurality of channels; and
identifying at least one of the plurality of channel responses based at least in part on the at least one pilot signal.

15. The method of claim 1, wherein at least one of the first plurality of tone subsets and the second plurality of tone subsets comprises at least one of single tone subsets and tone bundles.

16. The method of claim 1, wherein the first plurality of tone subsets is different from the second plurality of tone subsets.

17. An apparatus for wireless communication comprising:
means for identifying a plurality of intermediate precoders corresponding to a first plurality of tone subsets, the plurality of intermediate precoders defining a plurality of vectors across the first plurality of tone subsets, wherein each of the plurality of vectors comprises at least frequency domain components and non-frequency domain components;
means for selecting, for each vector of the plurality of vectors, a subset of the non-frequency domain components of the vector;
means for modifying the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders; and
means for precoding a plurality of transmit streams using the plurality of smoothed precoders, wherein one or more of the plurality of transmit streams comprise a bandwidth allocation having one or more user equipment (UE)-specific reference signal tone locations uniformly spaced within the bandwidth allocation, the bandwidth allocation comprising a plurality of resource blocks (RBs) that are contiguous in frequency over the bandwidth allocation.

18. The apparatus of claim 17, further comprising:
means for applying continuous precoding to one or more tones in the bandwidth allocation; and
means for transmitting downlink (DL) transmissions to the UE.

19. The apparatus of claim 17, further comprising:
means for determining the bandwidth allocation for downlink (DL) transmissions to a UE.

20. The apparatus of claim 17, wherein each vector of the plurality of vectors corresponds to a different transmit stream, or a different combination of transmit stream and transmit antenna.

21. The apparatus of claim 17, further comprising:
means for transforming each vector of the plurality of vectors from the frequency domain to a time domain, wherein selecting a subset of the non-frequency domain components of the vector comprises selecting a subset of time domain components of the vector.

22. The apparatus of claim 17, further comprising:
means for identifying a plurality of channel responses corresponding to a plurality of channels across a third plurality of tone subsets, wherein each channel of the plurality of channels corresponds to a pairing of a transmit antenna with a receive antenna; and
means for selecting, for each channel of the plurality of channels, a subset of non-frequency domain components of the channel response for the channel, wherein the plurality of intermediate precoders is identified based at least in part on the selected subset of non-frequency domain components for each channel of the plurality of channels across a fourth plurality of tone subsets.

23. An apparatus for wireless communication, comprising:
a processor;
memory in electronic communication with the processor; and
the processor and memory configured to:
identify a plurality of intermediate precoders corresponding to a first plurality of tone subsets, the plurality of intermediate precoders defining a plurality of vectors across the first plurality of tone subsets, wherein each of the plurality of vectors comprises at least frequency domain components and non-frequency domain components;
select, for each vector of the plurality of vectors, a subset of the non-frequency domain components of the vector;
modify the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders; and
precode a plurality of transmit streams using the plurality of smoothed precoders, wherein one or more of the plurality of transmit streams comprise a bandwidth allocation having one or more user equipment (UE)-specific reference signal tone locations uniformly spaced within the bandwidth allocation, the bandwidth allocation comprising a plurality of resource blocks (RBs) that are contiguous in frequency over the bandwidth allocation.

24. The apparatus of claim 23, wherein the processor and memory are further configured to:

apply continuous precoding to one or more tones in the bandwidth allocation; and transmit downlink (DL) transmissions to the UE.

25. The apparatus of claim 23, wherein the processor and memory are further configured to:

determine the bandwidth allocation for downlink (DL) transmissions to a UE.

26. The apparatus of claim 23, wherein the processor and memory are further configured to:

transform each vector of the plurality of vectors from the frequency domain to a time domain, wherein selecting a subset of the non-frequency domain components of the vector comprises selecting a subset of time domain components of the vector.

27. The apparatus of claim 23, wherein the processor and memory are further configured to:

identify a plurality of channel responses corresponding to a plurality of channels across a third plurality of tone subsets, wherein each channel of the plurality of channels corresponds to a pairing of a transmit antenna with a receive antenna; and select, for each channel of the plurality of channels, a subset of non-frequency domain components of the channel response for the channel, wherein the plurality of intermediate precoders is identified based at least in part on the selected subset of non-frequency domain components for each channel of the plurality of channels across a fourth plurality of tone subsets.

28. The apparatus of claim 27, wherein the processor and memory are further configured to:

transform each channel response for each of the plurality of channels from a frequency domain to a time domain, wherein selecting the subset of non-frequency domain components of a channel response comprises selecting a subset of time domain components of the channel response.

29. The apparatus of claim 27, wherein the processor and memory are further configured to:

receive at least one pilot signal over at least one of the plurality of channels; and identify at least one of the plurality of channel responses based at least in part on the at least one pilot signal.

30. A non-transitory computer-readable medium storing code for wireless communication, the code comprising instructions executable to:

identify a plurality of intermediate precoders corresponding to a first plurality of tone subsets, the plurality of intermediate precoders defining a plurality of vectors across the first plurality of tone subsets, wherein each of the plurality of vectors comprises at least frequency domain components and non-frequency domain components;

select, for each vector of the plurality of vectors, a subset of the non-frequency domain components of the vector;

modify the plurality of intermediate precoders to a plurality of smoothed precoders corresponding to a second plurality of tone subsets based at least in part on the selected subset of non-frequency domain components for each vector, wherein the plurality of smoothed precoders is smoothed in a frequency domain compared to the plurality of intermediate precoders; and precode a plurality of transmit streams using the plurality of smoothed precoders, wherein one or more of the plurality of transmit streams comprise a bandwidth allocation having one or more user equipment (UE)-specific reference signal tone locations uniformly spaced within the bandwidth allocation, the bandwidth allocation comprising a plurality of resource blocks (RBs) that are contiguous in frequency over the bandwidth allocation.

* * * * *